(12) United States Patent
Aoyama

(10) Patent No.: US 12,280,814 B2
(45) Date of Patent: Apr. 22, 2025

(54) LIFTER DEVICE

(71) Applicant: MAKITA CORPORATION, Anjo (JP)

(72) Inventor: Syuji Aoyama, Anjo (JP)

(73) Assignee: MAKITA CORPORATION, Anjo (JP)

( * ) Notice: Subject to any disclaimer, the term of this patent is extended or adjusted under 35 U.S.C. 154(b) by 310 days.

(21) Appl. No.: 17/898,141

(22) Filed: Aug. 29, 2022

(65) Prior Publication Data

US 2023/0076978 A1 Mar. 9, 2023

(30) Foreign Application Priority Data

Sep. 3, 2021 (JP) .................................. 2021-144201
Jul. 13, 2022 (JP) .................................. 2022-112681

(51) Int. Cl.
| | |
|---|---|
| *B66F 9/00* | (2006.01) |
| *B62B 3/06* | (2006.01) |
| *B62B 5/00* | (2006.01) |
| *B66F 9/24* | (2006.01) |

(52) U.S. Cl.
CPC .......... *B62B 3/0612* (2013.01); *B62B 3/0637* (2013.01); *B62B 5/00* (2013.01); *B62B 5/0013* (2013.01); *B66F 9/24* (2013.01)

(58) Field of Classification Search
CPC ....... B62B 3/0612; B62B 3/0606; B62B 3/00; B62B 1/00; B66F 5/00; B66F 5/04
See application file for complete search history.

(56) References Cited

U.S. PATENT DOCUMENTS

| | | | |
|---|---|---|---|
| 2022/0297990 A1* | 9/2022 | Fox ...................... | B62B 3/0612 |
| 2023/0074140 A1* | 3/2023 | Aoyama ................ | B66F 7/025 |
| 2023/0076978 A1* | 3/2023 | Aoyama ................ | B62B 3/0612 |
| 2024/0246800 A1* | 7/2024 | Mitchell .................. | B66F 9/08 |

FOREIGN PATENT DOCUMENTS

JP    2015-110459 A    6/2015

* cited by examiner

*Primary Examiner* — Lee D Wilson
(74) *Attorney, Agent, or Firm* — Oliff PLC

(57) ABSTRACT

A lifter device includes a pole, a lifting member guided by the pole, a motor that generates power used for ascending and descending of the lifting member, a controller that controls the motor, a case that is fixed to at least a portion of the pole and accommodates the motor and the controller, a transmission mechanism that transmits the power of the motor to the lifting member, and a battery mounting portion that is provided on the case and to which a battery pack is mouted to supply power to the motor.

16 Claims, 39 Drawing Sheets

FIG.12

REAR ← → FRONT

LIFTER DEVICE

CROSS-REFERENCE TO RELATED APPLICATION(S)

The present application claims priority to and incorporates by reference the entire contents of Japanese Patent Application No. 2021-144201 filed in Japan on Sep. 3, 2021 and Japanese Patent Application No. 2022-112681 filed in Japan on Jul. 13, 2022.

BACKGROUND OF THE INVENTION

1. Field of the Invention

Techniques disclosed herein in the present application relate to a lifter device.

2. Description of the Related Art

In the technical field related to lifter devices, lifter devices such as that disclosed in Japanese Laid-open Patent publication No. 2015-110459 are known.

To allow the lifter devices to be smoothly handled, the lifter devices are desired to be restrained from increasing in size.

In one-non-limiting object of the present teachings to disclose techniques for restraining the lifter devices from increasing in size.

SUMMARY OF THE INVENTION

In one non-limiting aspect of the present teachings, a lifter device includes a pole, a lifting member guided by the pole, a motor that generates power used for ascending and descending of the lifting member, a controller that controls the motor, a case that is fixed to at least a portion of the pole and accommodates the motor and the controller, a transmission mechanism that transmits the power of the motor to the lifting member, and a battery mounting portion that is provided on the case and to which a battery pack is mouted to supply power to the motor.

BRIEF DESCRIPTION OF THE DRAWINGS

FIG. 12 is a perspective view from the rear side illustrating a stop brake mechanism according to the embodiment;

DETAILED DESCRIPTION OF THE PREFERRED EMBODIMENTS

Figure 1:
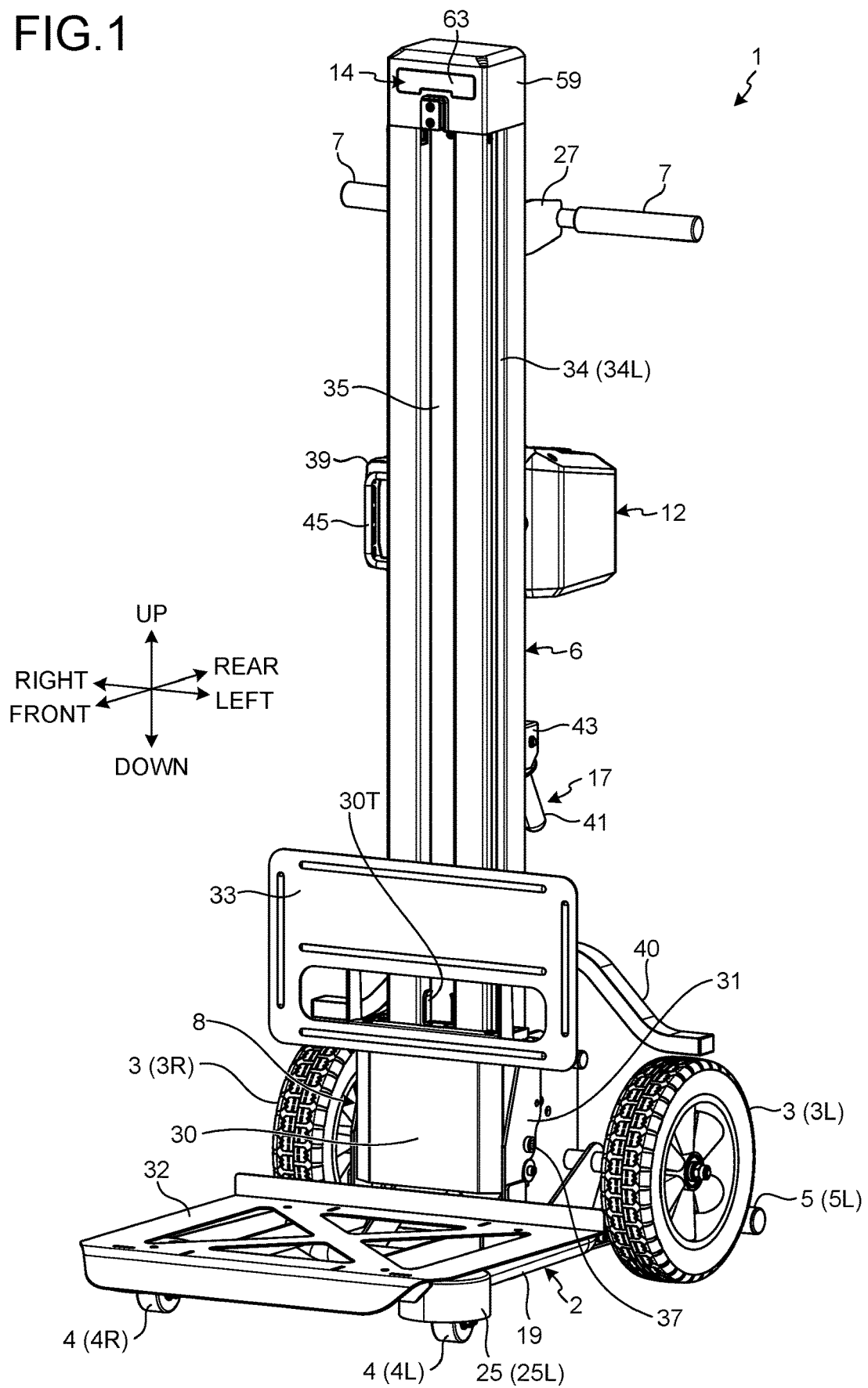
FIG. 1 is a perspective view from a front side illustrating a lifter device according to an embodiment of the present disclosure.

In one or more embodiments, a lifter device may include a pole, a lifting member guided by the pole, a motor that generates power used for asceding (moving up) and desceding (moving down) of the lifting member, and a controller that controls the motor. The lifter device may include a case that is fixed to at least a portion of the pole and accommodates therein the motor and the controller, and a transmission mechanism that transmits the power of the motor to the lifting member. The lifter device may include a battery mounting portion that is provided on the case and on which a battery pack is mounted to supply power to the motor.

With the configuration described above, the motor, the controller, and the battery mounting portion are concentrated at the case. Accordingly, the lifter device is restrained from increasing in size. Since the motor, the controller, and the battery mounting portion are concentrated at the case, cables that connect the motor, the controller, and the battery mounting portion to one another are restrained from being lengthened.

In one or more embodiments, at least a portion of the lifting member may be configured to ascend (move up) and descend (move down) on a front side of the pole. The case may be fixed to a rear surface of the pole.

The configuration described above allows the lifting member to smoothly ascend and descend.

In one or more embodiments, the case may be fixed to a central portion in the up-down direction of the pole.

The configuration described above allows a user of the lifter device to smoothly mount the battery pack on the battery mounting portion provided at the case.

In one or more embodiments, at least a portion of the transmission mechanism may be accommodated in the case.

Since the configuration described above concentrates also the transmission mechanism at the case, the lifter device is restrained from increasing in size. In addition, since the transmission mechanism is disposed near the motor, the transmission mechanism is restrained from becoming complicated or increasing in size.

In one or more embodiments, the transmission mechanism may include a reduction mechanism configured to decelerate rotation of the motor, and the reduction mechanism may be accommodated in the case.

Since the configuration described above concentrates the reduction mechanism at the case, the lifter device is restrained from increasing in size. In addition, since the reduction mechanism is disposed near the motor, the reduction mechanism is restrained from becoming complicated or increasing in size.

In one or more embodiments, the battery mounting portion may be provided on an outer surface of the case.

The configuration described above allows the user of the lifter device to smoothly mount the battery pack onto the battery mounting portion. In addition, the case is restrained from increasing in size.

In one or more embodiments, the battery mounting portion may include a first battery mounting portion and a second battery mounting portion.

The configuration described above allows the user of the lifter device to mount the battery pack on appropriate one of the first and the second battery mounting portions according to, for example, the use condition of the lifter device.

In one or more embodiments, a battery pack having a first rated voltage may be mounted on the first battery mounting portion, and a battery pack having a second rated voltage may be mounted on the second battery mounting portion.

The configuration described above allows the user of the lifter device to effectively use each of the two types of battery packs having the different rated voltages.

In one or more embodiments, the second battery mounting portion may be disposed adjacent to the first battery mounting portion.

The configuration described above allows the user of the lifter device to smoothly mount the battery pack onto either the first battery mounting portion or the second battery mounting portion.

In one or more embodiments, the lifter device may include a cover member configured to cover the second battery mounting portion when the battery pack is mounted on the first battery mounting portion and cover the first battery mounting portion when the battery pack is mounted on the second battery mounting portion.

The configuration described above restrains the two battery packs from being mounted at the same time. Mounting the two battery packs at the same time may complicate electronic circuitry or complicate the control. Since the two battery packs are restrained from being mounted at the same time, the electronic circuitry and the control are restrained from becoming complicated. Since the cover member covers one of the first and the second battery mounting portions on which the battery pack is not mounted, the battery mounting portion is protected.

In one or more embodiments, the cover member may be slidably supported by the case.

The configuration described above allows the user of the lifter device to easily cover either the first battery mounting portion or the second battery mounting portion by sliding the cover member.

In one or more embodiments, the relative positions of the first battery mounting portion and the second battery mounting portion are defined such that: the battery pack is not allowed to be mounted on the second battery mounting portion when the battery pack is mounted on the first battery mounting portion, and the battery pack is not allowed to be mounted on the first battery mounting portion when the battery pack is mounted on the second battery mounting portion.

With the configuration described above, for example, even if the cover member is not present, when a second battery pack is tried to be mounted onto the second battery mounting portion while a first battery pack is mounted on the first battery mounting portion, the second battery pack cannot be mounted onto the second battery mounting portion because the second battery pack contacts the first battery pack mounted on the first battery mounting portion. In the same manner, when the first battery pack is tried to be mounted onto the first battery mounting portion while the second battery pack is mounted on the second battery mounting portion, the first battery pack cannot be mounted onto the first battery mounting portion because the first battery pack contacts the second battery pack mounted on the second battery mounting portion.

In one or more embodiments, the battery mounting portion may be configured such that the battery pack is mounted onto the battery mounting portion by being inserted onto the first battery mounting portion from above the battery mounting portion.

The configuration described above allows the user of the lifter device to smoothly mount the battery pack onto the battery mounting portion.

In one or more embodiments, the lifter device may include an operation device that is provided in the case and transmits, to the controller, an operation signal to drive the motor.

Since the configuration described above concentrates also the operation device at the case, the lifter device is restrained from increasing in size. In addition, since the operation device is disposed near the controller, a cable that connects the operation device to the controller is restrained from being lengthened.

In one or more embodiments, the operation device may include buttons, and the buttons may be arranged on an upper surface of the case.

The configuration described above allows the user of the lifter device to smoothly operate the buttons.

In one or more embodiments, the buttons may include an up button to cause the lifting member to ascend (move up) and a down button to cause the lifting member to descend (move down).

The configuration described above allows the user of the lifter device to cause the lifting member to ascend and descend by operating the up button and the down button.

In one or more embodiments, the transmission mechanism may include a rotating body rotated by the motor, a lifting pulley that is rotatably supported by the lifting member, and a wire that connects the rotating body to the lifting pulley. The rotating body may be configured to wind and unwind the wire to cause the lifting member to ascend (move up) and descend (move down).

The configuration described above allows the transmission mechanism to appropriately transmit the power of the motor to the lifting member.

In one or more embodiments, the transmission mechanism may include a pole pulley rotatably supported at the upper end of the pole. The wire may connect the rotating body to the lifting pulley while being hung on the pole pulley.

The configuration described above allows the transmission mechanism to appropriately transmit the power of the motor to the lifting member.

In one or more embodiments, the lifter device may include a light unit that is disposed at the upper end of the pole and illuminates the front of the lifting member.

The configuration described above allows the user of the lifter device to appropriately handle the lifter device even at, for example, a dark place.

In one or more embodiments, a lifter device may include a pole extending in an up-down direction, a lifting member configured to ascend and descend with respect to the pole, a brushless motor configured to generate power used for asceinding and descending of the lifting member, a battery mounting portion connected to the pole, and a battery pack for an electric power tool, which is detachably mountable on the battery mounting portion.

The following describes the embodiments of the present disclosure with reference to the drawings, but the present disclosure is not limited to the embodiments. Components of the embodiments described below can be combined as appropriate. Some of the components can be omitted. In the embodiments, the positional relations among the respective parts are explained using the terms "front", "rear", "left", "right", "up", and "down". These terms indicate relative positions or directions with respect to the center of a lifter device 1.

First Embodiment

Overview of Lifter Device

Figure 2:
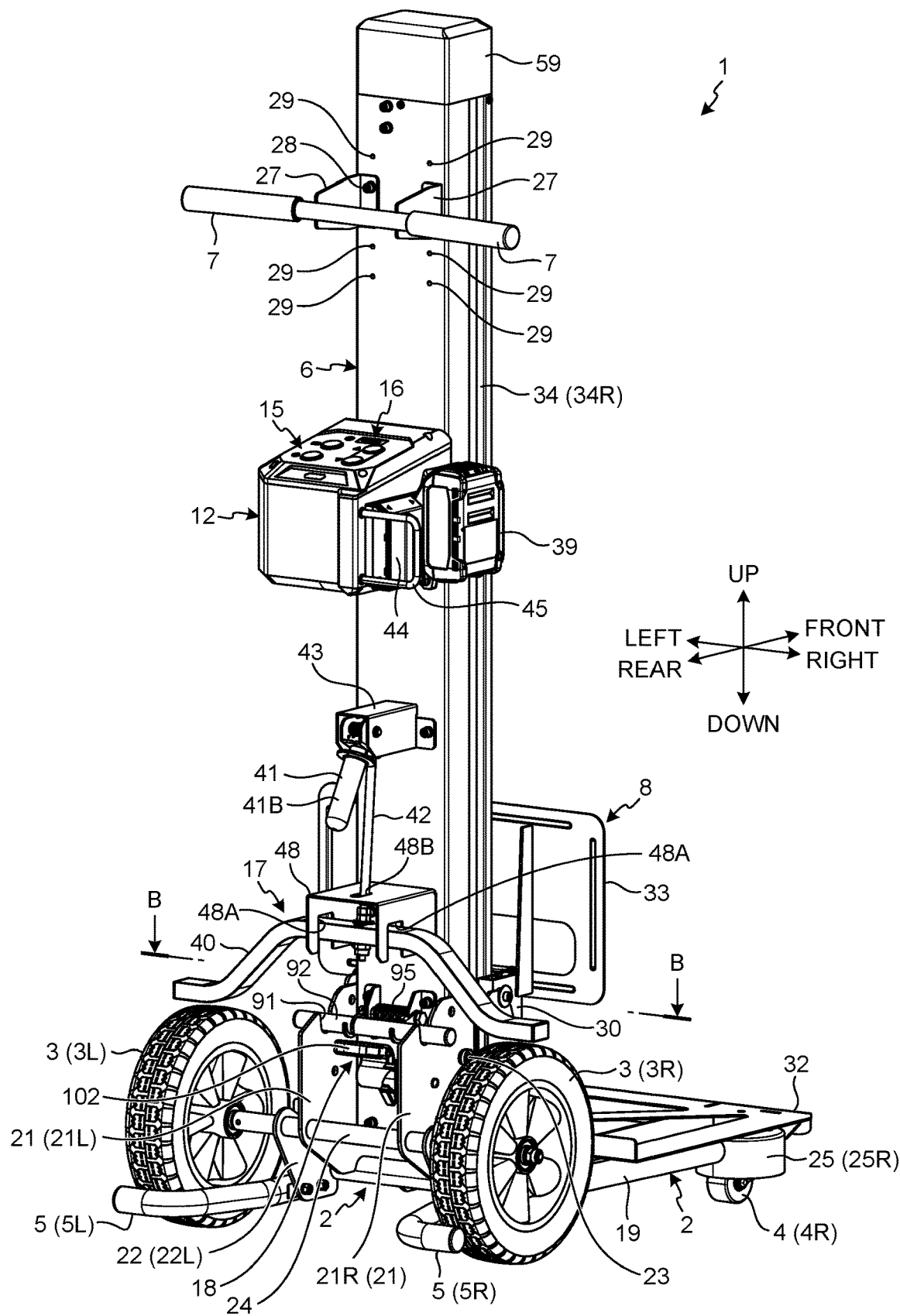
FIG. 2 is a perspective view from a rear side illustrating the lifter device according to the embodiment.
Figure 3:
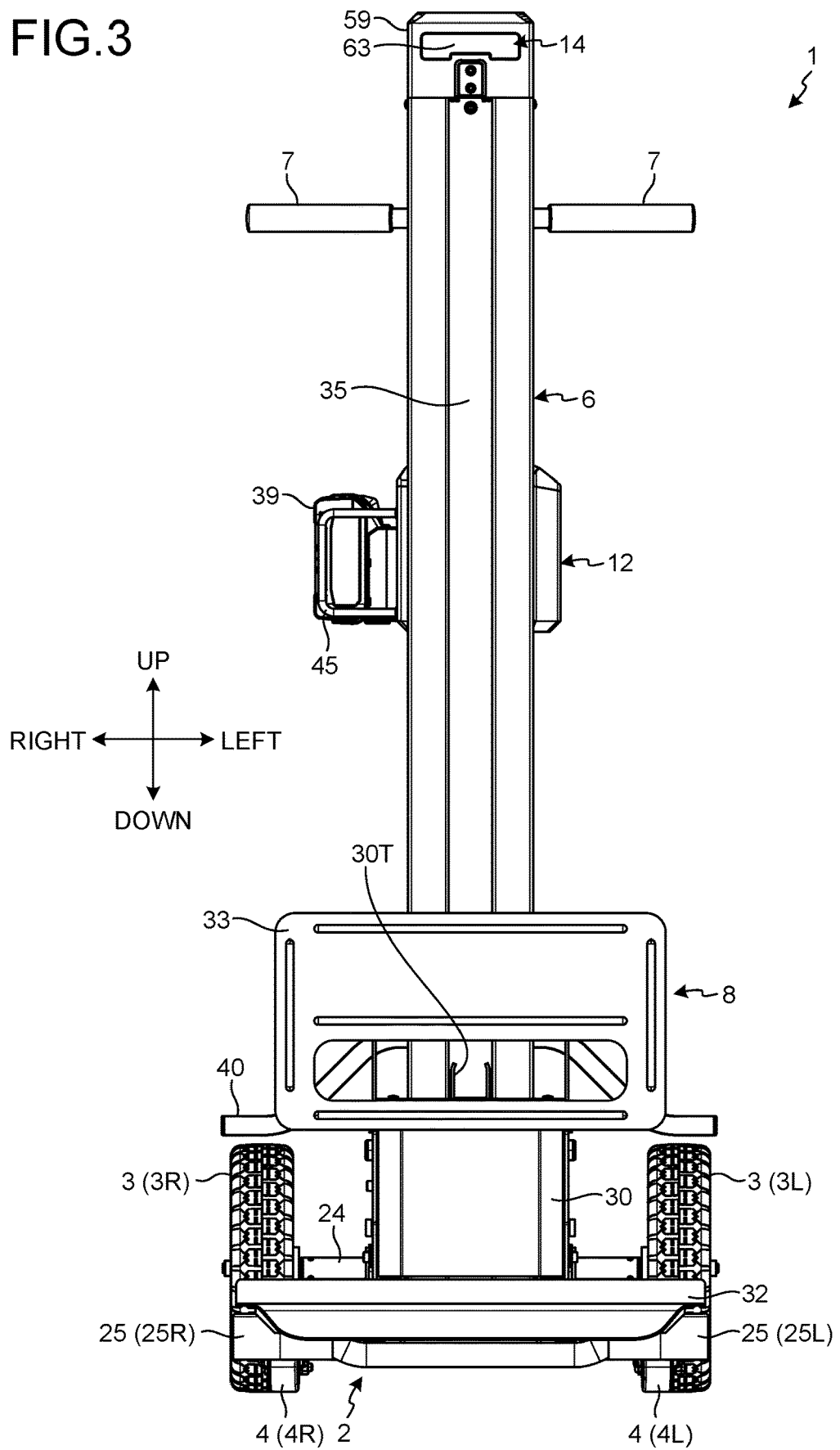
FIG. 3 is a front view illustrating the lifter device according to the embodiment.
Figure 4:
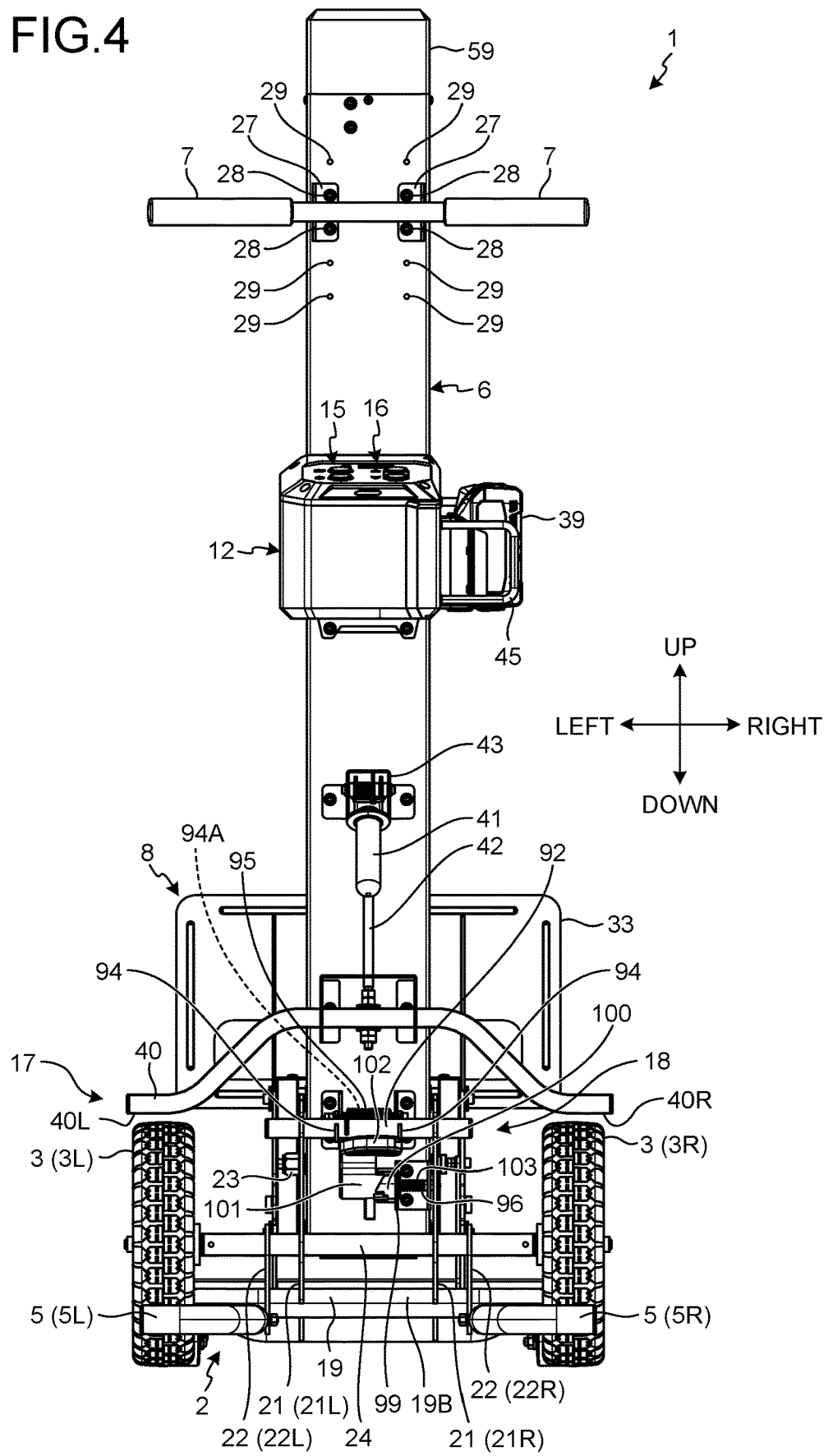
FIG. 4 is a rear view illustrating the lifter device according to the embodiment.
Figure 5:
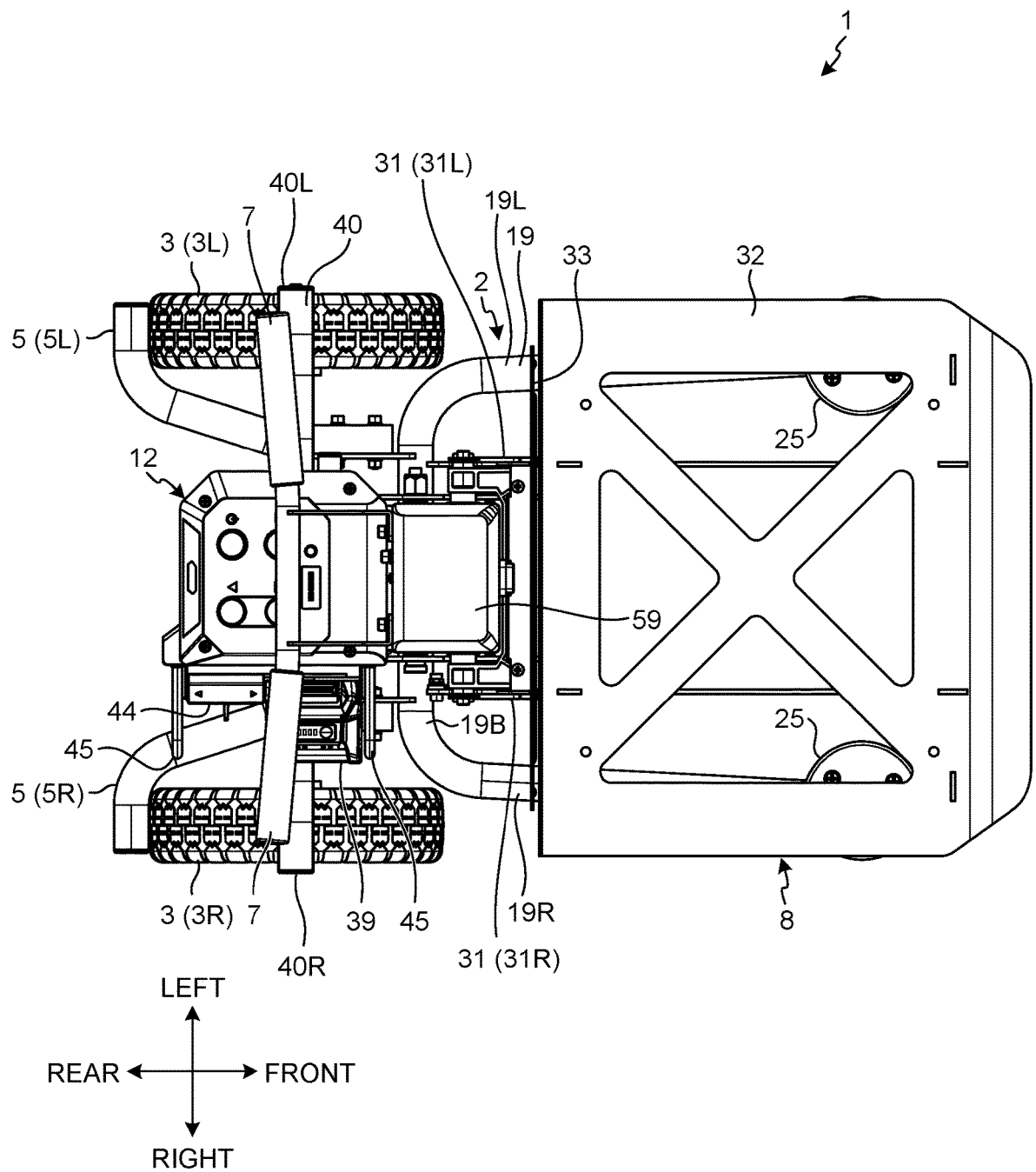
FIG. 5 is a plan view illustrating the lifter device according to the embodiment.
Figure 6:
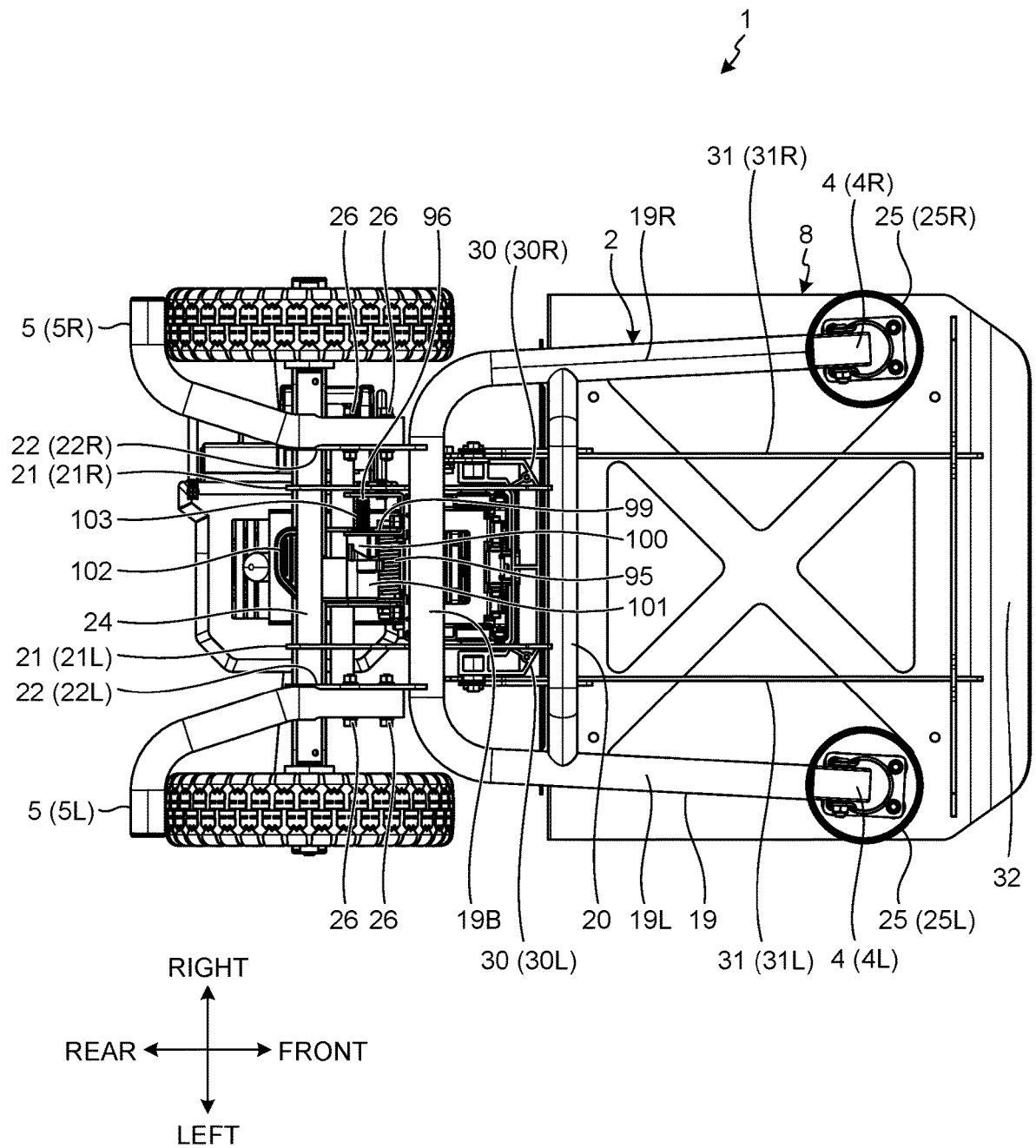
FIG. 6 is a bottom view illustrating the lifter device according to the embodiment.
Figure 7:
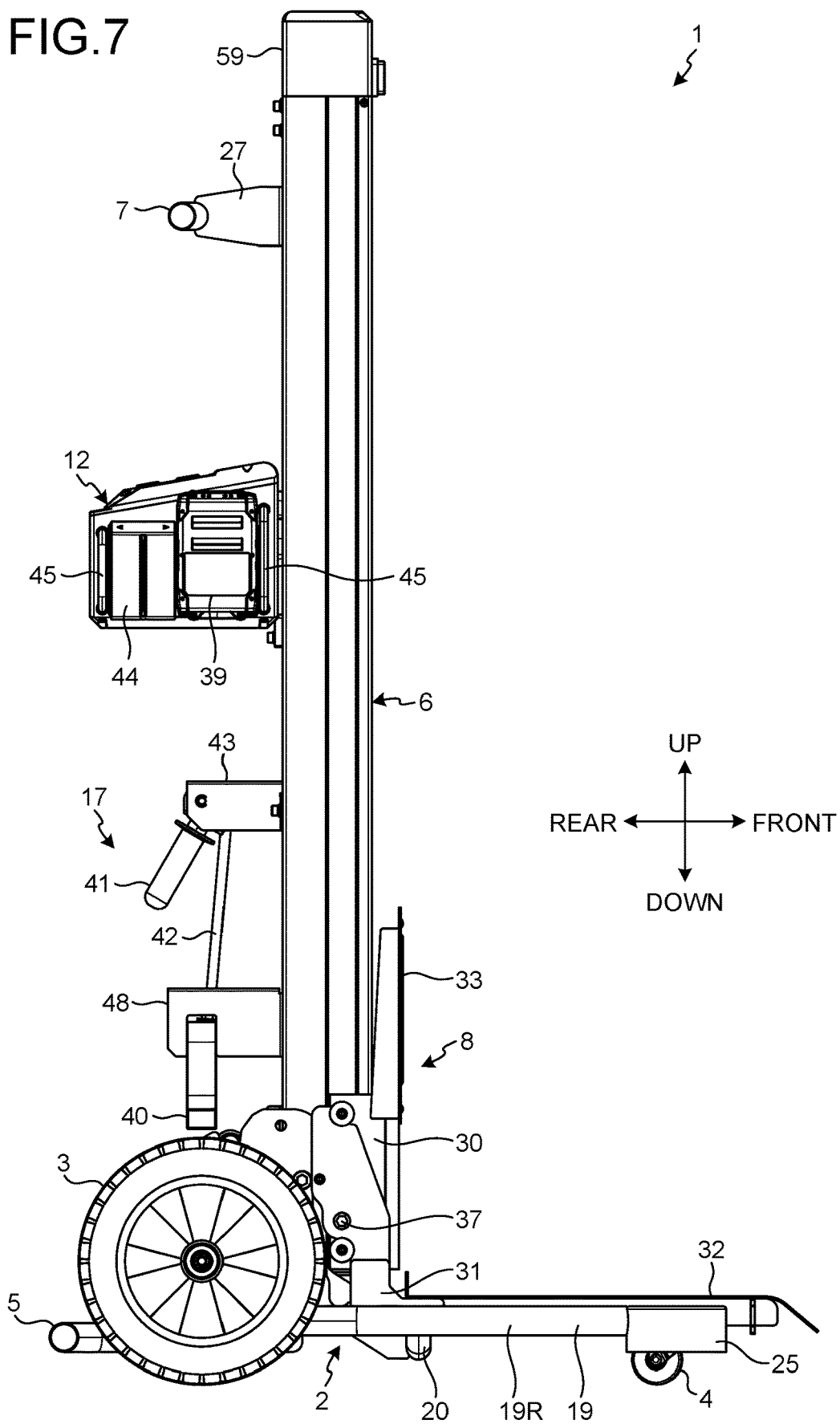
FIG. 7 is a right side view illustrating the lifter device according to the embodiment.
Figure 8:
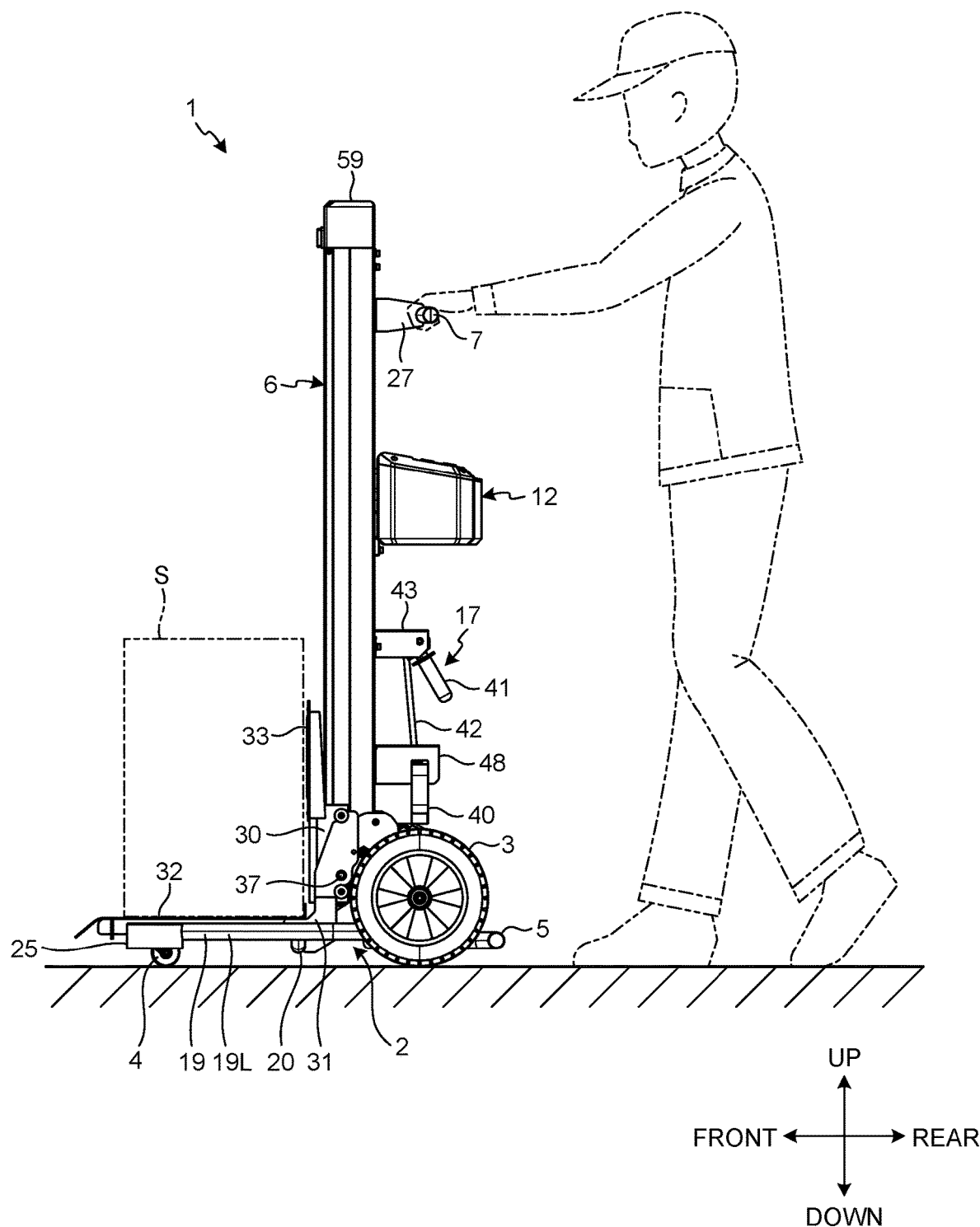
FIG. 8 is a left side view illustrating the lifter device according to the embodiment.
Figure 9:
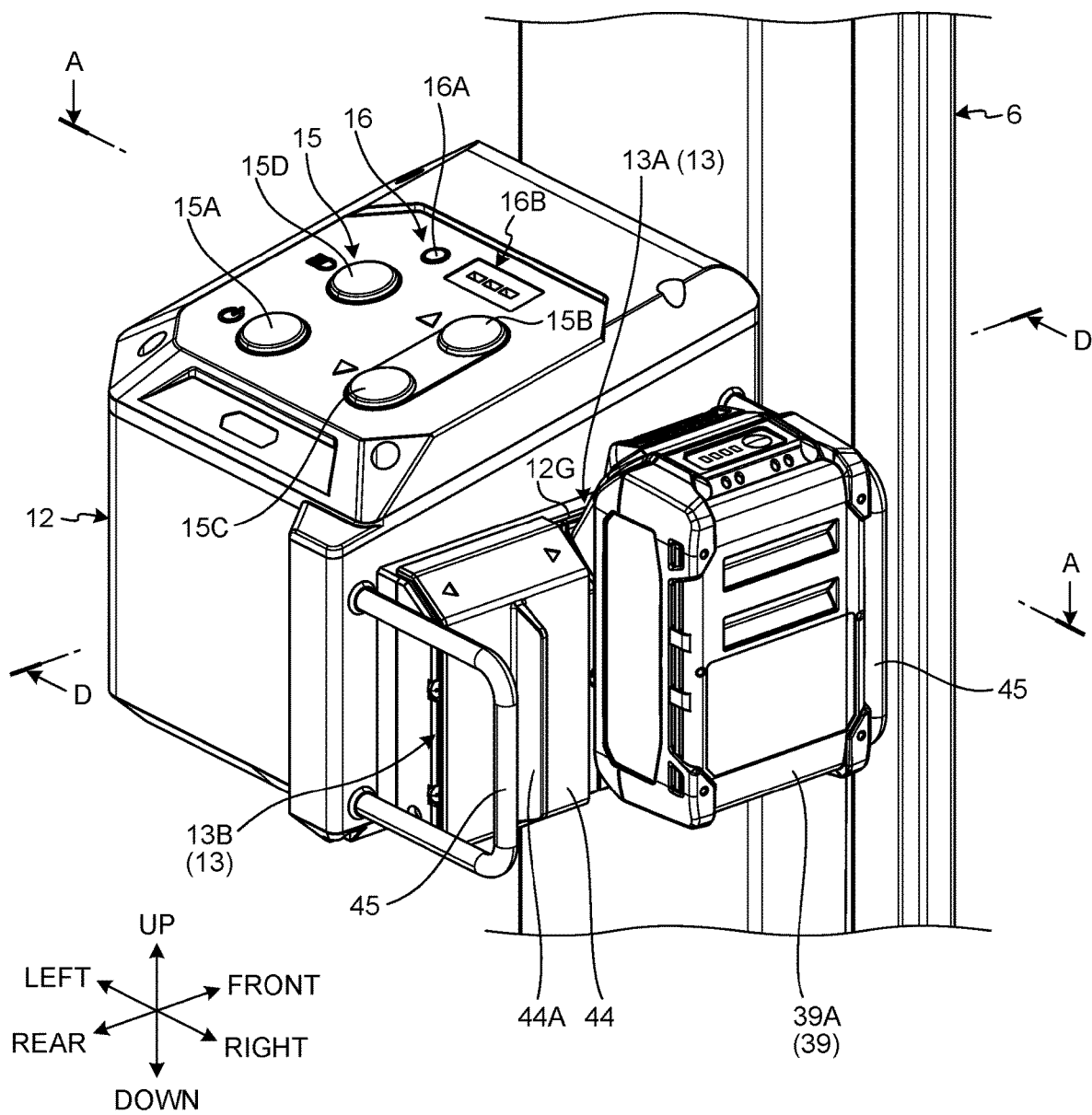
FIG. 9 is a perspective view from the rear side illustrating a portion of the lifter device according to the embodiment.
Figure 10:
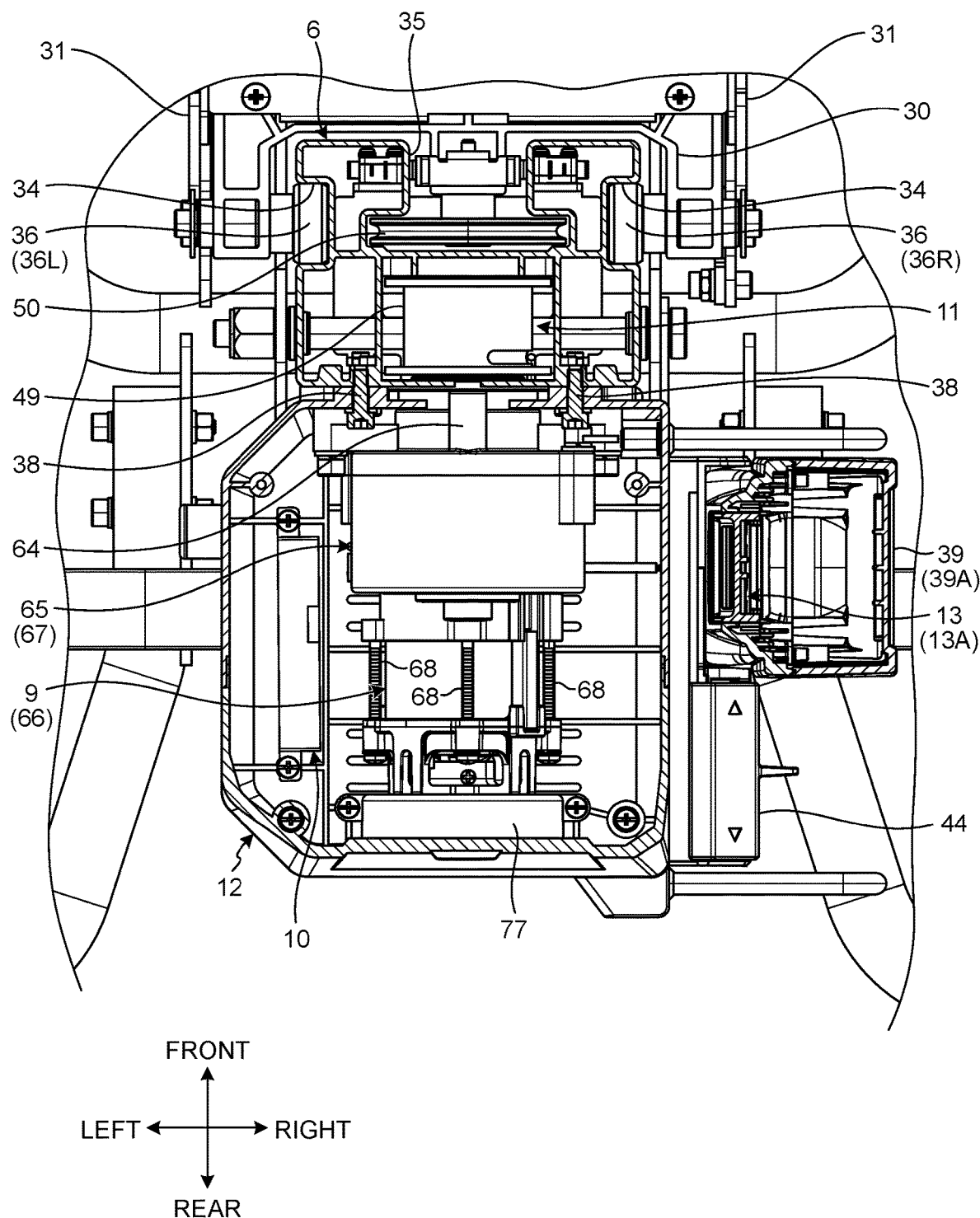
FIG. 10 is a sectional view illustrating a portion of the lifter device according to the embodiment.

FIG. 1 is a perspective view from a front side illustrating the lifter device 1 according to an embodiment. FIG. 2 is a perspective view from a rear side illustrating the lifter device 1 according to the embodiment. FIG. 3 is a front view illustrating the lifter device 1 according to the embodiment. FIG. 4 is a rear view illustrating the lifter device 1 according to the embodiment. FIG. 5 is a plan view illustrating the lifter device 1 according to the embodiment. FIG. 6 is a bottom view illustrating the lifter device 1 according to the embodiment. FIG. 7 is a right side view illustrating the lifter device 1 according to the embodiment. FIG. 8 is a left side view illustrating the lifter device 1 according to the embodiment. FIG. 9 is a perspective view from the rear side illustrating a portion of the lifter device 1 according to the embodiment. FIG. 10 is a sectional view illustrating a portion of the lifter device 1 according to the embodiment, and corresponds to an A-A line sectional view of FIG. 9.

The lifter device 1 is used for transporting and lifting an object S to be transported. The lifter device 1 includes a traveling frame 2, wheels 3, casters 4 (small wheels), guards 5, a pole 6, a handle 7, a lifting member 8, a motor 9, a controller 10, a transmission mechanism 11, a case 12, a battery mounting portion 13, a light unit 14, an operation device 15, a display device 16, a stop brake mechanism 17, and a locking mechanism 18.

The traveling frame 2 supports the pole 6. The traveling frame 2 includes a main frame 19, a sub-frame 20, a pair of main plates 21, and a pair of sub-plates 22.

The main frame 19 includes a rear frame 19B, a left frame 19L, and a right frame 19R. The rear frame 19B extends in the left-right direction. Each of the left frame 19L and right frame 19R extends in the front-rear direction. The rear frame 19B is disposed so as to connect the rear end of the left frame 19L to the rear end of the right frame 19R. The main frame 19 is constituted by a hollow member (pipe), and the material of the main frame 19 is a ferrous metal.

The sub-frame 20 is disposed more frontward than the rear frame 19B. The sub-frame 20 is disposed so as to connect a rear portion of the left frame 19L to a rear portion of the right frame 19R. The sub-frame 20 extends in the left-right direction. The sub-frame 20 is constituted by a hollow member (pipe), and the material of the sub-frame 20 is a ferrous metal.

The main plates 21 are supported from lower sides thereof by the rear frame 19B and sub-frame 20. A pair of the main plates 21 are provided. The pair of the main plates 21 are arranged in the left-right direction. The main plates 21 include a left main plate 21L and a right main plate 21R. The main plates 21 are connected to a lower portion of the pole 6 by a bolt 23.

The sub-plates 22 are supported by the rear frame 19B. A pair of the sub-plates 22 is provided. The pair of the sub-plates 22 are arranged in the left-right direction. The sub-plates 22 include a left sub-plate 22L and a right sub-plate 22R. The main plates 21L and 21R are arranged between the sub-plates 22L and 22R. The sub-plate 22L is disposed on the left side of the main plate 21L. The sub-plate 22R is disposed on the right side of the main plate 21R.

The wheels 3 are supported by a rear portion of the traveling frame 2. A pair of the wheels 3 are arranged in the left-right direction. The wheels 3 include a left wheel 3L and a right wheel 3R. Each of the wheels 3L and 3R is connected to an axle 24. The axle 24 connects the left wheel 3L to the right wheel 3R. The axle 24 is supported by the main plates 21 and the sub-plates 22. The wheels 3 are supported by the traveling frame 2 with the axle 24 interposed therebetween. The axle 24 extends in the left-right direction. The wheels 3 are rotatably connected to the axle 24. The rotation axis of the wheels 3 extends in the left-right direction. The axial direction parallel to the rotation axis of the wheels 3 coincides with the left-right direction. A bearing is disposed between each of the wheels 3 and the axle 24.

The casters 4 are supported by a front portion of the traveling frame 2. A pair of the casters 4 are arranged in the left-right direction. The casters 4 include a left caster 4L and a right caster 4R. The left caster 4L is supported by a front end portion of the left frame 19L. The right caster 4R is supported by a front end portion of the right frame 19R. The casters 4 are covered with cup portions 25. The cup portions 25 include a left cup portion 25L that covers the left caster 4L from above and a cup portion 25R that covers the right caster 4R from above. The cup portion 25L is provided at the front end portion of the left frame 19L. The cup portion 25R is provided at the front end portion of the right frame 19R.

The guards 5 are fixed to the sub-plates 22. A pair of the guards 5 are arranged in the left-right direction. The guards 5 include a left guard 5L and a right guard 5R. A front portion of the left guard 5L is fixed to the left sub-plate 22L by bolts 26. A rear portion of the left guard 5L is disposed behind the left wheel 3L. A front portion of the right guard 5R is fixed to the right sub-plate 22R by the bolts 26. A rear portion of the right guard 5R is disposed behind the right wheel 3R. Each of the guards 5L and 5R is bent into an L-shape. The rear portion of the guard 5L is bent to the left. The rear portion of the guard 5R is bent to the right. If the lifter device 1 is about to fall backward, the rear portions of the guards 5 come in contact with the ground. The contact of the rear portions of the guards 5 with the ground prevents the lifter device 1 from falling backward. The guards 5 also prevent contact of a user of the lifter device 1 with the wheels 3.

The pole 6 is supported by the traveling frame 2. The pole 6 is supported by the traveling frame 2 with the main plates 21 (21L and 21R) interposed therebetween. In more detail, the traveling frame 2 supports the main plates 21 (21L and 21R), and the main plates 21 (21L and 21R) support the pole 6. The pole 6 extends in the up-down direction. The traveling frame 2 is connected to a lower end portion of the pole 6. The pole 6 is disposed so as to extend upward from the traveling frame. The pole 6 is turnably connected to the traveling frame 2. The pole 6 can turn so as to fall forward. The pole 6 is made of aluminum. The pole 6 is a hollow member. The pole 6 is formed of a drawn aluminum material, and is lightweight.

The handle 7 is held by hands of the user of the lifter device 1. The handle 7 is fixed to a rear portion of the pole 6. The handle 7 is fixed to an upper portion of the pole 6 with a pair of brackets 27 interposed therebetween. The bracket 27 are fixed to the pole 6 by screws 28. A plurality of threaded holes 29 are provided at the rear portion of the pole 6. The threaded holes 29 are arranged in the up-down direction. The height of the handle 7 is adjusted by selecting the threaded holes 29 into which the screws 28 are to be inserted.

The lifting member 8 ascends (moves up) and descends (moves down) while being guided by the pole 6. The lifting member 8 includes a slider 30 guided by the pole 6, arms 31 connected to the slider 30, a table 32 supported by the arms 31, and a back plate 33 fixed to an upper portion of the slider 30.

Guide grooves 34 are formed in the pole 6. The guide grooves 34 include a guide groove 34L formed in a left surface of the pole 6 and a guide groove 34R formed in a right surface of the pole 6. A guide opening 35 is formed in a front surface of the pole 6. Each of the guide grooves 34 and the guide opening 35 extends in the up-down direction. A left portion 30L of the slider 30 faces the left guide groove 34L. A right portion 30R of the slider 30 faces the right guide groove 34R. A front portion of the slider 30 faces the guide opening 35. At least a portion of the slider 30 is disposed in the guide opening 35. The rollers 36 are rotatably supported by the slider 30. The rollers 36 include a roller 36L disposed in the left guide groove 34L and a roller 36R disposed in the right guide groove 34R. The rollers 36 can roll in the guide grooves 34. The rollers 36 roll in the guide grooves 34, whereby the slider 30 smoothly moves in the up-down direction while being guided by the pole 6. The guide grooves 34 and the guide opening 35 are formed by a drawing process of aluminum.

The arms 31 are disposed so as to extend forward from the slider 30. A pair of the arms 31 are arranged in the left-right direction. The arms 31 include an arm 31L and a right arm 31R. A rear portion of the left arm 31L is connected to the left portion 30L of the slider 30 by a bolt 37. A rear portion of the right arm 31R is connected to the right portion 30R of the slider 30 by the bolt 37. Each of the arms 31 is turnably connected to the slider 30.

The table 32 supports the object S to be transported from below. The object S to be transported is placed on the table 32. The table 32 is supported by the arms 31L and 31R from the left and the right directions. The table 32 is disposed in front of the pole 6. The table 32 is connected to the slider 30 with the arms 31 interposed therebetween. The table 32 is turnably connected to the slider 30. As the arms 31 turn with respect to the slider 30, the table 32 turns together with the arms 31.

The back plate 33 supports the object S to be transported from the rear. The back plate 33 is fixed to an upper portion of the front surface of the slider 30.

At least a portion of the lifting member 8 ascends and descends on the front side of the pole 6. At least the front portion of the slider 30, front portions of the arms 31, the table 32, and the back plate 33 are disposed more frontward of the pole 6, and ascend (move up) and descend (move down) on the front side of the pole 6.

The motor 9 generates the power used for the ascending and descending of the lifting member 8. The motor 9 is an electric motor. The motor 9 is a brushless motor.

The controller 10 controls electronic equipment mounted on the lifter device 1. The controller 10 controls at least the motor 9.

The transmission mechanism 11 transmits rotational force of the motor 9 to the lifting member 8.

The case 12 accommodates therein the motor 9 and the controller 10. The case 12 is made of a synthetic resin. The case 12 accommodates therein at least a portion of the transmission mechanism 11. The case 12 is fixed to at least a portion of the pole 6. In the embodiment, the case 12 is fixed to a rear surface of the pole 6 by screws 38. The case 12 is fixed to a central portion in the up-down direction of the pole 6.

A battery pack 39 is mounted on the battery mounting portion 13. In the state of being mounted on the battery mounting portion 13, the battery pack 39 supplies power to the electronic equipment mounted on the lifter device 1. The battery pack 39 supplies the power to at least the motor 9. The battery pack 39 is removable from the battery mounting portion 13. That is, the battery pack 39 is detachably mountable on the battery mounting portion 13. The battery pack 39 is a battery pack for electric power tools. The battery pack 39 is charged while being removed from the battery mounting portion 13.

The battery mounting portion 13 is provided on the case 12. The battery mounting portion 13 is provided on an outer surface of the case 12. In the embodiment, the battery mounting portion 13 is provided on a right portion of the case 12.

The light unit 14 emits illumination light to illuminate the vicinity of the front of the lifting member 8. The light unit 14 may illuminate a place different from the vicinity of the front of the lifting member 8. The light unit 14 is disposed at the upper end of the pole 6.

The operation device 15 is operated by the user of the lifter device 1 to generate an operation signal to drive the motor 9. The operation device 15 transmits the generated operation signal to the controller 10. The operation device 15 is provided in the case 12.

The operation device 15 includes a plurality of buttons. The buttons are arranged on an upper surface of the case 12. The upper surface of the case 12 provided with the operation device 15 is inclined downward toward the rear. This inclination facilitates the user to operate the operation device 15. In the embodiment, the buttons include a power on/off button 15A, an up button 15B to cause the lifting member 8 to ascend (move up), a down button 15C to cause the lifting member 8 to descend (move down), and a light button 15D to start or stop the light unit 14.

The display device 16 includes a power display unit 16A that emits light when the power is on and does not emit light when the power is off, and a remaining capacity display unit 16B to display the remaining capacity of the battery pack 39. The remaining capacity display unit 16B includes an indicator having a plurality of light emitters. The number of the light emitters emitting light becomes large as the remaining capacity increases. The number of the light emitters not emitting light becomes small as the remaining capacity decreases.

The stop brake mechanism 17 prevents the rotation of the wheels 3. The stop brake mechanism 17 includes a brake member 40 disposed above the wheels 3, a brake lever 41 that is operated to move the brake member 40 in the up-down direction, a brake rod 42 connecting the brake member 40 to the brake lever 41, and a brake support member 43 by which the brake lever 41 is turnably supported. The brake member 40 includes a brake member 40L disposed above the wheel 3L and a brake member 40R disposed above the wheel 3R.

The locking mechanism 18 locks the turning of the pole 6. The pole 6 can turn so as to fall forward with respect to the traveling frame 2. The locking mechanism 18 locks the pole 6 to prevent the pole 6 from falling forward.

Battery Mounting Portion

Figure 11:
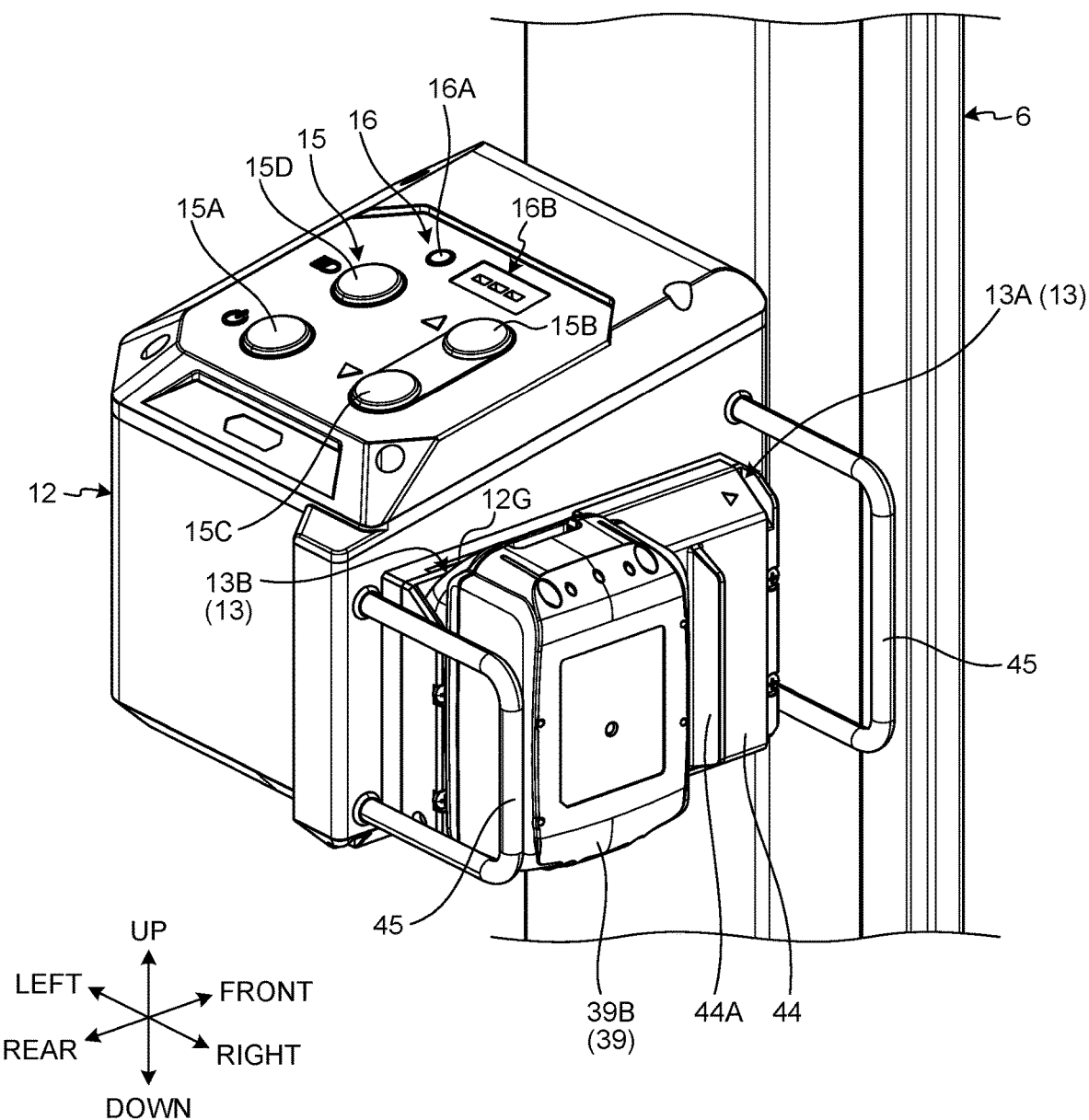
FIG. 11 is a perspective view from the rear side illustrating a portion of the lifter device according to the embodiment.

FIG. 11 is a perspective view from the rear side illustrating a portion of the lifter device 1 according to the embodiment. As illustrated in FIGS. 9 and 11, in the embodiment, the battery mounting portion 13 includes a first battery mounting portion 13A and a second battery mounting portion 13B. The second battery mounting portion 13B is disposed adjacent to the first battery mounting portion 13A. In the embodiment, the first and the second battery mounting portions 13A and 13B are arranged in the front-rear direction on an outer surface of the right portion of the case 12. The second battery mounting portion 13B is disposed more rearward than the first battery mounting portion 13A.

The battery pack 39 includes a first battery pack 39A that is mounted on the first battery mounting portion 13A and a second battery pack 39B that is mounted on the second battery mounting portion 13B. The first battery pack 39A having a first rated voltage is mounted on the first battery mounting portion 13A. The second battery pack 39B having a second rated voltage is mounted on the second battery mounting portion 13B. As an example, the first rated voltage of the first battery pack 39A is 36 V. The second rated voltage of the second battery pack 39B is 18 V.

The case 12 supports a cover member 44 that covers either the first battery mounting portion 13A or the second battery mounting portion 13B. The cover member 44 covers the second battery mounting portion 13B when the first battery pack 39A is mounted on the first battery mounting portion 13A, and covers the first battery mounting portion 13A when the second battery pack 39B is mounted on the second battery mounting portion 13B. The cover member 44 is slidably supported by the case 12. A guide groove 12G for guiding the cover member 44 in the front-rear direction is formed in the right portion of the case 12. The guide groove 12G extends in the front-rear direction. The cover member 44 slides in the front-rear direction while being guided by the guide groove 12G. The user of the lifter device 1 can move the cover member 44 in the front-rear direction by pinching a projection 44A provided on the cover member 44 with user's fingers.

As illustrated in FIG. 9, the cover member 44 slides backward so as to cover the second battery mounting portion 13B with the cover member 44 and expose the first battery mounting portion 13A. The first battery pack 39A is mounted onto the first battery mounting portion 13A by being inserted into the first battery mounting portion 13A from above.

As illustrated in FIG. 11, the cover member 44 slides forward so as to cover the first battery mounting portion 13A with the cover member 44 and expose the second battery mounting portion 13B. The second battery pack 39B is mounted onto the second battery mounting portion 13B by being inserted into the second battery mounting portion 13B from above.

In the embodiment, the relative positions of the first battery mounting portion 13A and the second battery mounting portion 13B are defined such that the second battery pack 39B is not allowed to be mounted on the second battery mounting portion 13B when the first battery pack 39A is mounted on the first battery mounting portion 13A, and the first battery pack 39A is not allowed to be mounted on the first battery mounting portion 13A when the second battery pack 39B is mounted on the second battery mounting portion 13B. This configuration prevents the two battery packs 39 from being mounted at the same time, for example, even if the cover member 44 is not present.

Guards 45 are provided in front of and behind the battery mounting portion 13. The guards 45 are provided so as to project rightward from the outer surface of the right portion of the case 12. The guards 45 prevent objects around the lifter device 1 from contacting the battery pack 39 or the battery mounting portion 13.

Stop Brake Mechanism

Figure 12:
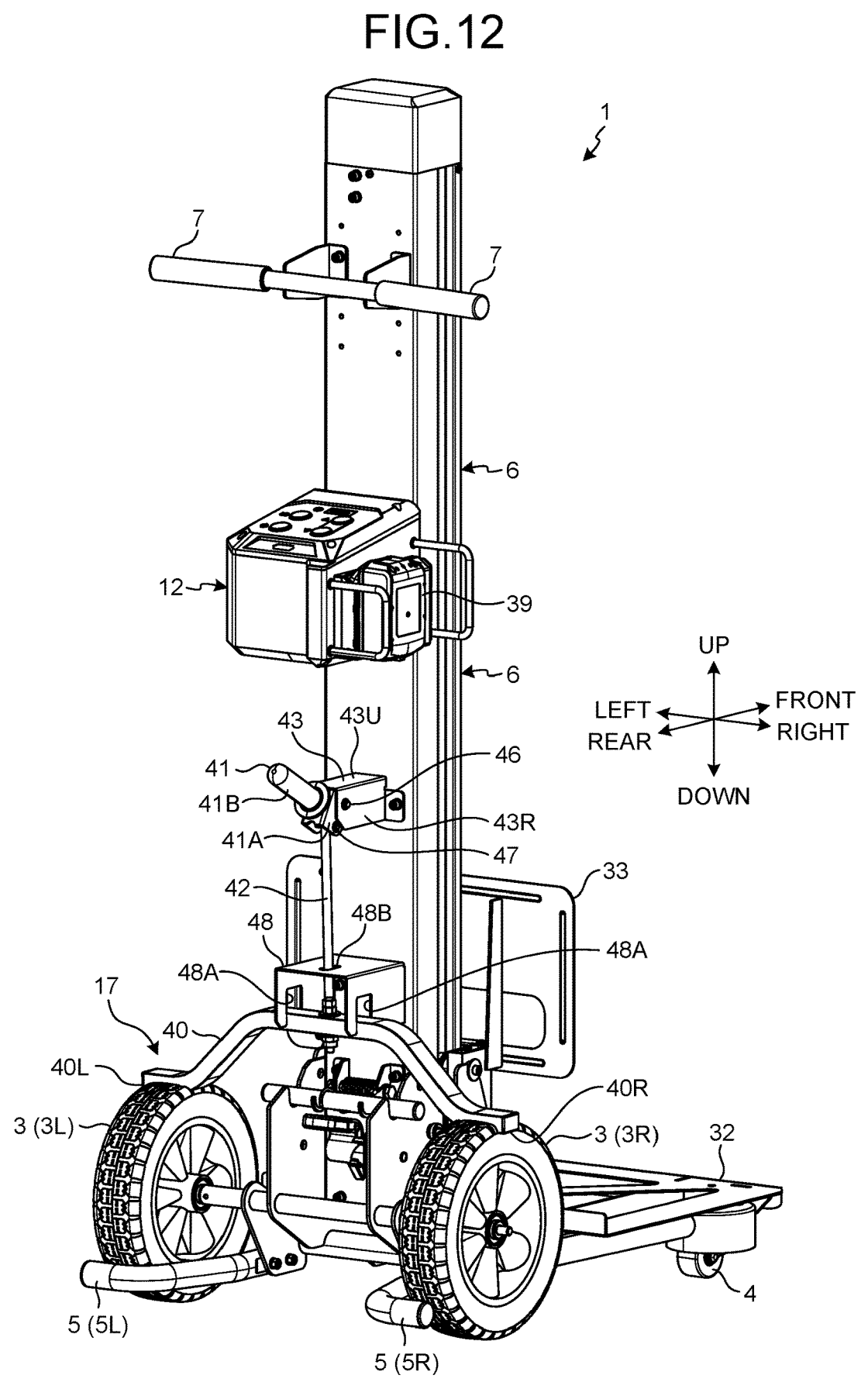
Figure 13:
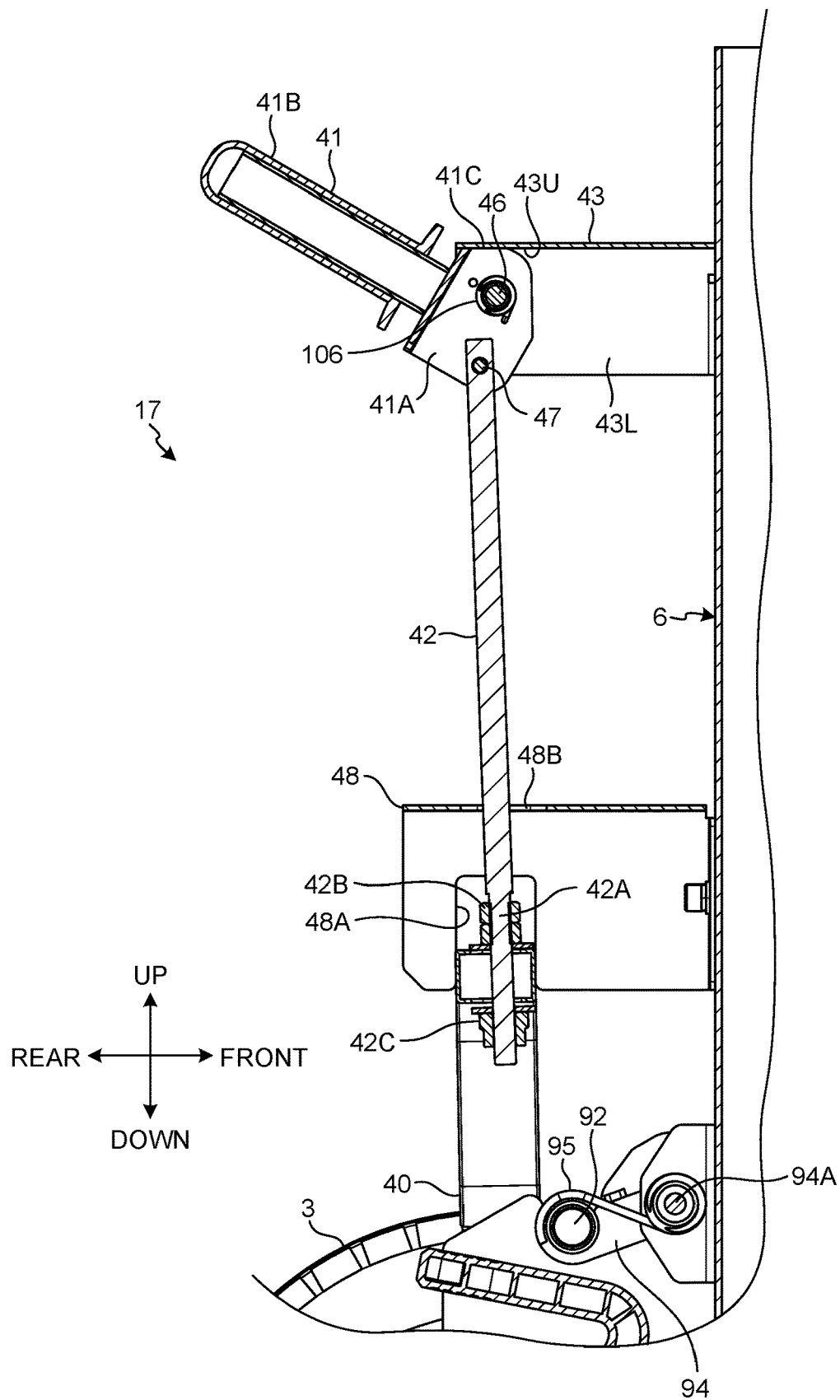
FIG. 13 is a sectional view illustrating the stop brake mechanism according to the embodiment.

FIG. 12 is a perspective view from the rear side illustrating the stop brake mechanism 17 according to the embodiment. FIG. 13 is a sectional view illustrating the stop brake mechanism 17 according to the embodiment.

The stop brake mechanism 17 includes the brake member 40 disposed above the wheels 3, the brake lever 41 that is operated to move the brake member 40, the brake rod 42 connecting the brake member 40 to the brake lever 41, and the brake support member 43 by which the brake lever 41 is turnably supported.

The brake lever 41 includes a cam 41A rotatably supported by the brake support member 43 with a shaft 46 interposed therebetween, and a handle 41B.

The upper end of the brake rod 42 is connected to the cam 41A with a pivot 47 interposed therebetween.

The brake support member 43 is fixed to the rear surface of the pole 6. The brake support member 43 includes a left plate 43L disposed on the left side of the cam 41A, a right plate 43R disposed on the right side of the cam 41A, and an upper plate 43U that is disposed so as to connect the upper end of the left plate 43L to the upper end of the right plate 43R. The left end of the shaft 46 is supported by the left plate 43L and the right end of the shaft 46 is supported by the right plate 43R.

The user of the lifter device 1 can grip the handle 41B with a hand to rotate the cam 41A. As illustrated in FIGS. 12 and 13, when the cam 41A is rotated so as to move the handle 41B upward, the brake rod 42 moves down. When the brake rod 42 moves down, the brake member 40 moves down to bring the brake member 40L into contact with the wheel 3L to press the wheel 3L from above, and to bring the brake member 40R into contact with the wheel 3R to press the wheel 3R from above. With this operation, the rotation of the wheels 3 is prevented and the stop brake is applied. A cam surface 41C of the cam 41A contacts the upper plate 43U of the brake support member 43 while the stop brake is applied. Therefore, the cam 41A is prevented from unintentionally rotating while the stop brake is applied.

As illustrated in FIG. 2, when the cam 41A is rotated so as to move the handle 41B downward, the brake rod 42 moves up. When the brake rod 42 moves up, the brake member 40 moves up so as to separate from the wheels 3. This operation releases the brake. As illustrated in FIG. 13, a torsion spring 106 is disposed around the shaft 46. The torsion spring 106 generates an elastic force so as to move the handle 41B downward. The torsion spring 106 generates the elastic force so as to move the handle 41B downward while the brake is applied. Therefore, the cam 41A is prevented from unintentionally rotating while the brake is applied.

As illustrated in FIG. 13, a threaded portion 42A is provided on a lower portion of the brake rod 42. Nuts 42B and 42C are disposed around the threaded portion 42A. The brake member 40 is fixed to the brake rod 42 with the nuts 42B and 42C. Rotating the nuts 42B and 42C can move the brake member 40 in the up-down direction relative to the brake rod 42. As a result, the initial position of the brake member 40 is adjusted. Adjusting the initial position of the brake member 40 adjusts the degree of braking effectiveness of the stop brake mechanism 17.

A guard 48 is disposed between the brake member 40 and the brake support member 43 in the upper-lower direction. The guard 48 is fixed to the rear surface of the pole 6. A recess 48A is formed in each of right and left plates of the guard 48. While the brake is released, at least a portion of the brake member 40 is disposed in the recess 48A. An opening 48B where at least a portion of the brake rod 42 is disposed is formed in an upper plate of the guard 48.

Transmission Mechanism

Figure 14:
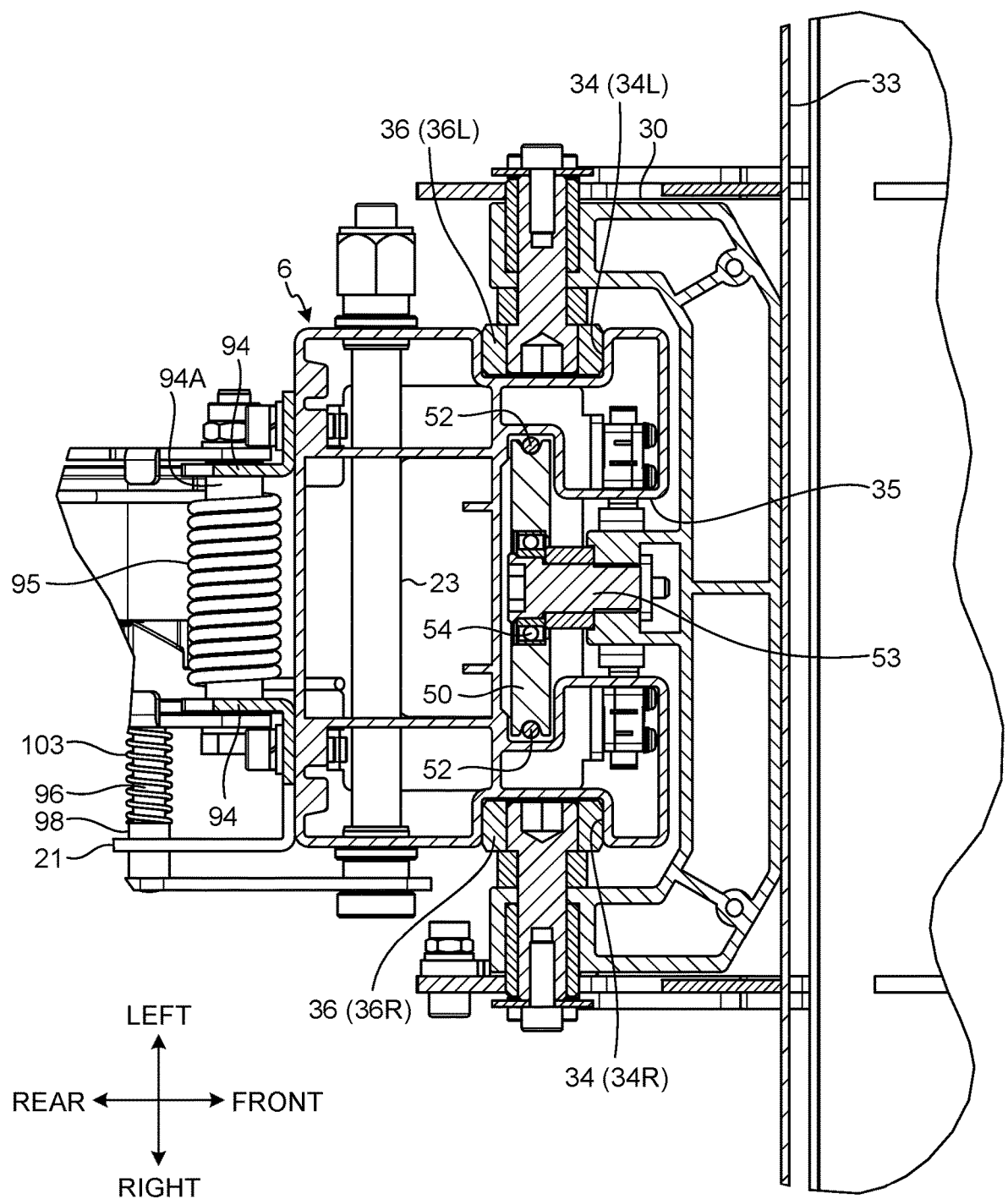
FIG. 14 is a sectional view illustrating a portion of the lifter device according to the embodiment.
Figure 15:
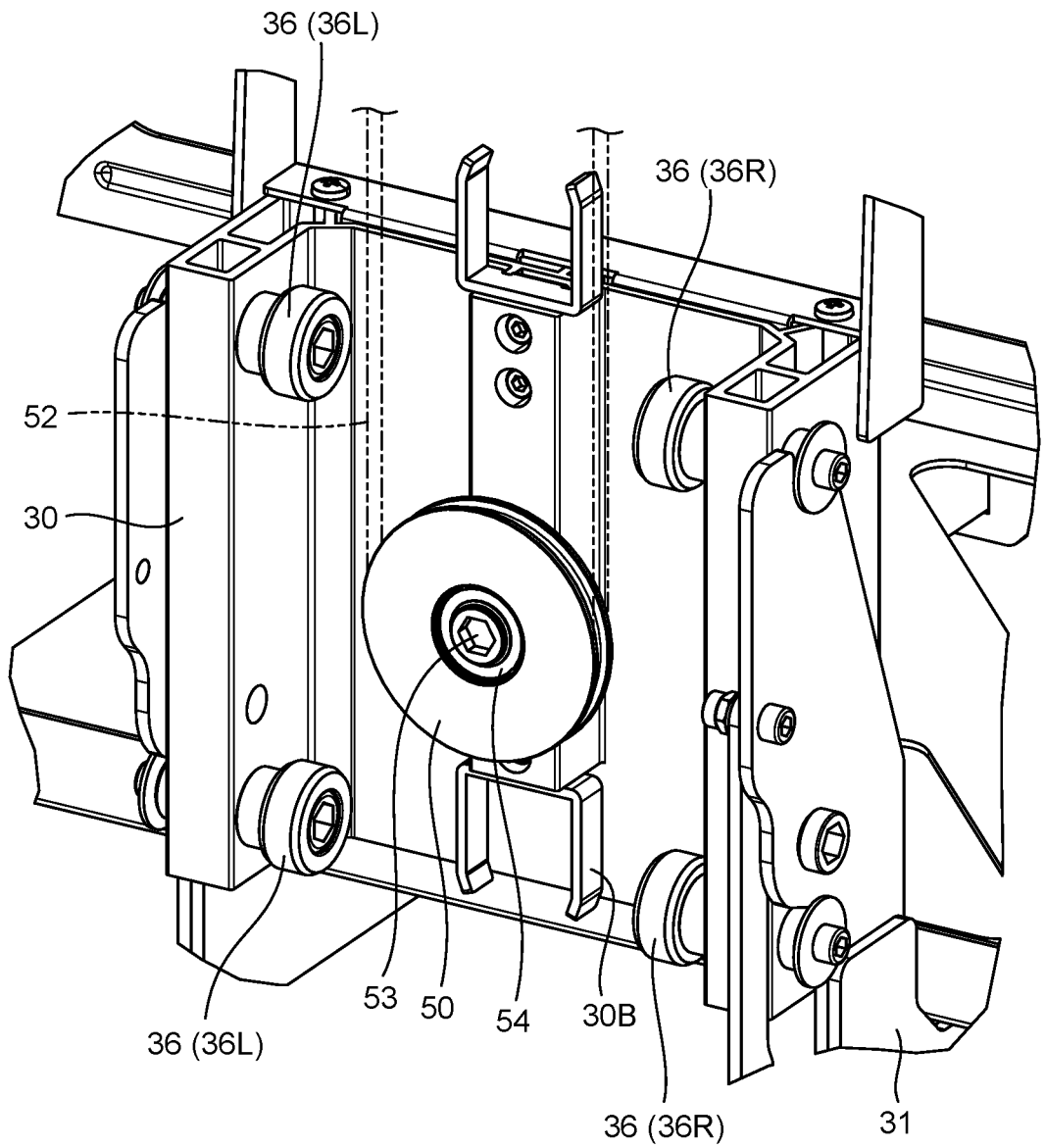
FIG. 15 is a perspective view from the rear side illustrating a slider according to the embodiment.
Figure 16:
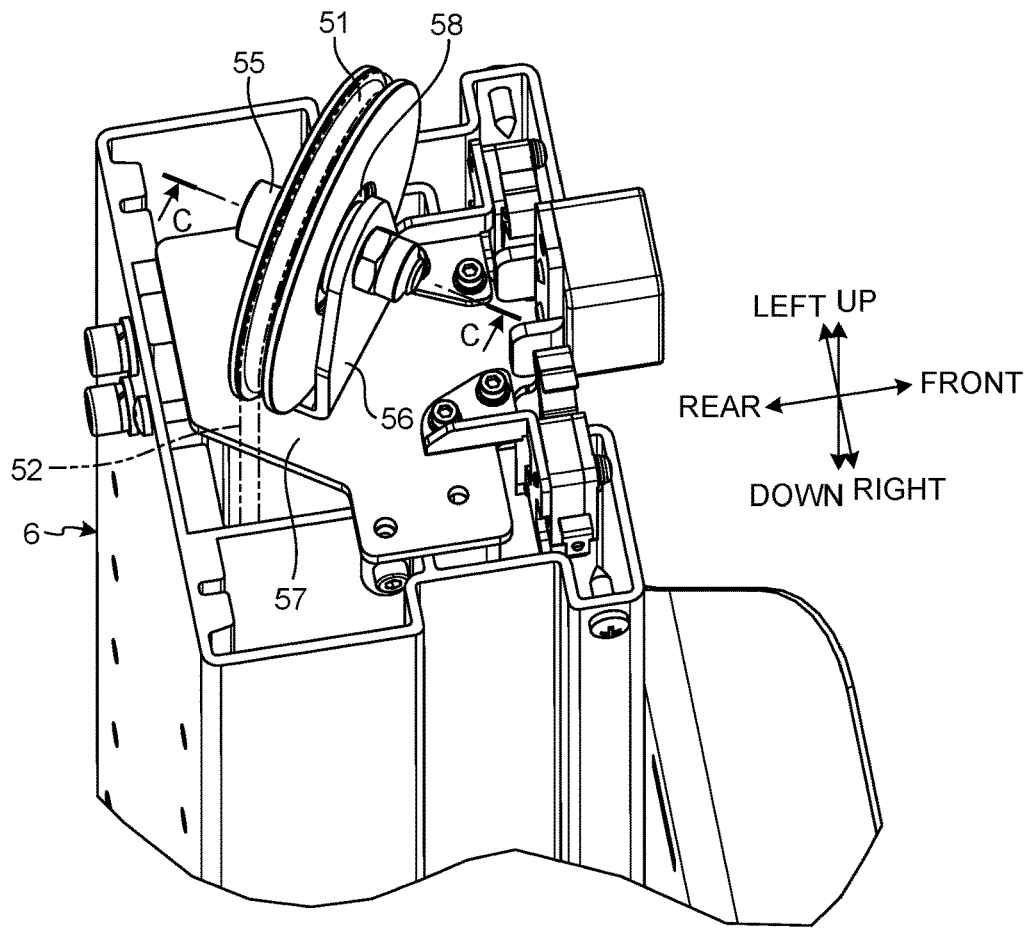
FIG. 16 is a perspective view from an upper side illustrating an upper end of a pole according to the embodiment.
Figure 17:
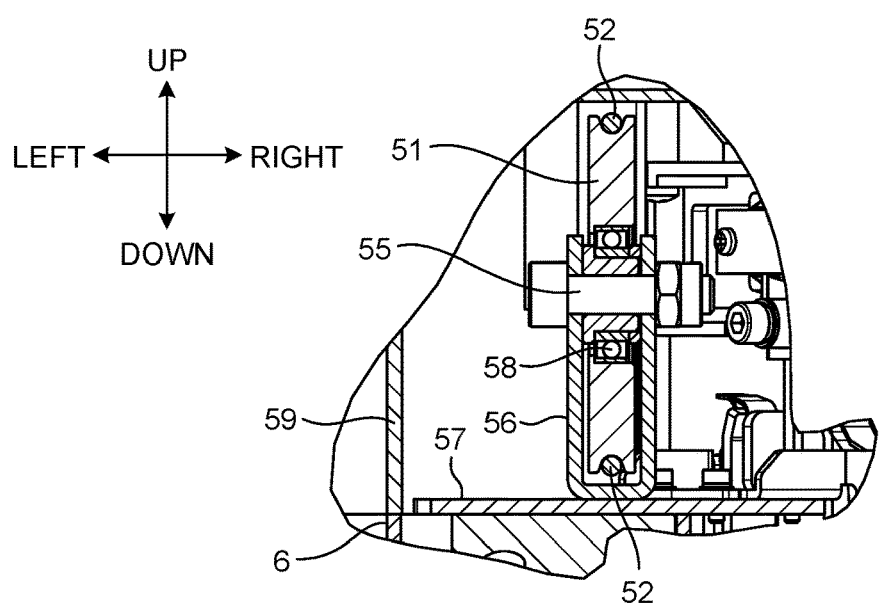
FIG. 17 is a sectional view illustrating a portion of the lifter device according to the embodiment.
Figure 18:
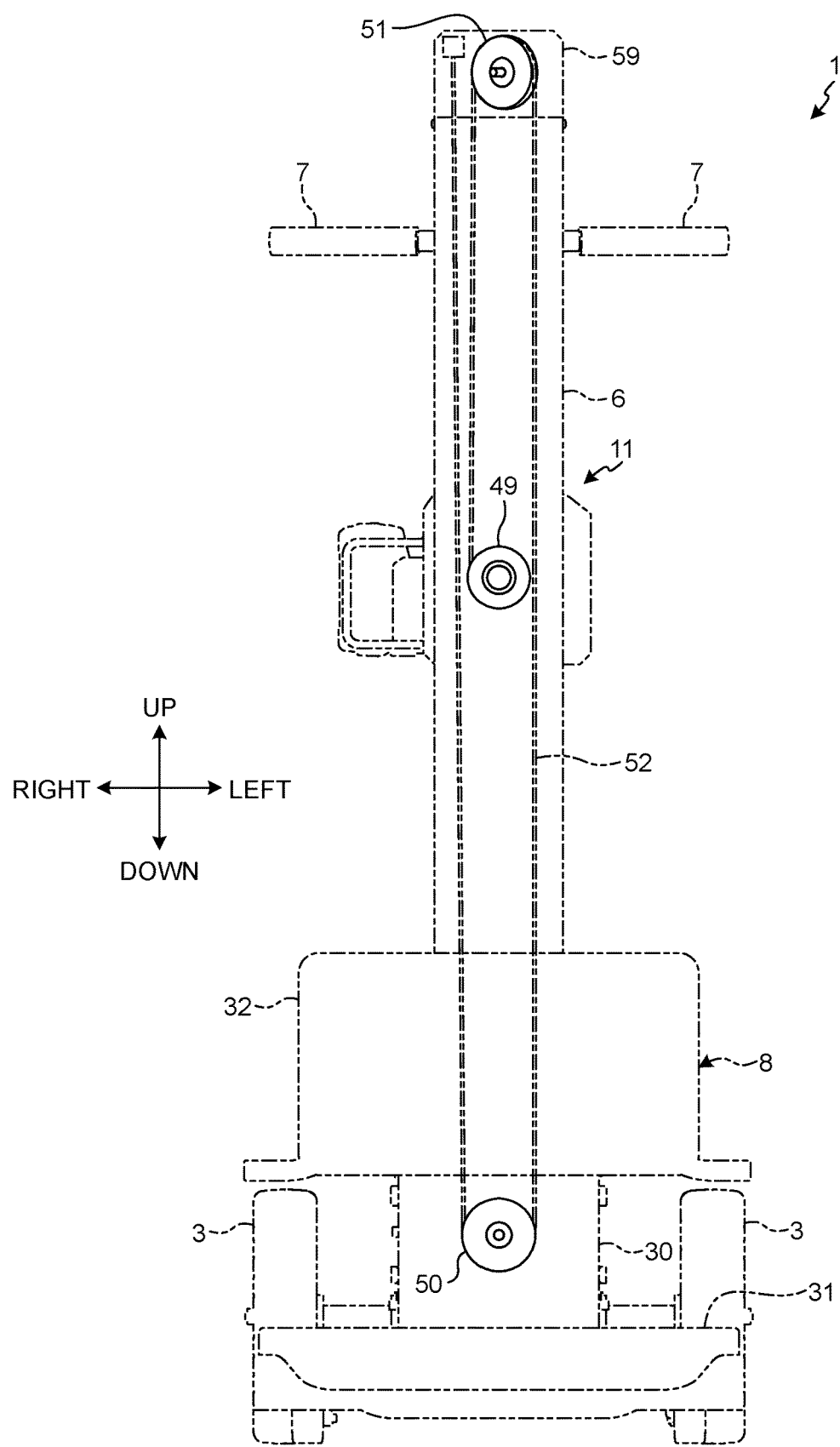
FIG. 18 is a front view schematically illustrating a transmission mechanism according to the embodiment.

FIG. 14 is a sectional view illustrating a portion of the lifter device 1 according to the embodiment, and corresponds to a B-B line sectional view of FIG. 2. FIG. 15 is a perspective view from the rear side illustrating the slider 30 according to the embodiment. FIG. 16 is a perspective view from an upper side illustrating the upper end of the pole 6 according to the embodiment. FIG. 17 is a sectional view illustrating a portion of the lifter device 1 according to the embodiment, and corresponds to a C-C line sectional view of FIG. 16. FIG. 18 is a front view schematically illustrating the transmission mechanism 11 according to the embodiment.

The transmission mechanism 11 includes a rotating body 49 configured to be rotated by the motor 9, a lifting pulley 50 rotatably supported by the lifting member 8, a pole pulley 51 rotatably fixed to the upper end of the pole 6, and a wire 52 hung on the lifting pulley 50 and the pole pulley 51. The wire 52 is movable in the up-down direction. One end of the wire 52 is fixed to a fixing member provided at the upper end of the pole 6. The other end of the wire 52 is fixed to the rotating body 49.

As illustrated in, for example, FIG. 10, the rotating body 49 is disposed in an internal space of the pole 6. The rotating body 49 is rotatably supported by the pole 6.

The lifting pulley 50 is supported by a shaft member 53 fixed to the slider 30. The shaft member 53 is disposed so as to project backward from the front of the slider 30. At least a portion of the shaft member 53 is disposed in the guide opening 35 of the pole 6. The rear end of the shaft member 53 is disposed in the internal space of the pole 6. The lifting pulley 50 is supported by the slider 30 with the shaft member 53 interposed therebetween. A bearing 54 is disposed around the shaft member 53. The lifting pulley 50 is rotatably supported by the shaft member 53 with the bearing 54 interposed therebetween. The lifting pulley 50 is disposed in the internal space of the pole 6. The lifting pulley 50 rotates in the internal space of the pole 6. The lifting pulley 50 ascends and descends in the internal space of the pole 6.

The pole pulley 51 is supported by a shaft member 55 disposed at the upper end of the pole 6. The shaft member 55 is supported by a bracket 56. The bracket 56 is fixed to a support plate 57 fixed to the upper end of the pole 6. The pole pulley 51 is supported at the upper end of the pole 6 with the shaft member 55, the bracket 56, and the support plate 57 interposed therebetween. A bearing 58 is disposed around the shaft member 55. The pole pulley 51 is rotatably supported by the shaft member 55 with the bearing 58 interposed therebetween.

As illustrated in, for example, FIG. 1, a cover 59 is disposed at the upper end of the pole 6. The cover 59 is attached at the upper end of the pole 6 so as to cover the pole pulley 51. FIG. 16 illustrates the upper end of the pole 6 with the cover 59 removed therefrom.

As illustrated in FIG. 18, one end of the wire 52 is fixed to the fixing member provided at the upper end of the pole 6. The other end of the wire 52 is fixed to the rotating body 49. A first intermediate portion of the wire 52 near the one end of the wire 52 is hung on the lifting pulley 50. A second intermediate portion of the wire 52 between the first intermediate portion of the wire 52 and the other end of the wire 52 is hung on the pole pulley 51. In the embodiment, the rotating body 49 winds and unwinds the wire 52, whereby the lifting member 8 ascends and descends.

Figure 19:
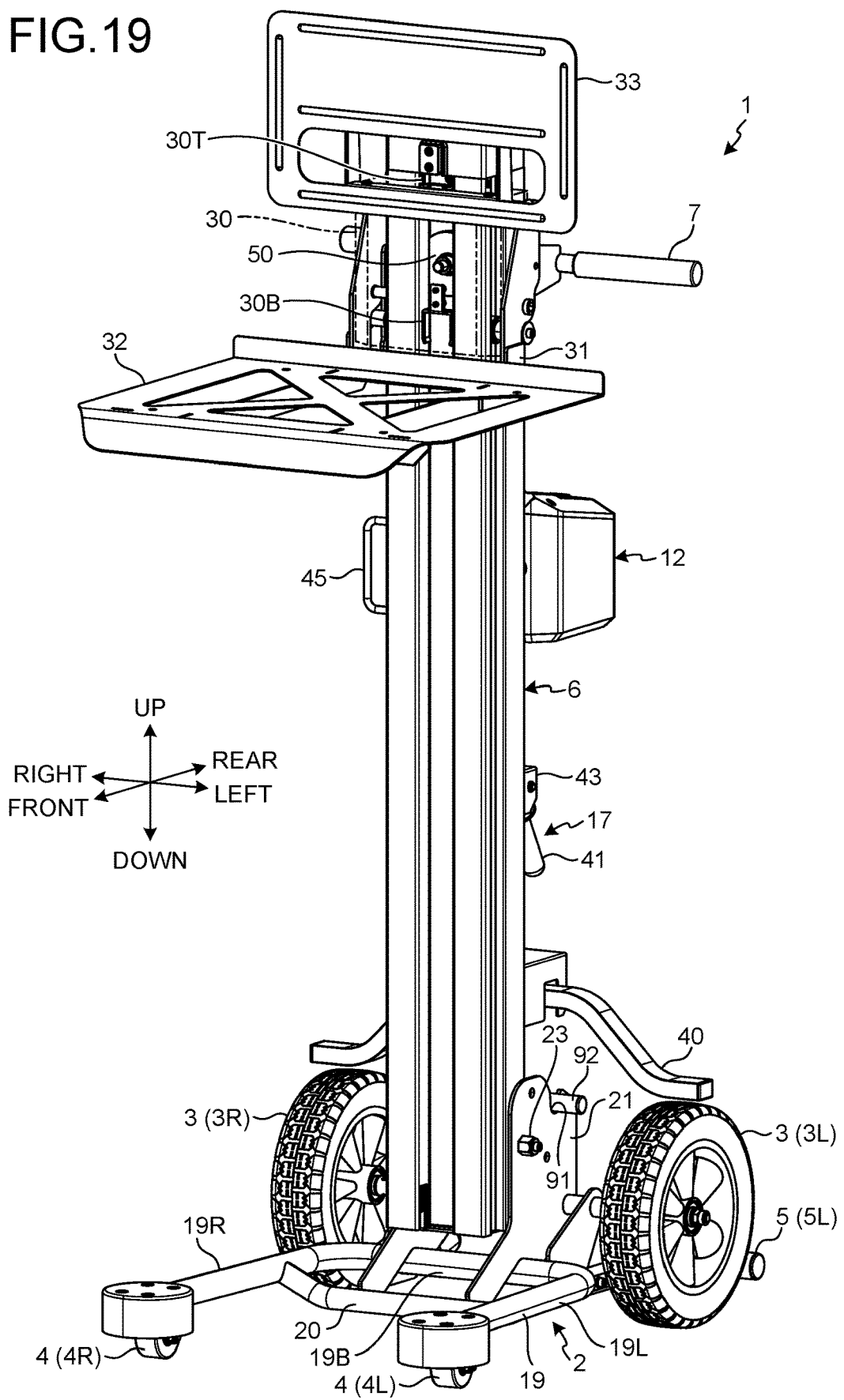
FIG. 19 is a perspective view from the front side illustrating the lifter device according to the embodiment.

FIG. 19 is a perspective view from the front side illustrating the lifter device 1 according to the embodiment. When the motor 9 rotates in one direction to rotate the rotating body 49 in the one direction, the rotating body 49 winds the wire 52. As the rotating body 49 rotates to wind the wire 52, the lifting pulley 50 ascends. As the lifting pulley 50 ascends, the lifting member 8 connected to the lifting pulley 50 ascends as illustrated in FIG. 19.

When the motor 9 rotates in the other direction different from the one direction to rotate the rotating body 49 in the other direction, the rotating body 49 unwinds the wire 52. As the rotating body 49 rotates to unwind the wire 52, the lifting pulley 50 descends. As the lifting pulley 50 descends, the lifting member 8 connected to the lifting pulley 50 descends, as illustrated in, for example, FIG. 1.

Limit Sensors

Figure 20:
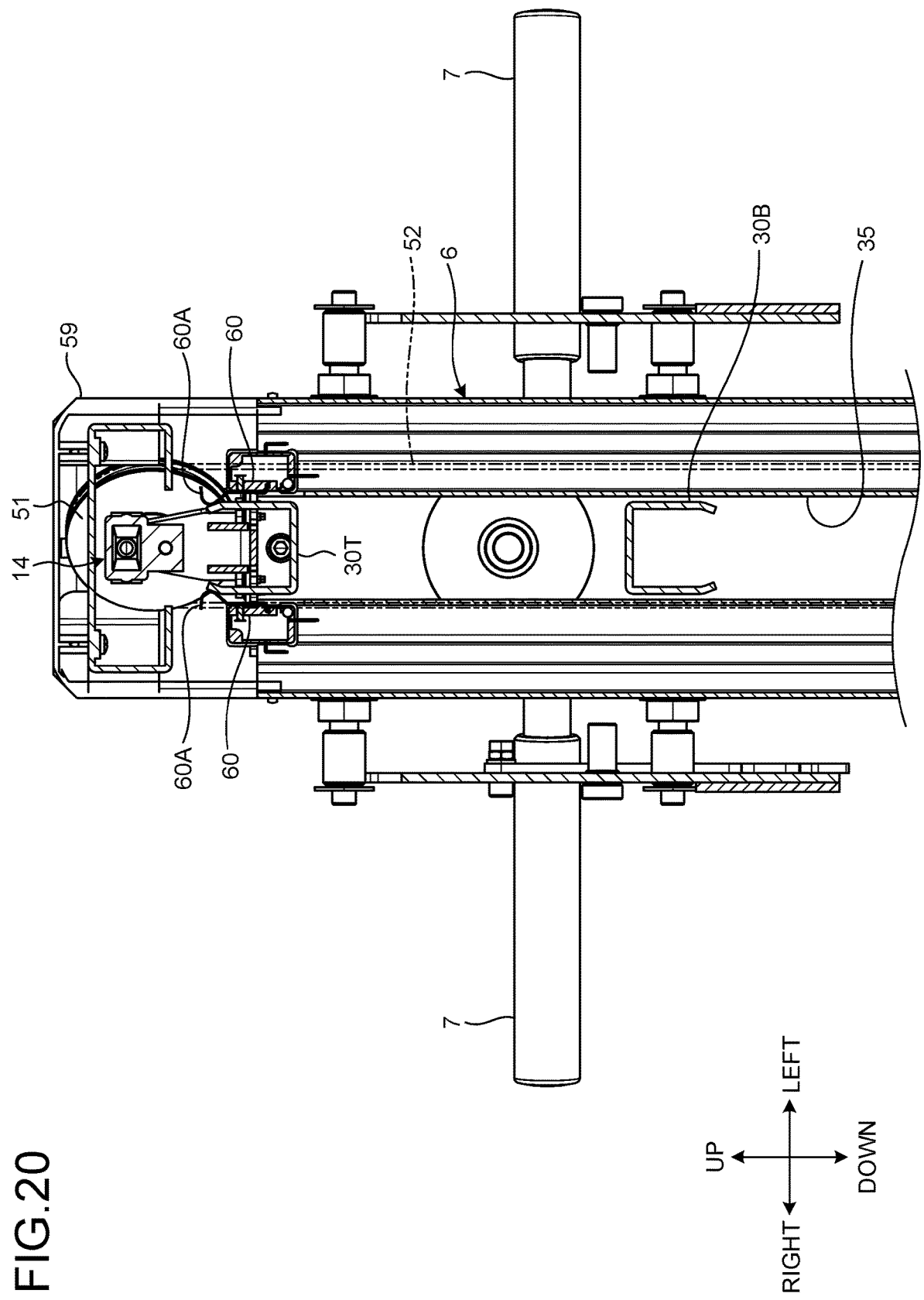
FIG. 20 is a sectional view illustrating an upper portion of the pole according to the embodiment.
Figure 21:
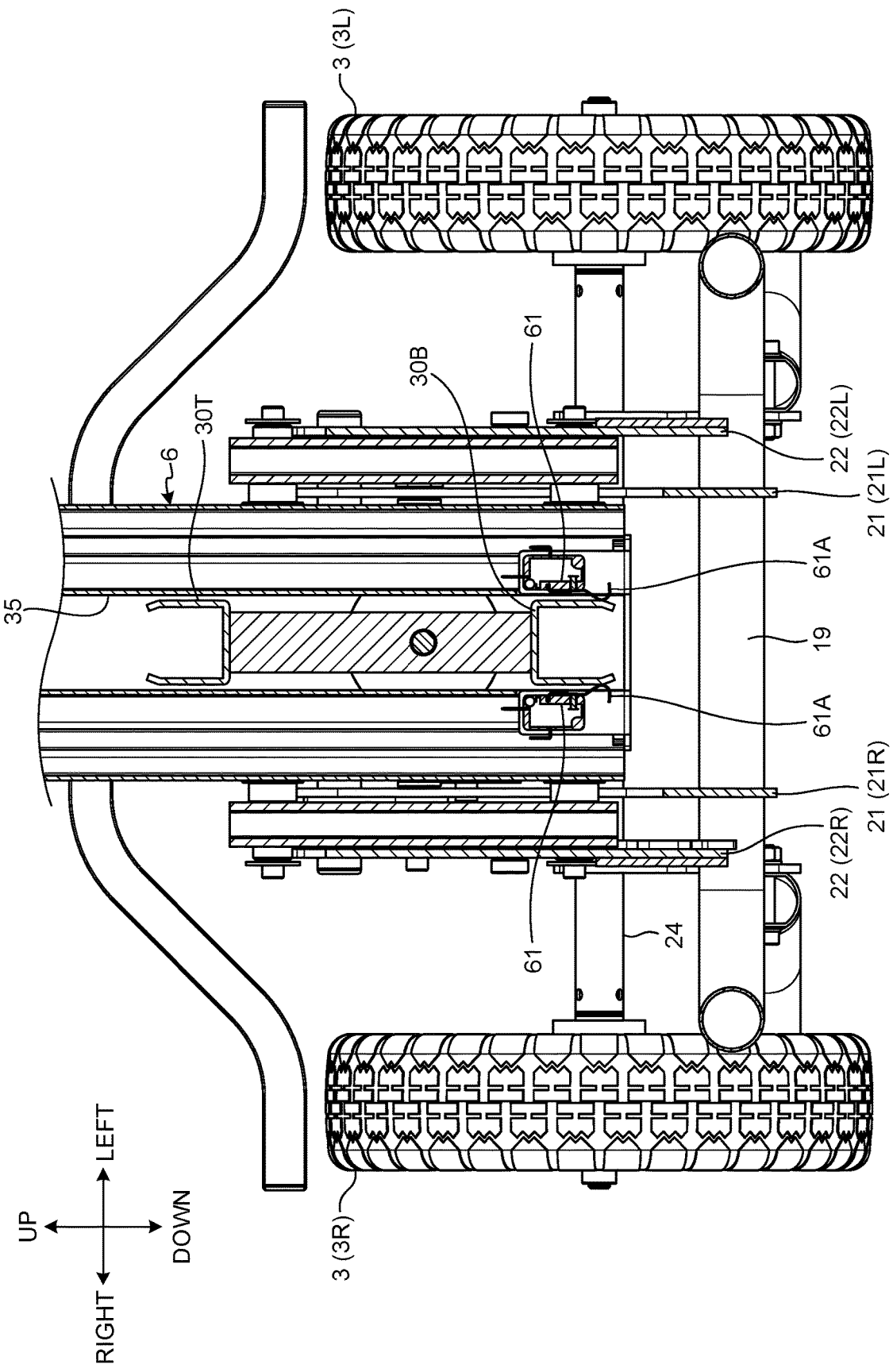
FIG. 21 is a sectional view illustrating a lower portion of the pole according to the embodiment.

FIG. 20 is a sectional view illustrating the upper portion of the pole 6 according to the embodiment. FIG. 21 is a sectional view illustrating the lower portion of the pole 6 according to the embodiment. As illustrated in FIGS. 20 and 21, the slider 30 includes an upper contact member 30T and a lower contact member 30B. Each of the upper contact member 30T and lower contact member 30B is disposed in the guide opening 35 of the pole 6. As the slider 30 ascends and descends, each of the upper contact member 30T and lower contact member 30B ascends and descends in the guide opening 35 together with the slider 30.

In the embodiment, the lifter device 1 includes upper limit sensors 60 and lower limit sensors 61.

The upper limit sensors 60 are disposed at the upper end of the pole 6. Each of the upper limit sensors 60 includes a contactor 60A disposed in a position contactable with the upper contact member 30T. The upper limit sensor 60 including the contactor 60A is disposed on each of the right and left sides of the upper contact member 30T.

The lower limit sensors 61 are disposed at the lower end of the pole 6. Each of the lower limit sensors 61 includes a contactor 61A disposed in a position contactable with the lower contact member 30B. The lower limit sensor 61 including the contactor 61A is disposed on each of the right and left sides of the lower contact member 30B.

When the lifting member 8 ascends, the upper contact member 30T of the slider 30 makes contact with the contactor 60A of the upper limit sensor 60. The upper limit sensor 60 transmits, to the controller 10, a detection signal indicating that the upper contact member 30T has made contact with the contactor 60A. The controller 10 stops the motor 9 based on the detection signal from the upper limit sensor 60. When the controller 10 has received the detection signal indicating that the upper contact member 30T has made contact with the contactor 60A, the controller 10 stops the motor 9 even if the up button 15B is operated.

When the lifting member 8 descends, the lower contact member 30B of the slider 30 makes contact with the contactor 61A of the lower limit sensor 61. The lower limit sensor 61 transmits, to the controller 10, a detection signal indicating that the lower contact member 30B has made contact with the contactor 61A. The controller 10 stops the motor 9 based on the detection signal from the lower limit sensor 61. When the controller 10 has received the detection signal indicating that the lower contact member 30B has made contact with the contactor 61A, the controller 10 stops the motor 9 even if the down button 15C is operated.

Light Unit

Figure 22:
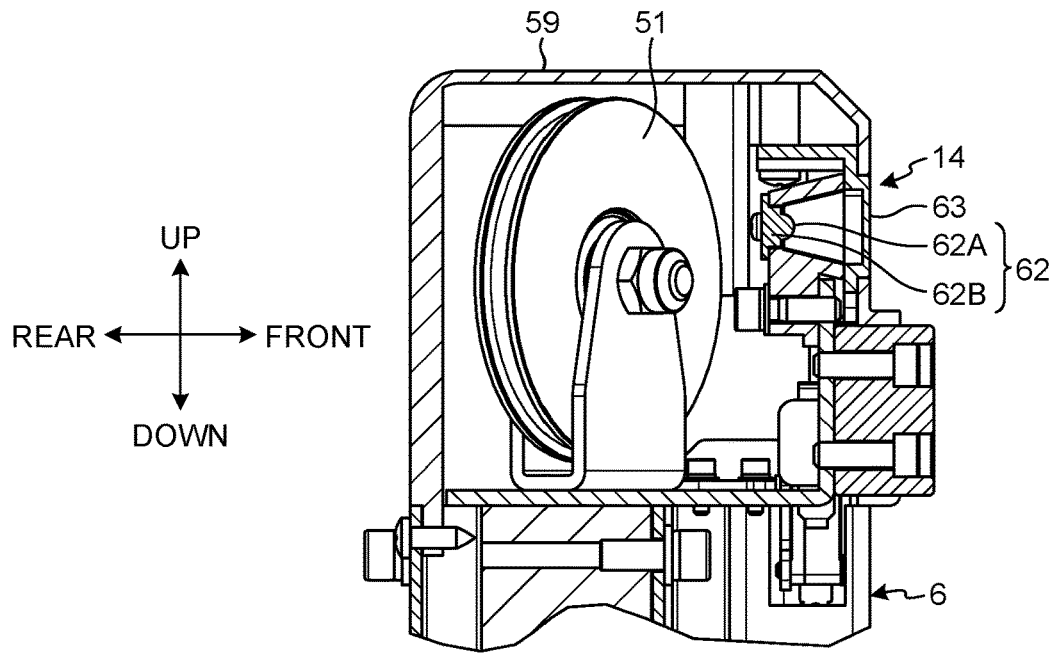
FIG. 22 is a sectional view illustrating the upper portion of the pole according to the embodiment.
Figure 23:
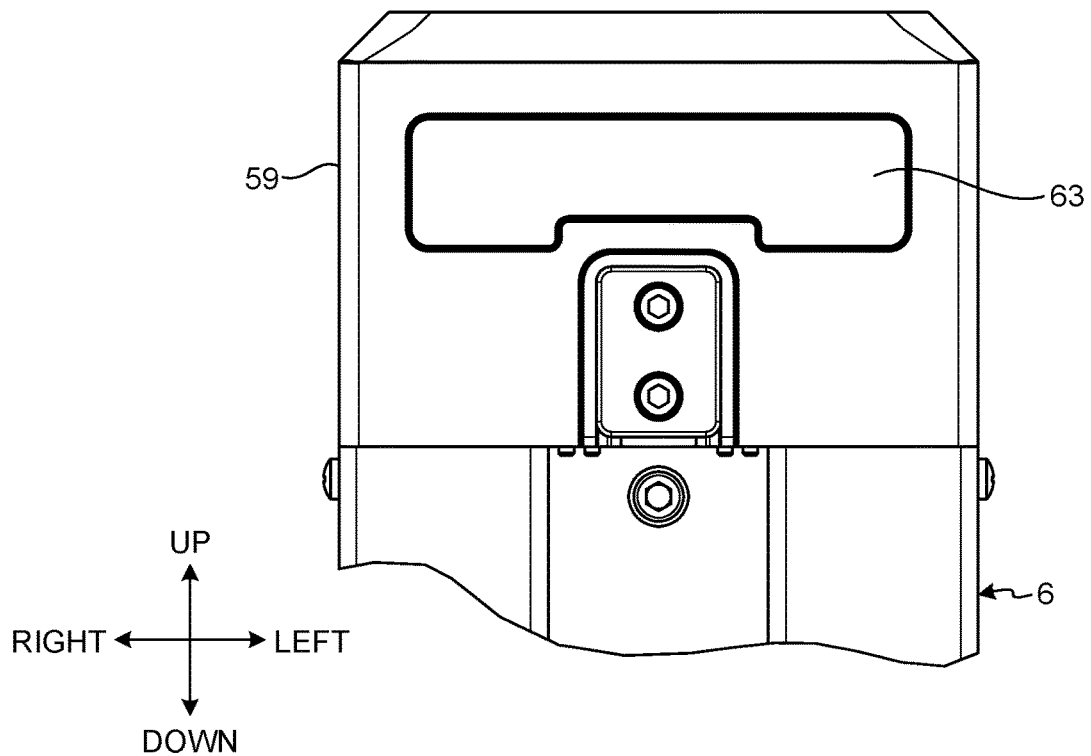
FIG. 23 is a front view illustrating the upper portion of the pole according to the embodiment.

FIG. 22 is a sectional view illustrating the upper portion of the pole 6 according to the embodiment. FIG. 23 is a front view illustrating the upper portion of the pole 6 according to the embodiment.

The light unit 14 emits the illumination light to illuminate the front of the lifting member 8. The light unit 14 is disposed at the upper end of the pole 6. The light unit 14 includes a light emitter 62 and a light-transmitting member 63. The light emitter 62 includes a light-emitting element 62A, and a circuit board 62B on which the light-emitting element 62A is mounted. A light-emitting diode is exemplified as the light-emitting element 62A. The light-transmitting member 63 is disposed in front of the light emitter 62. The light-transmitting member 63 may be a lens or a transparent cover that does not have a lens function. The light-transmitting member 63 may be formed of a light-diffusing resin. The illumination light emitted from the light-emitting element 62A is emitted toward the front of the light unit 14 through the light-transmitting member 63.

Reduction Mechanism

Figure 24:
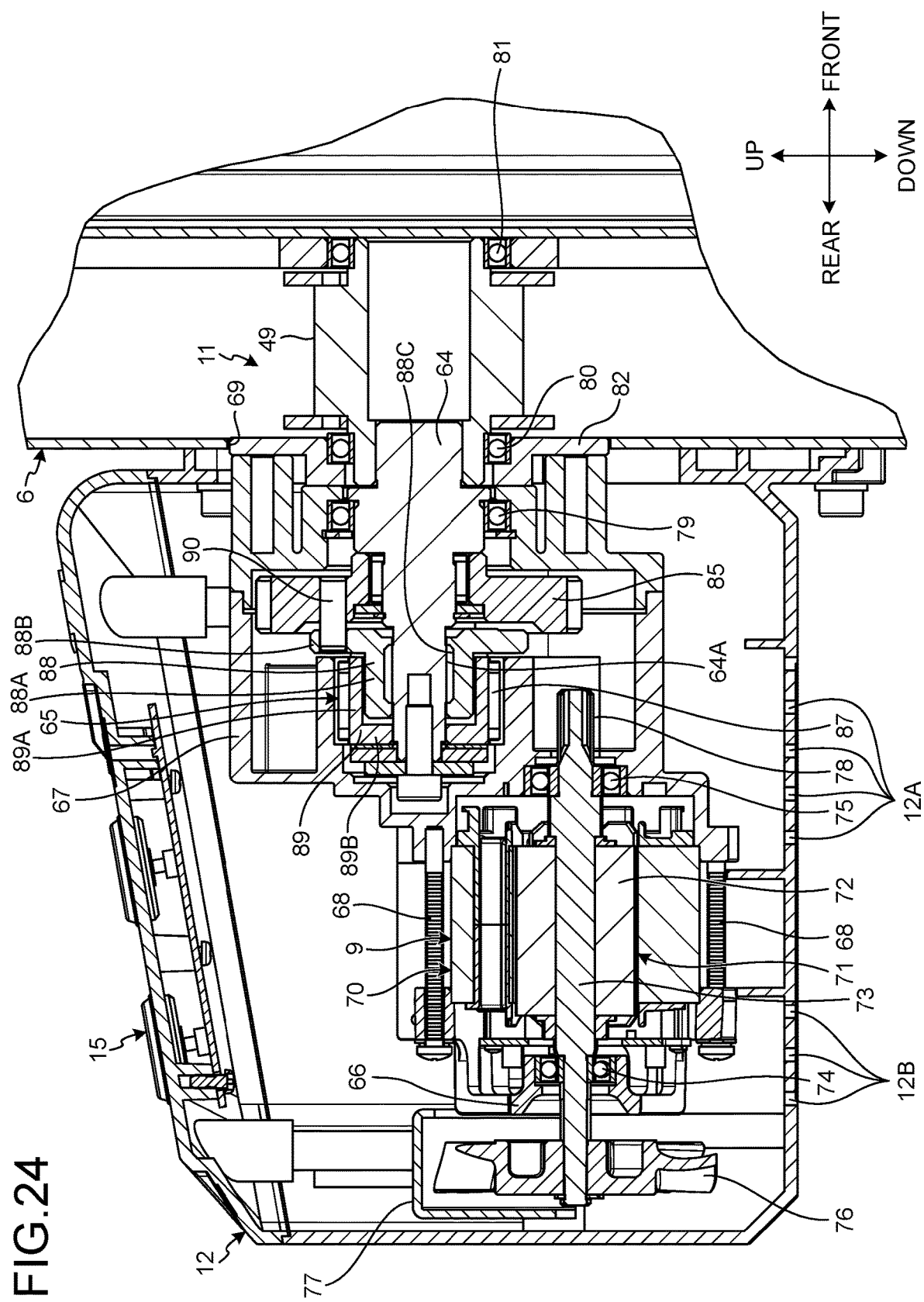
FIG. 24 is a sectional view illustrating a portion of the transmission mechanism according to the embodiment.

FIG. 24 is a sectional view illustrating a portion of the transmission mechanism 11 according to the embodiment, and corresponds to a D-D line sectional view of FIG. 9.

As illustrated in FIG. 24, the case 12 accommodates therein the motor 9 and a portion of the transmission mechanism 11. The transmission mechanism 11 includes the rotating body 49, a spindle 64 connected to the rotating body 49, and a reduction mechanism 65 that transmits the rotation of the motor 9 to the spindle 64.

The reduction mechanism 65 is accommodated in a gear case 67. The case 12 accommodates the motor 9, the reduction mechanism 65, and the gear case 67. The motor 9, a bearing box 66, and the gear case 67 are fixed by screws 68. The gear case 67 is fixed to the rear portion of the pole 6.

At least a portion of the spindle 64 is accommodated in the case 12. The gear case 67 is disposed between the spindle 64 and the case 12. The rotating body 49 is accommodated in the internal space of the pole 6. An opening 69 is formed in the rear portion of the pole 6. The opening 69 connects the internal space of the pole 6 to the external space. The spindle 64 is connected to the rotating body 49 through the opening 69.

The motor 9 is an inner rotor brushless motor. The motor 9 includes a stator 70 and a rotor 71. The rotor 71 is disposed in the stator 70.

The rotor 71 includes a rotor core 72 and a rotor shaft 73. The rotor core 72 is disposed around the rotor shaft 73. The rotor shaft 73 is fixed to the rotor core 72. A rear portion of the rotor shaft 73 is rotatably supported by a bearing 74. A front portion of the rotor shaft 73 is rotatably supported by a bearing 75. The bearing 74 is supported by the bearing box 66. The bearing 75 is supported by the gear case 67.

A fan 76 is fixed to the rear end of the rotor shaft 73. The fan 76 rotates together with the rotor shaft 73. The rotation of the fan 76 generates airflow for cooling the motor 9. An upper portion of the fan 76 is covered with a fan cover 77. Air inlet ports 12A and air outlet ports 12B are provided at a lower portion of the case 12. The air inlet ports 12A are provided more frontward of the air outlet ports 12B. When the fan 76 rotates, air around the case 12 flows into the internal space of the case 12 through the air inlet ports 12A. The air that has flowed into the internal space of the case 12 contacts each of the stator 70 and the rotor 71 of the motor 9, cools the stator 70 and the rotor 71, passes through the fan 76, and then is discharged from the internal space of the case 12 through the air outlet ports 12B to the external space.

An input gear 78 is provided at the front end of the rotor shaft 73. The reduction mechanism 65 is connected to the rotor shaft 73 of the motor 9. The reduction mechanism 65 decelerates the rotation of the rotor shaft 73, and rotates the spindle 64 at a lower rotational speed than that of the rotor shaft 73. The rotation of the spindle 64 rotates the rotating body 49.

The spindle 64 is rotatably supported by a bearing 79. The bearing 79 is supported by the gear case 67. The rotating body 49 is rotatably supported by bearings 80 and 81. The bearing 80 is supported by the pole 6 with a bush 82 interposed therebetween. The bush 82 is disposed in the opening 69. The bearing 81 is supported by the pole 6.

Figure 25:
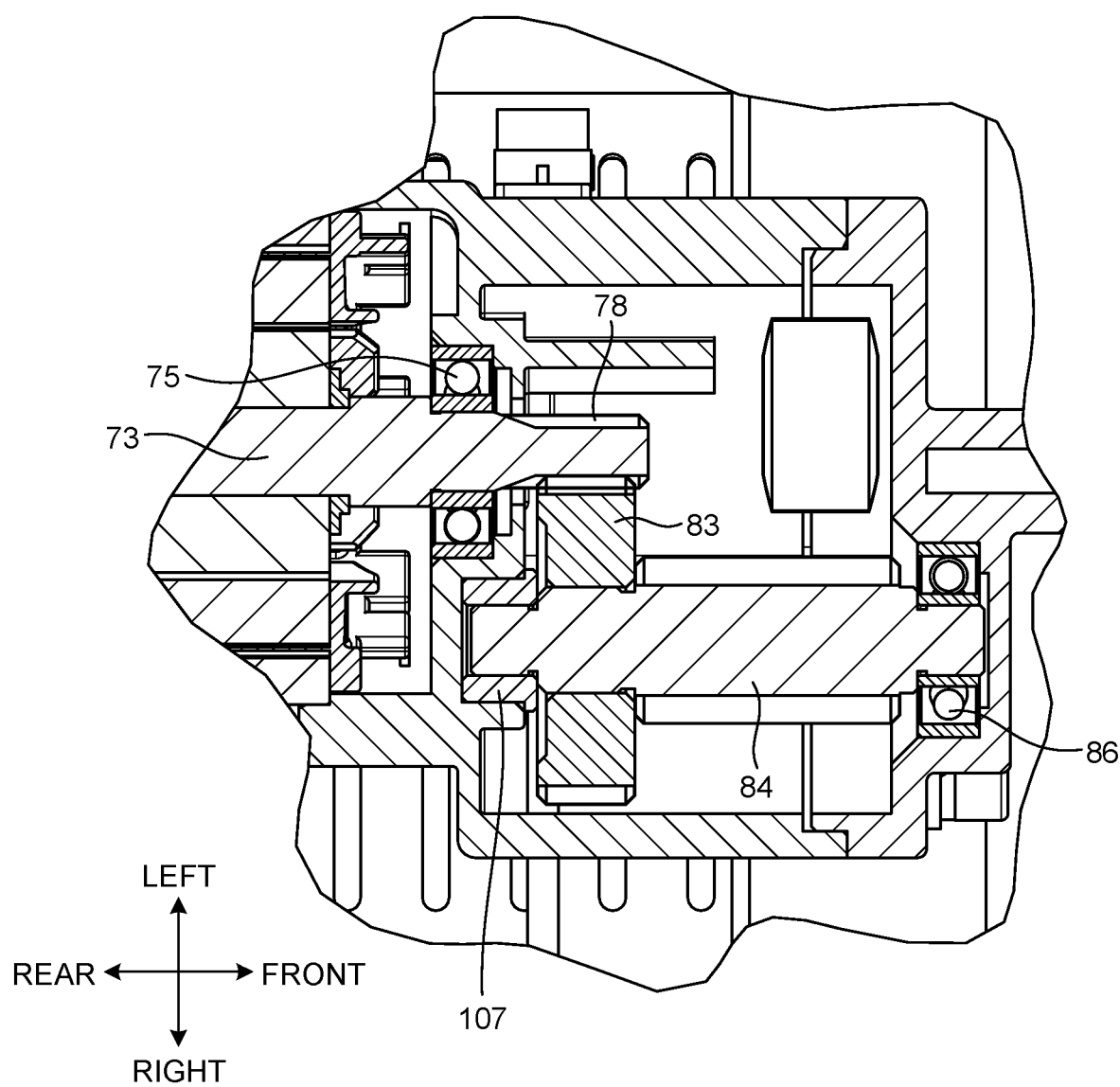
FIG. 25 is a sectional view illustrating a portion of a reduction mechanism according to the embodiment.
Figure 26:
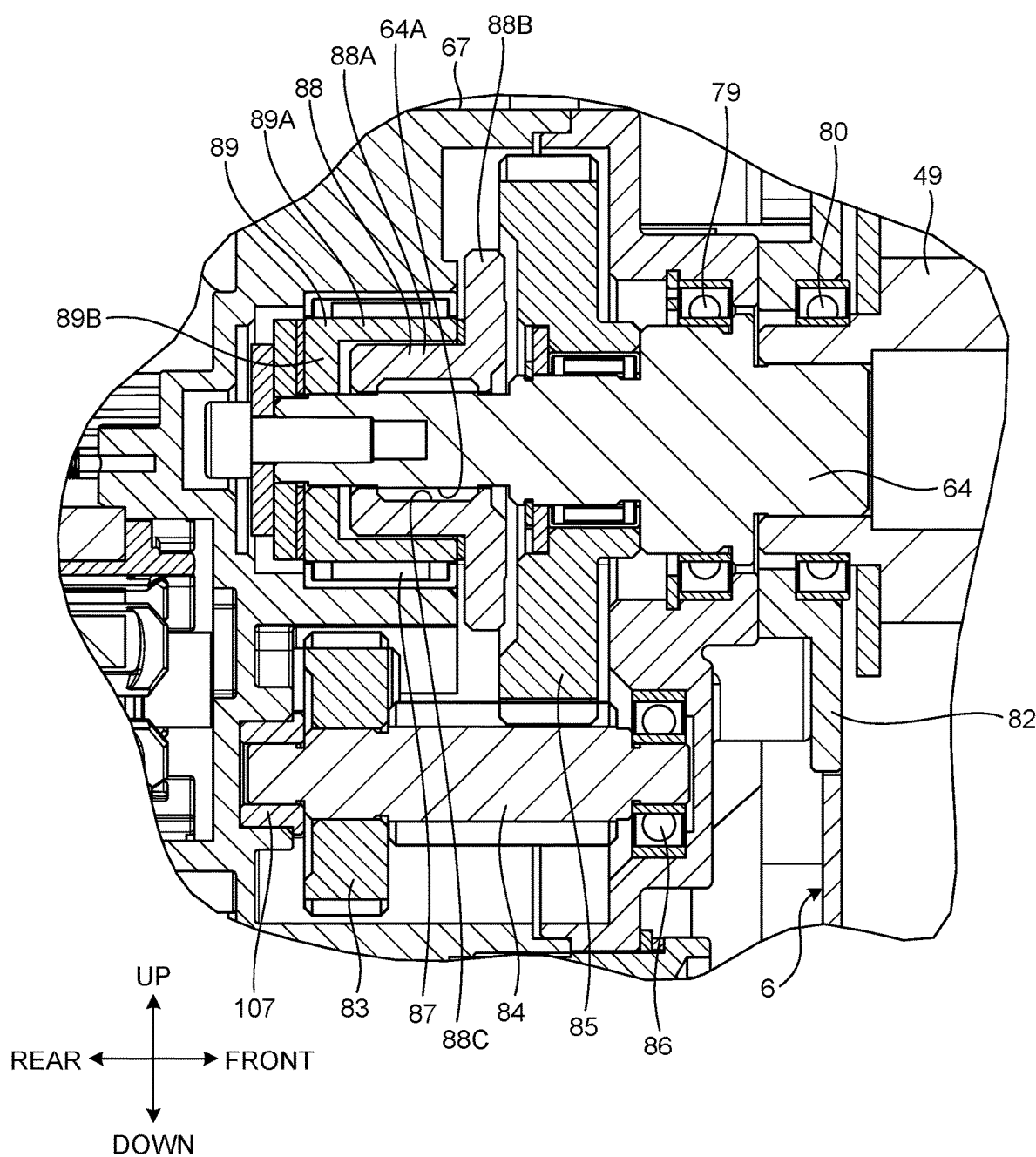
FIG. 26 is a sectional view illustrating a portion of the reduction mechanism according to the embodiment.
Figure 27:
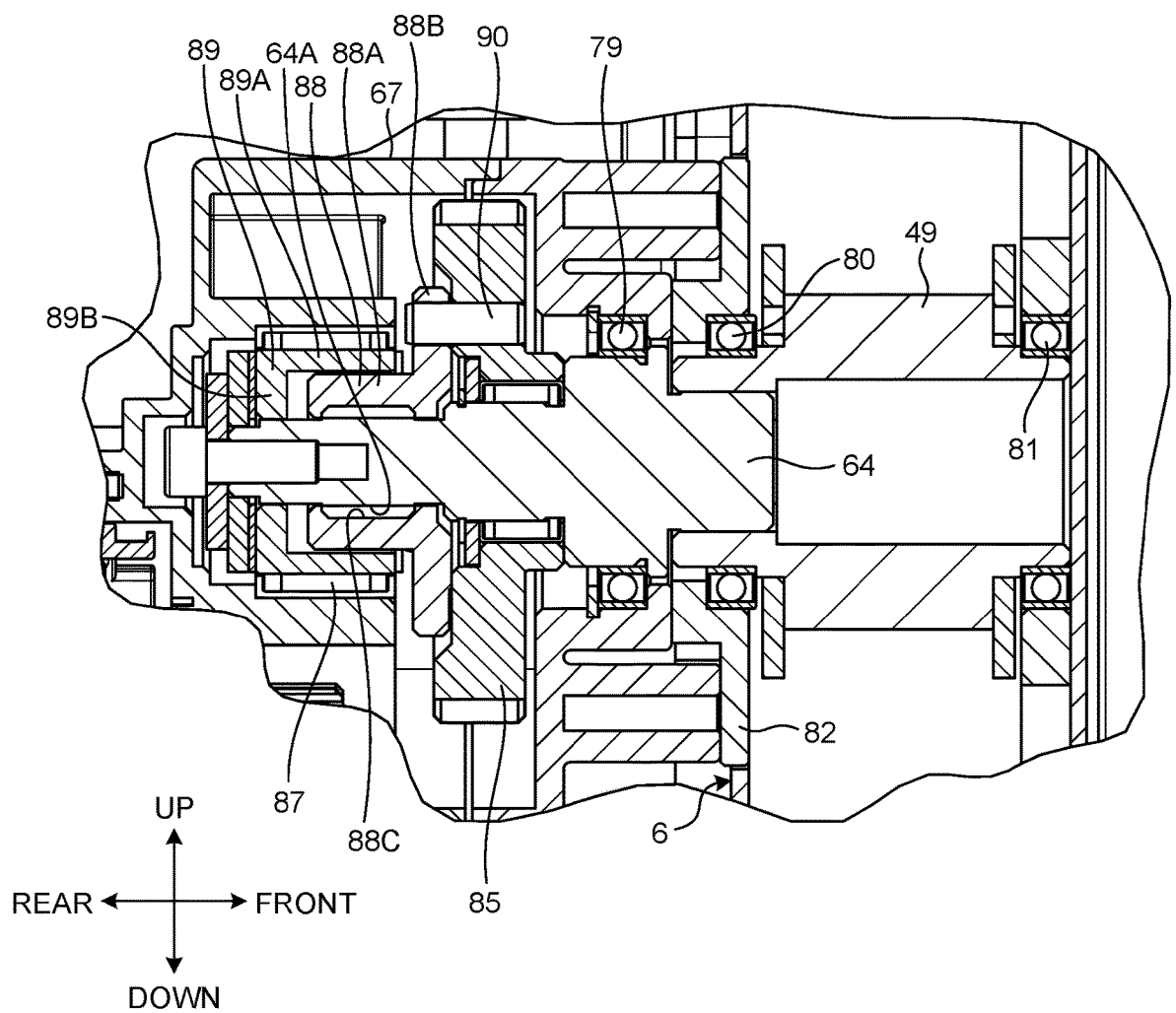
FIG. 27 is a sectional view illustrating a portion of the reduction mechanism according to the embodiment.

FIG. 25 is a sectional view illustrating a portion of the reduction mechanism 65 according to the embodiment. FIG. 26 is a sectional view illustrating a portion of the reduction mechanism 65 according to the embodiment. FIG. 27 is a sectional view illustrating a portion of the reduction mechanism 65 according to the embodiment.

In the embodiment, the reduction mechanism 65 includes a first intermediate gear 83 that meshes with the input gear 78, a second intermediate gear 84 that rotates together with the first intermediate gear 83, and an output gear 85 that meshes with the second intermediate gear 84. The second intermediate gear 84 is rotatably supported by a bearing 86 and a plain bearing 107.

The input gear 78 has a smaller number of teeth than the first intermediate gear 83. The second intermediate gear 84 has a smaller number of teeth than the output gear 85.

When the motor 9 starts and the rotor shaft 73 rotates, the input gear 78 rotates. The rotation of the input gear 78 rotates the first intermediate gear 83. The rotation of the first intermediate gear 83 rotates the second intermediate gear 84. The rotation of the second intermediate gear 84 rotates the output gear 85.

The output gear 85 is disposed around the spindle 64. The output gear 85 is rotated by the motor 9 via the input gear 78, the first intermediate gear 83, and the second intermediate gear 84.

The output gear 85 is fixed to the spindle 64. When the output gear 85 is rotated by the motor 9, the spindle 64 rotates together with the output gear 85.

The front end of the spindle 64 is fixed to the rear end of the rotating body 49. When the spindle 64 rotates, the rotating body 49 rotates together with the spindle 64.

In this manner, the rotational force of the rotor shaft 73 is transmitted to the spindle 64 via the reduction mechanism 65, and when the spindle 64 rotates, the rotating body 49 rotates together with the spindle 64.

The reduction mechanism 65 includes a preventing member 87 that prevents the descending of the lifting member 8 during the non-transmission of the power in which the power is not transmitted from the motor 9 to the lifting member 8. The preventing member 87 includes a one-way bearing that is locked during the non-transmission of the power. In the following description, the preventing member 87 is referred to as "one-way bearing 87" where appropriate.

In the embodiment, the reduction mechanism 65 includes the one-way bearing 87, a nut 88, and a sleeve 89.

The nut 88 is disposed around the spindle 64. The nut 88 is disposed more rearward than the output gear 85. The nut 88 includes a cylindrical portion 88A and a flange portion 88B. An outer circumferential portion of the spindle 64 is provided with a thread 64A. The nut 88 has a thread groove 88C that is coupled to the thread 64A of the spindle 64.

The nut 88 is supported by a pin 90 provided in the output gear 85 so as to be movable in the front-rear direction serving as the axial direction of the spindle 64. The pin 90 is fixed to a portion of the output gear 85. The flange portion 88B of the nut 88 is provided with an opening in which the pin 90 is disposed. The pin 90 guides the nut 88 in the front-rear direction. Since the pin 90 connects the output gear 85 to the nut 88, the nut 88 rotates together with the output gear 85.

The sleeve 89 is disposed at a position farther from the output gear 85 than the nut 88 in the front-rear direction serving as the axial direction of the spindle 64. That is, the sleeve 89 is disposed more rearward than the nut 88. The sleeve 89 is supported by the gear case 67 with the one-way bearing 87 interposed therebetween. The sleeve 89 does not move in the front-rear direction.

The sleeve 89 includes a cylindrical portion 89A that is disposed around the cylindrical portion 88A of the nut 88 and a circular ring portion 89B that is connected to the rear end of the cylindrical portion 89A.

The sleeve 89 is supported by the one-way bearing 87. The one-way bearing 87 is disposed around the cylindrical portion 89A of the sleeve 89. One-way bearing 87 is supported by gear case 67.

FIG. 26 illustrates a state where the power of the motor 9 is being transmitted to the lifting member 8 so as to cause the lifting member 8 to ascend. The output gear 85 is connected to the nut 88 with the pin 90 interposed therebetween. When the output gear 85 rotates in one direction, the nut 88 also rotates in the one direction together with the output gear 85. When the output gear 85 and the nut 88 rotate in the one direction, the nut 88 moves in the axial direction so as to move away from the output gear 85 and make contact with the sleeve 89. That is, the nut 88 rotates about the spindle 64, and thereby is moved backward by an action between the thread 64A and the thread groove 88C. As the nut 88 moves backward and contacts the sleeve 89, the spindle 64, the output gear 85, the nut 88, and the sleeve 89 are united into one body. In the embodiment, the rear surface of the flange portion 88B of the nut 88 contacts the front end surface of the cylindrical portion 89A of the sleeve 89. When the sleeve 89 rotates in a direction that causes the lifting member 8 to ascend, the one-way bearing 87 idly rotates. That is, when the motor 9 rotates so as to cause the lifting member 8 to ascend, the nut 88 moves backward so as to move away from the output gear 85 and make contact with the sleeve 89, and the spindle 64, the output gear 85, the nut 88, and the sleeve 89 rotate as one body while the one-way bearing 87 idly rotates. The rotation of the spindle 64 rotates the rotating body 49 so as to cause the lifting member 8 to ascend.

When the motor 9 stops rotating and the output gear 85 is not rotated by the motor 9, a force acts to rotate the spindle 64, the nut 88, and the sleeve 89 in the other direction. Therefore, the one-way bearing 87 is locked to restrict the rotation of the spindle 64. As a result, the descending (falling) of the lifting member 8 is prevented when the power is not transmitted from the motor 9 to the lifting member 8.

FIG. 27 illustrates a state where the power of the motor 9 is transmitted to the lifting member 8 so as to cause the lifting member 8 to descend. When the output gear 85 and the nut 88 rotate in the other direction different from the one direction, the nut 88 moves in the axial direction so as to move away from the sleeve 89 and make contact with the output gear 85. That is, the nut 88 moves forward. As the nut 88 moves forward and contacts the output gear 85, the spindle 64, the output gear 85, and the nut 88 are united into one body. The spindle 64, the output gear 85, and the nut 88 separate from the sleeve 89. Since the spindle 64, the output gear 85, and the nut 88 separate from the sleeve 89, the locking function of the one-way bearing 87 does not affect the rotation of the output gear 85 and the spindle 64. That is, when the motor 9 rotates so as to cause the lifting member 8 to descend, the nut 88 moves forward so as to move away from the sleeve 89 and make contact with the output gear 85, and the spindle 64, the output gear 85, and the nut 88 rotate as one body while being unaffected by the one-way bearing 87. The rotation of the spindle 64 rotates the rotating body 49 so as to cause the lifting member 8 to descend.

Locking Mechanism

Figure 28:
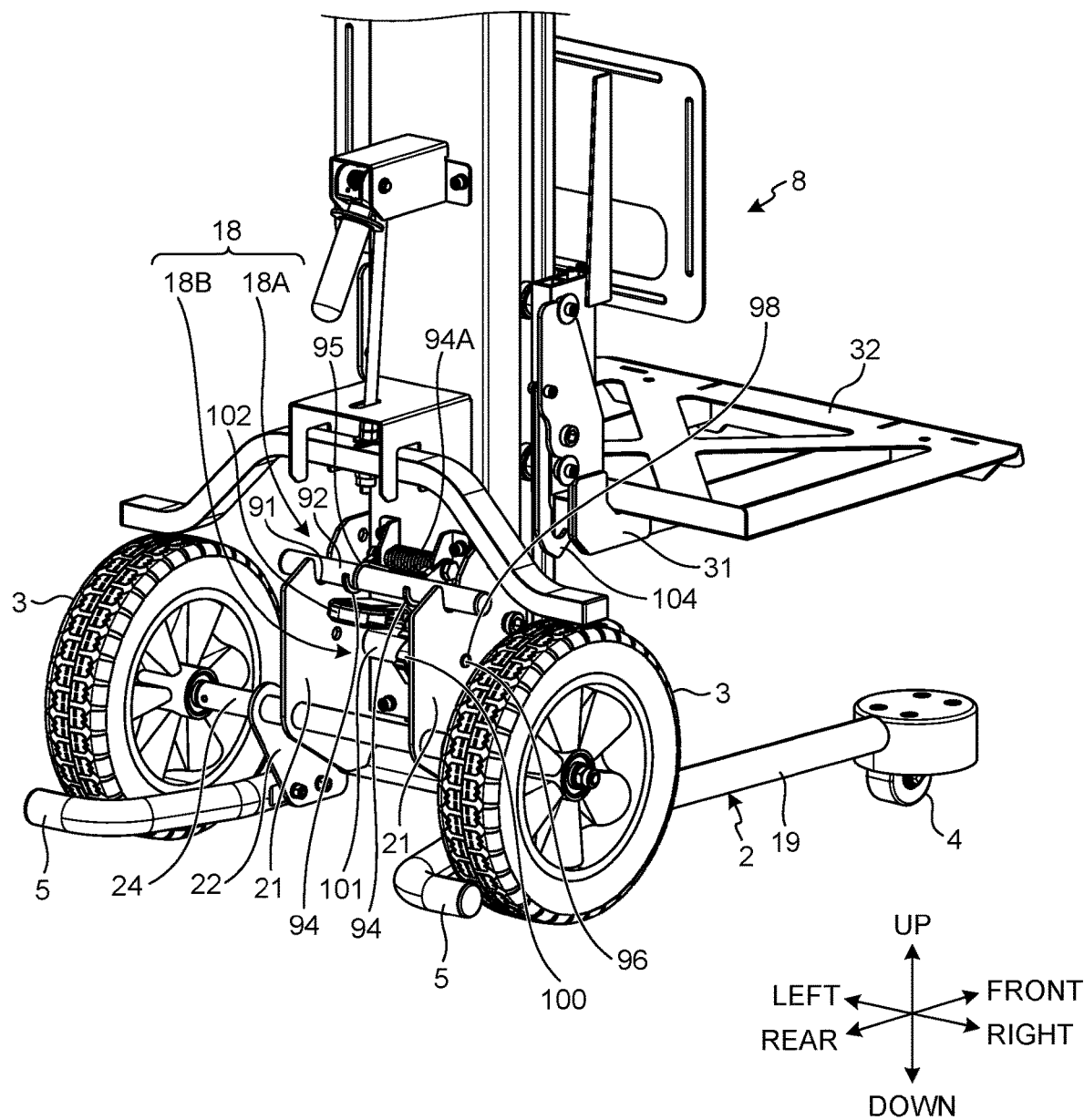
FIG. 28 is a perspective view from the rear side illustrating a locking mechanism according to the embodiment.

The following describes the locking mechanism 18 with reference to, for example, FIGS. 2, 4, 6, and 28. FIG. 28 is a perspective view from the rear side illustrating the locking mechanism 18 according to the embodiment.

The locking mechanism 18 locks the turning of the pole 6. The pole 6 turns so as to fall forward. The locking mechanism 18 locks the pole 6 to prevent the pole 6 from falling forward.

The locking mechanism 18 includes a first locking mechanism 18A and a second locking mechanism 18B. That is, the locking mechanism 18 has a double-locking structure. The pole 6 turns while both the first locking mechanism 18A and the second locking mechanism 18B are unlocked.

The traveling frame 2 has recesses 91. The recesses 91 are provided more rearward than the pole 6. In the embodiment, the recesses 91 are provided on upper surfaces of the main plates 21.

The first locking mechanism 18A includes a locking bar 92 that is disposed in the recesses 91 while supporting the pole 6. The locking bar 92 is inserted into the recesses 91 to lock the first locking mechanism 18A.

In the embodiment, the first locking mechanism 18A includes support members 94 that are turnably connected to the pole 6 and support the locking bar 92, and a torsion spring 95 that generates an elastic force so as to press the locking bar 92 against the recesses 91. A pair of the support members 94 are arranged in the left-right direction. A shaft 94A is provided to connect together a pair of the support members 94. The torsion spring 95 is disposed around the shaft 94A.

The second locking mechanism 18B includes a locking pin 96. A bracket 99 is fixed to the rear surface of the pole 6. The bracket 99 has a first opening 97 in which the locking pin 96 is disposed. The traveling frame 2 has a second opening 98 in which the locking pin 96 is disposed. In the embodiment, the second opening 98 is provided in the right main plate 21. Each of the first and the second openings 97 and 98 is provided more rearward than the pole 6. The locking pin 96 is disposed in both the first and the second openings 97 and 98 to lock the second locking mechanism 18B.

The second locking mechanism 18B includes a locking pin 96. A bracket 99 is fixed to the rear surface of the pole 6. The bracket 99 has a first opening 97 in which the locking pin 96 is disposed. The traveling frame 2 has a second opening 98 in which the locking pin 96 is disposed. In the embodiment, the second opening 98 is provided in the right main plate 21. Each of the first and the second openings 97 and 98 is provided more rearward than the pole 6. The locking pin 96 is disposed in both the first and the second openings 97 and 98 to lock the second locking mechanism 18B.

The second locking mechanism 18B includes a coil spring 103 that is supported by the bracket 99 and generates an elastic force so as to insert the locking pin 96 into the second opening 98.

Figure 29:
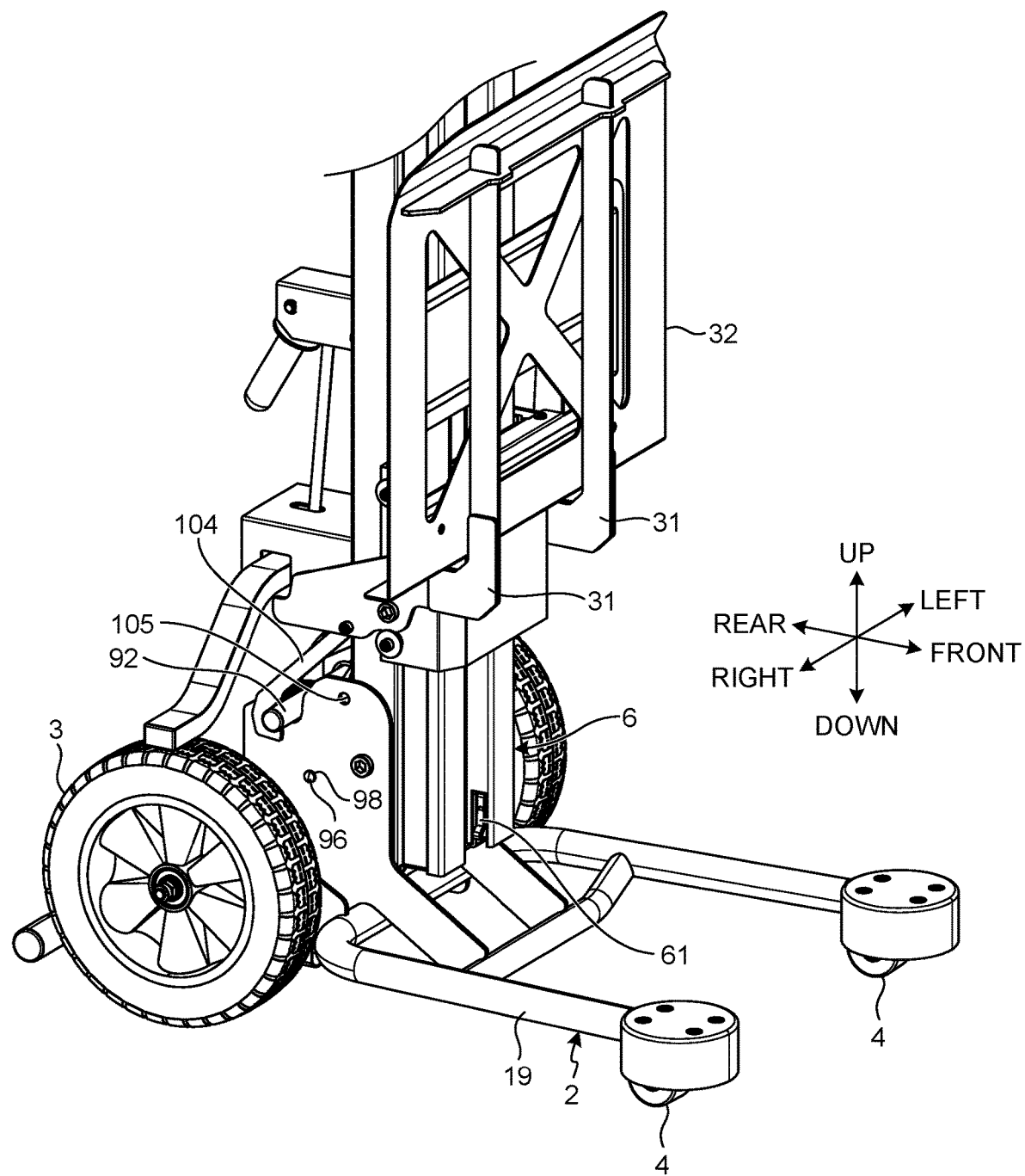
FIG. 29 is a perspective view from the front side illustrating the locking mechanism according to the embodiment.
Figure 30:
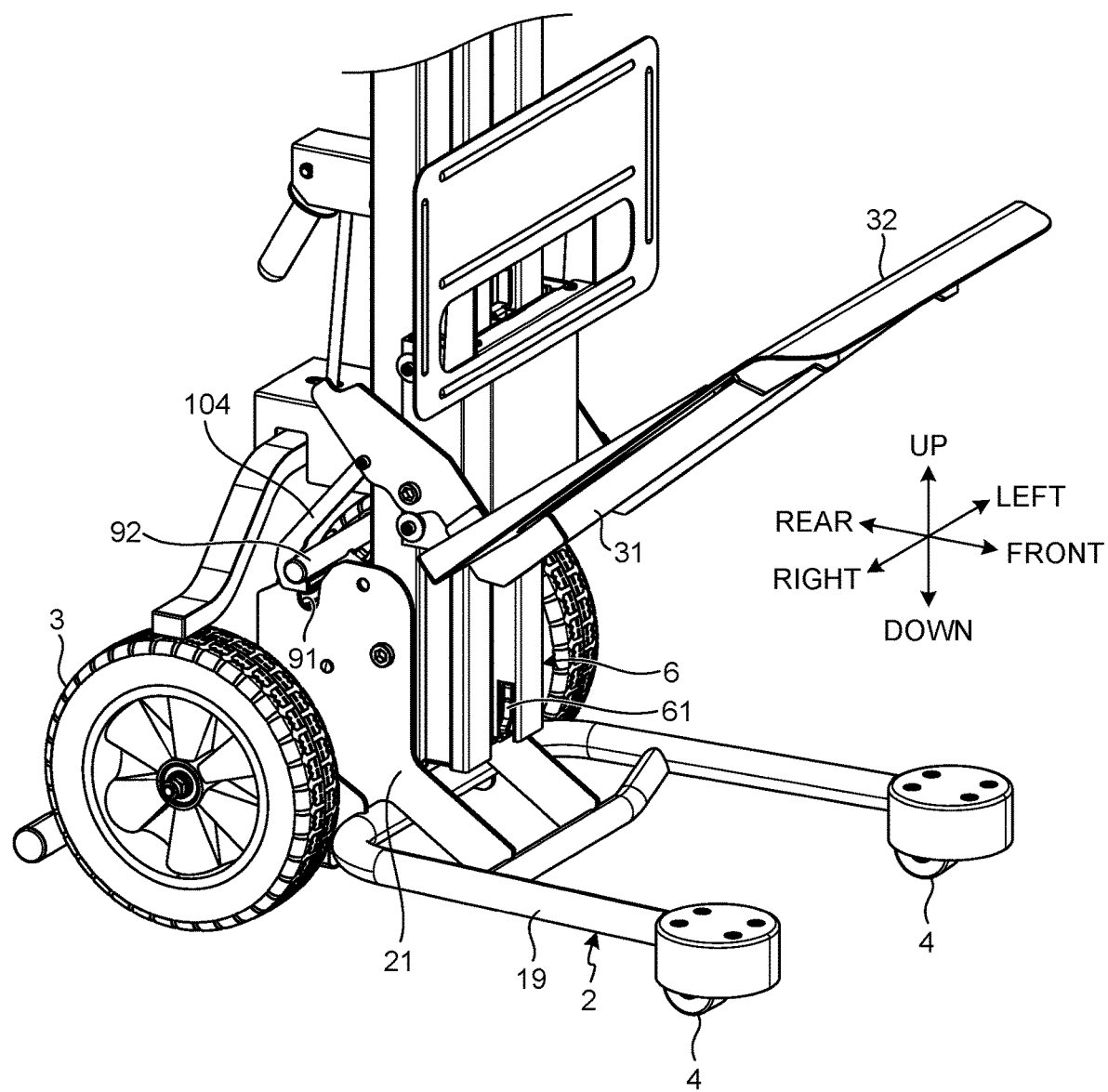
FIG. 30 is a perspective view from the front side illustrating the locking mechanism according to the embodiment.
Figure 31:
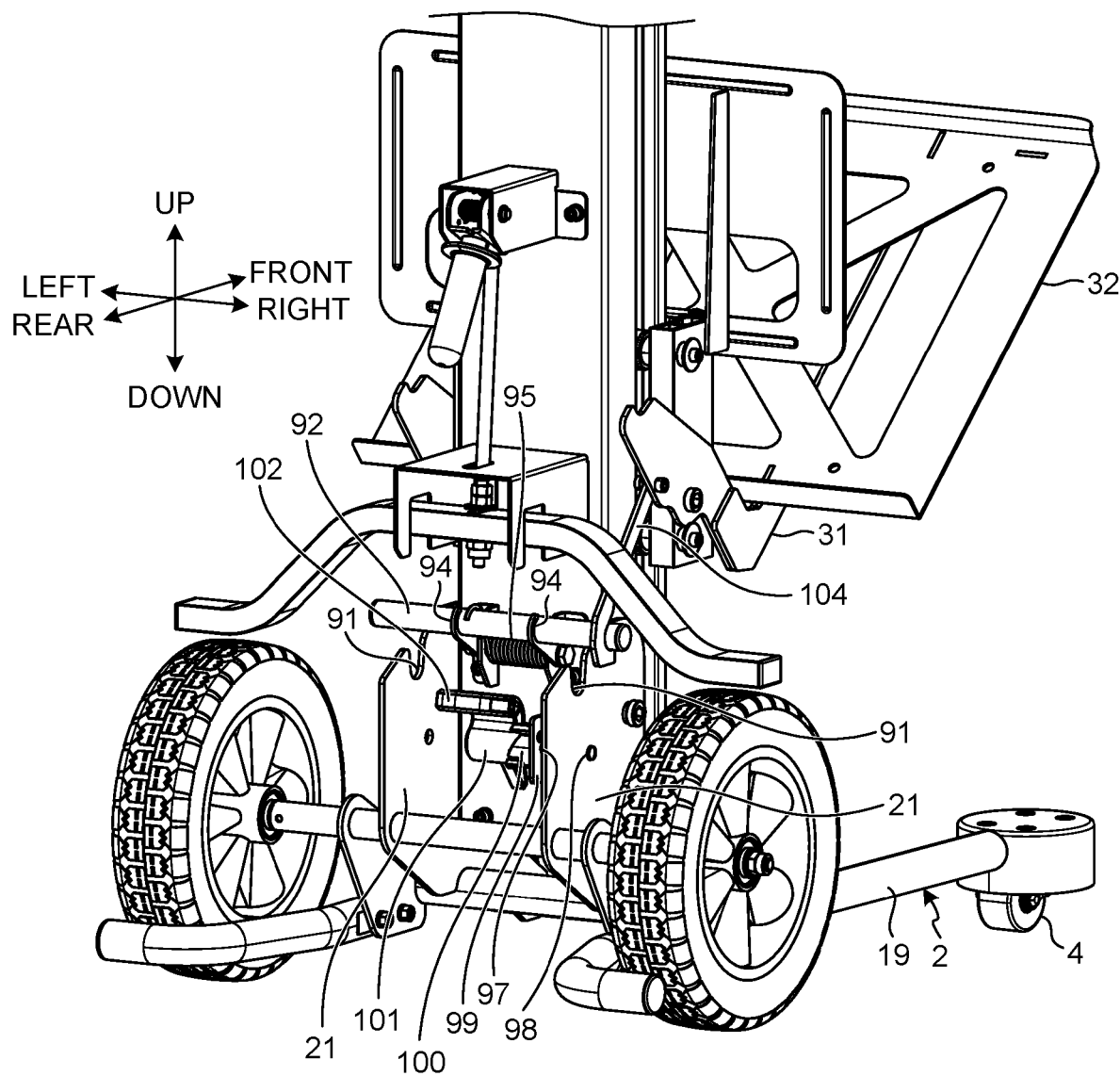
FIG. 31 is a perspective view from the rear side illustrating the locking mechanism according to the embodiment.
Figure 32:
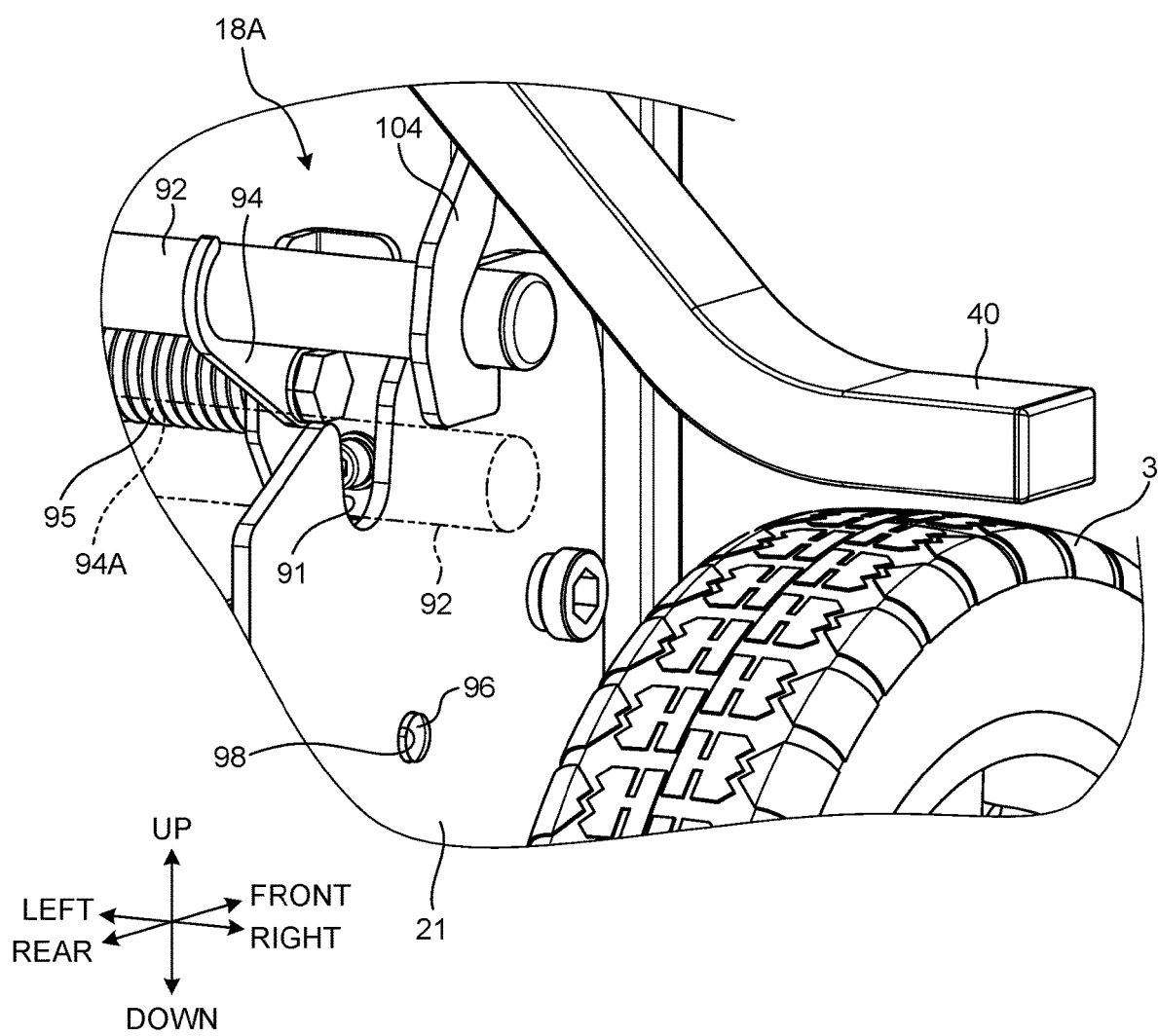
FIG. 32 is a perspective view from the rear side illustrating a portion of the locking mechanism according to the embodiment.
Figure 33:
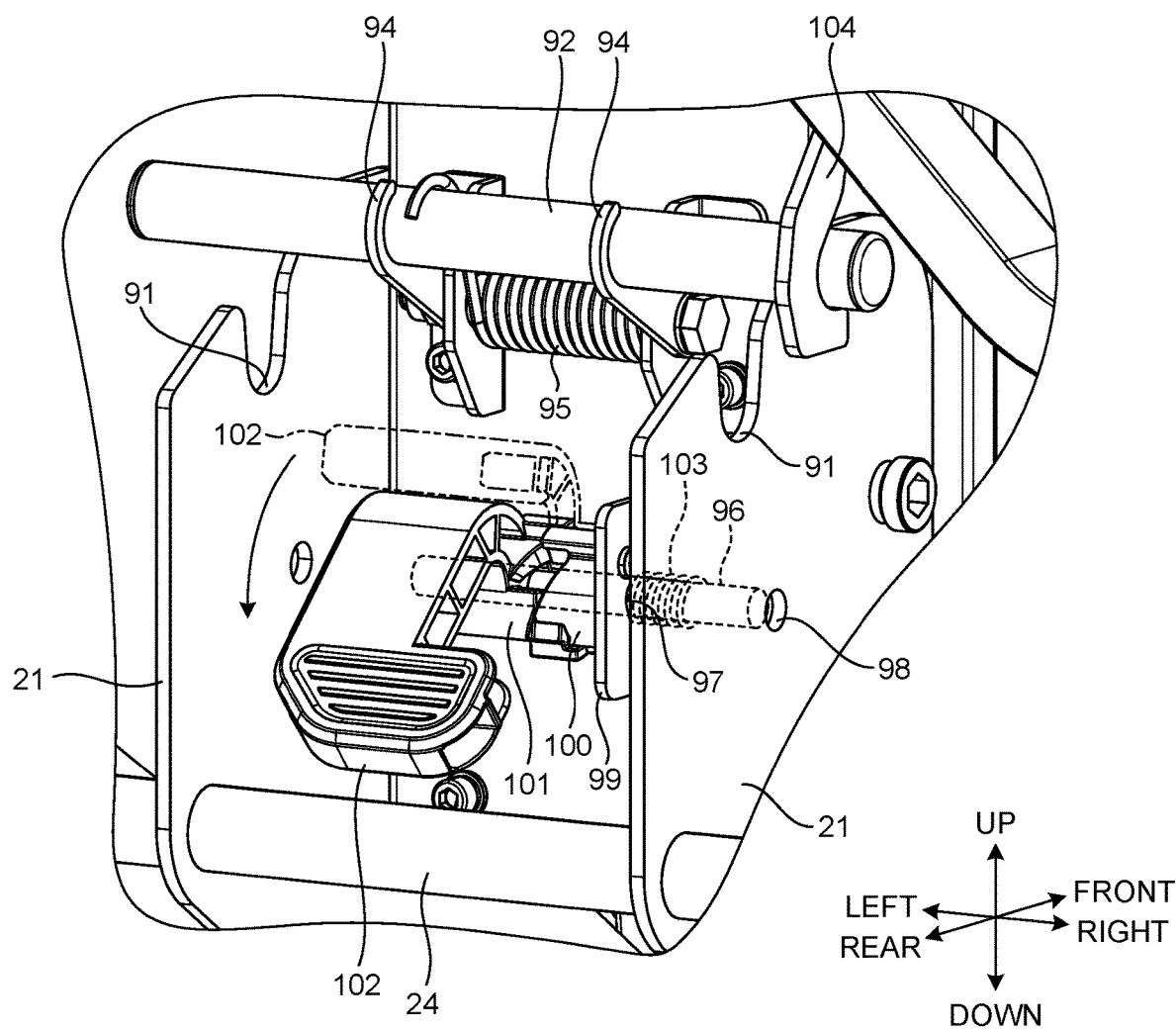
FIG. 33 is a perspective view from the rear side illustrating a portion of the locking mechanism according to the embodiment.
Figure 34:
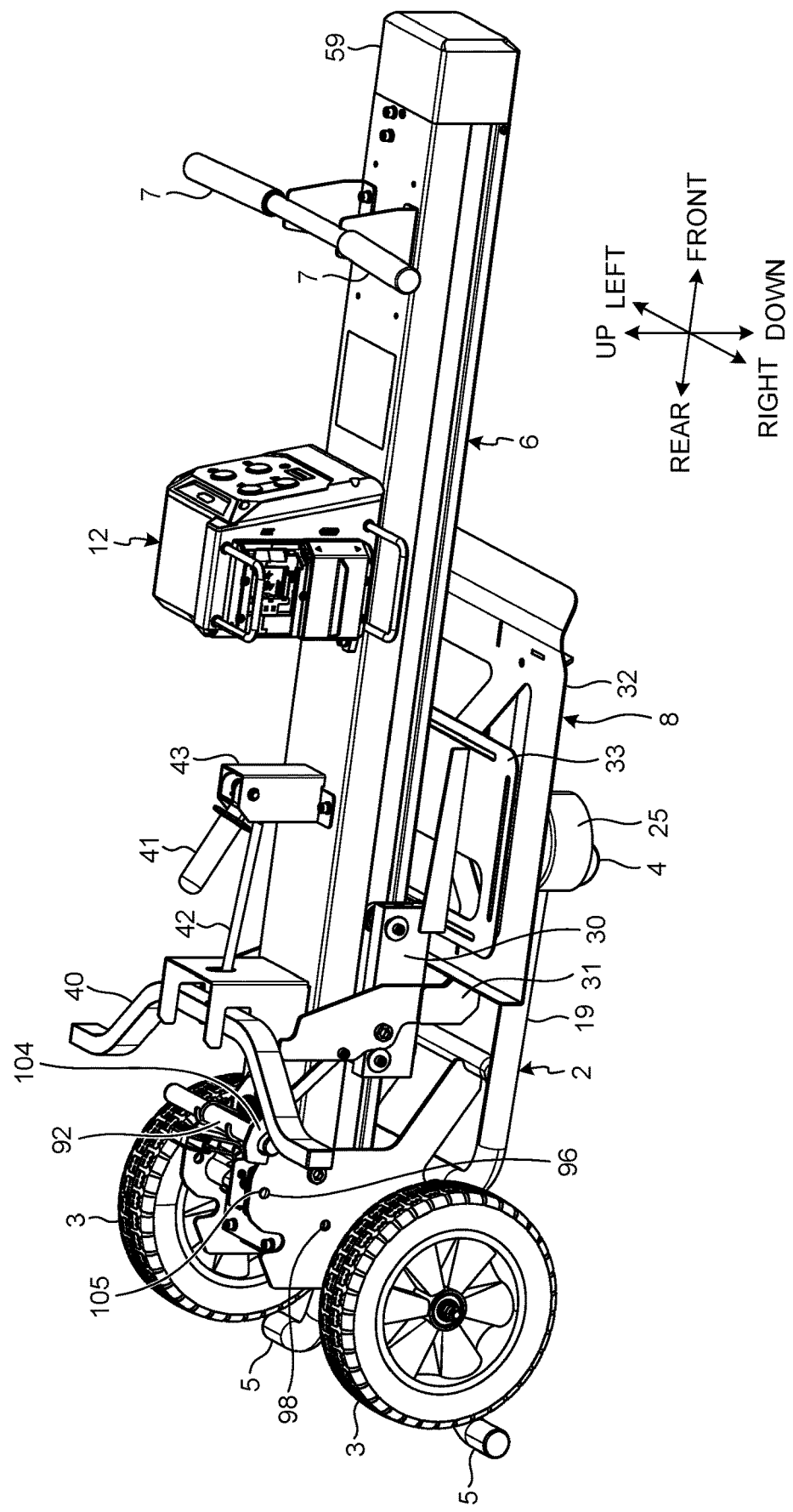
FIG. 34 is a view illustrating the lifter device in a state where the locking mechanism according to the embodiment is unlocked.

The following describes how to unlock the locking mechanism 18, with reference to FIGS. 28 to 34. FIG. 29 is a perspective view from the front side illustrating the locking mechanism 18 according to the embodiment. FIG. 30 is a perspective view from the front side illustrating the locking mechanism 18 according to the embodiment. FIG. 31 is a perspective view from the rear side illustrating the locking mechanism 18 according to the embodiment. FIG. 32 is a perspective view from the rear side illustrating a portion of the locking mechanism 18 according to the embodiment. FIG. 33 is a perspective view from the rear side illustrating a portion of the locking mechanism 18 according to the embodiment. FIG. 34 is a view illustrating the lifter device 1 in a state where the locking mechanism 18 according to the embodiment is unlocked.

The following describes how to unlock the first locking mechanism 18A. To unlock the first locking mechanism 18A, a process of pulling the locking bar 92 off the recesses 91 is performed. As illustrated in FIG. 28, the lifting member 8 includes a hook member 104 rotatably connected to the right arm 31R. In the embodiment, the process of pulling the locking bar 92 off the recesses 91 is performed using the hook member 104. As illustrated in FIG. 28, the height of the lifting member 8 is adjusted so as to allow the hook member 104 to hook the locking bar 92.

Then, as illustrated in FIG. 29, the arm 31 is rotated backward so as to allow the hook member 104 to hook the locking bar 92. This operation allows the user of the lifter device 1 to hook the locking bar 92 with the hook member 104.

Then, as illustrated in FIGS. 30, 31, and 32, the arm 31 is rotated forward while the hook member 104 is hooking the locking bar 92. The user of the lifter device 1 rotates the arm 31 forward against the elastic force of the torsion spring 95. As the arm 31 is rotated forward, the locking bar 92 is pulled off the recesses 91.

As the locking bar 92 is pulled off the recesses 91 by the hook member 104, the first locking mechanism 18A is unlocked. The hook member 104 has the function to unlock the first locking mechanism 18A.

The following describes how to unlock the second locking mechanism 18B. To unlock the second locking mechanism 18B, a process of pulling the locking pin 96 off the second opening 98 is performed. As illustrated in FIG. 33, the locking pin lever 102 is rotated downward by the user to pull the locking pin 96 off the second opening 98. As the locking pin lever 102 is rotated downward, the state of engagement between the fixed cam 100 and the rotating cam 101 changes to move the rotating cam 101 and the locking pin lever 102 to the left. As the rotating cam 101 and the locking pin lever 102 move to the left, the locking pin 96 moves to the left while being guided by the first opening 97. The locking pin 96 moves to the left to be pulled off the second opening 98.

The second locking mechanism 18B includes the coil spring 103 that generates the elastic force so as to insert the locking pin 96 into the second opening 98. The user of the lifter device 1 rotates the locking pin lever 102 downward against the elastic force of the coil spring 103. As the locking pin lever 102 is rotated downward, the locking pin 96 is pulled off the second opening 98.

As the locking pin 96 is pulled off the second opening 98, the second locking mechanism 18B is unlocked.

The unlocking of both the first locking mechanism 18A and the second locking mechanism 18B allows the user of the lifter device 1 to turn the pole 6 forward as illustrated in FIG. 34. That is, the user of the lifter device 1 allows the turning of the pole 6 so as to make the pole 6 closer to the main frame 19.

In the embodiment, the right main plate 21 of the traveling frame 2 has a third opening 105. After the pole 6 turns so as to fall forward, the locking pin 96 is inserted into the third opening 105 by the elastic force of the coil spring 103.

The proximal end of the hook member 104 is connected to the arm 31L of the lifting member 8. The distal end of the hook member 104 hooks the locking bar 92. The locking bar 92 is connected to the pole 6 with the support members 94 interposed therebetween. Therefore, in the state where the pole 6 is turned so as to fall forward, the hook member 104 can prevent the lifting member 8 from moving forward, as illustrated in FIG. 34.

How to Use

As illustrated in FIG. 6, the object S to be transported is placed on the table 32. In the embodiment, the dimension in the front-rear direction of the table 32 is 400 mm, and the dimension in the left-right direction of the table 32 is 480 mm. The maximum loading capacity of the lifting member 8 is from 50 kg to 150 kg, preferably from 70 kg to 120 kg. The lifting range of the lifting member 8 is from 5 mm to 1500 mm, preferably from 10 mm to 1200 mm with respect to the height of the ground contacted by the wheels 3. The outer diameter of the wheels 3 is 255 mm, and the outer diameter of the casters 4 is 50 mm.

In the embodiment, the rated voltage of the battery pack 39 is from 14.4 V to 120 V, preferably from 18 V to 54 V, more preferably from 18 V to 36 V. A battery pack having a rated voltage of 18 V is called a 20 V max battery pack. A battery pack having a rated voltage of 36 V is called a 40 V max battery pack. A battery pack having a rated voltage of 54 V is called a 60 V max battery pack.

The outer diameter of the stator 70 of the motor 9 is from 35 mm to 100 mm, preferably from 38 mm to 70 mm, more preferably from 44 mm to 60 mm.

The user of the lifter device 1 can move the lifter device 1 by pushing or pulling the lifter device 1 while holding the handle 7 with hands.

When loading, for example, a transport vehicle with the object S to be transported, the user of the lifter device 1 operates the up button 15B to cause the lifting member 8 to ascend. Operating the up button 15B causes the lifting member 8 to ascend as illustrated in FIG. 19. In the embodiment, the time required to cause the lifting member 8 to ascend from a lower end position to an upper end position in a movable range of the lifting member 8 is from 12 seconds to 14 seconds. When the lifting member 8 is disposed at the lower end position, the height from the ground to the lifting member 8 is 100 mm. When the lifting member 8 is disposed at the upper end position, the height from the ground to the lifting member 8 is 1050 mm.

As illustrated in FIG. 34, the lifter device 1 is foldable. This feature reduces the space for storing the lifter device 1.

Effects

As described above, in the embodiment, the lifter device 1 includes the pole 6, the lifting member 8 guided by the pole 6, the motor 9 that generates the power used for ascending and descending of the lifting member 8, the controller 10 that controls the motor 9, the case 12 that is fixed to at least a portion of the pole 6 and accommodates therein the motor 9 and the controller 10, the transmission mechanism 11 that transmits the power of the motor 9 to the lifting member 8, and the battery mounting portion 13 that is provided on the case 12 and on which the battery pack 39 for supplying the power to the motor 9 is mounted.

The configuration described above concentrates the motor 9, the controller 10, and the battery mounting portion 13 at the case 12. Therefore, the lifter device 1 is restrained from increasing in size. The motor 9, the controller 10, and the battery mounting portion 13 are concentrated at the case 12. Thus, the cables that connect the motor 9, the controller 10, and the battery mounting portion 13 to one another are restrained from being lengthened.

In the embodiment, at least a portion of the lifting member 8 ascends and descends on the front side of the pole 6. The case 12 is fixed to the rear surface of the pole 6.

The configuration described above allows the lifting member 8 to be smoothly raised and lowered.

In the embodiment, the case 12 is fixed to the central portion in the up-down direction of the pole 6.

The configuration described above allows the user of the lifter device 1 to smoothly mount the battery pack 39 onto the battery mounting portion 13 provided on the case 12.

In the embodiment, at least a portion of the transmission mechanism 11 is accommodated in the case 12.

Since the configuration described above concentrates also the transmission mechanism 11 at the case 12, the lifter device 1 is restrained from increasing in size. Since the transmission mechanism 11 is disposed near the motor 9, the transmission mechanism 11 is restrained from becoming complicated or increasing in size.

In the embodiment, the transmission mechanism 11 includes the reduction mechanism 65 that decelerates the rotation of the motor 9, and the reduction mechanism 65 is accommodated in the case 12.

Since the configuration described above concentrates the reduction mechanism 65 in the case 12, the lifter device 1 is restrained from increasing in size. Since the reduction mechanism 65 is disposed near the motor 9, the reduction mechanism 65 is restrained from becoming complicated or increasing in size.

In the embodiment, the battery mounting portion 13 is provided on the outer surface of the case 12.

The configuration described above allows the user of the lifter device 1 to smoothly mount the battery pack 39 onto the battery mounting portion 13. The case 12 is also restrained from increasing in size.

In the embodiment, the battery mounting portion 13 includes the first battery mounting portion 13A and the second battery mounting portion 13B.

The configuration described above allows the user of the lifter device 1 to mount the battery pack 39 on appropriate one of the first and the second battery mounting portions 13A and 13B according to, for example, the use condition of the lifter device 1.

In the embodiment, the first battery pack 39A having the first rated voltage is mounted on the first battery mounting portion 13A, and the second battery pack 39B having the second rated voltage is mounted on the second battery mounting portion 13B.

The configuration described above allows the user of the lifter device 1 to effective use each of the two types of battery packs 39 having the different rated voltages.

In the embodiment, the second battery mounting portion 13B may be disposed adjacent to the first battery mounting portion 13A.

The configuration described above allows the user of the lifter device 1 to smoothly mount the battery pack 39 onto either the first battery mounting portion 13A or the second battery mounting portion 13B.

In the embodiment, the lifter device 1 includes the cover member 44 that covers the second battery mounting portion 13B when the first battery pack 39A is mounted on the first battery mounting portion 13A and covers the first battery mounting portion 13A when the second battery pack 39B is mounted on the second battery mounting portion 13B.

The configuration described above restrains the two battery packs 39 from being mounted at the same time. Mounting the two battery packs 39 at the same time may complicate the electronic circuitry or complicate the control. Since the two battery packs 39 are restrained from being mounted at the same time, the electronic circuitry and the control are restrained from becoming complicated. Since the cover member 44 covers one of the first and the second battery mounting portions 13A and 13B on which the battery pack 39 is not mounted, the battery mounting portion 13 is protected.

In the embodiment, the cover member 44 is slidably supported by the case 12.

The configuration described above allows the user of the lifter device 1 to easily cover either the first battery mounting portion 13A or the second battery mounting portion 13B by sliding the cover member 44.

In the embodiment, the relative positions of the first battery mounting portion 13A and the second battery mounting portion 13B are set such that the second battery pack 39B is not allowed to be mounted on the second battery mounting portion 13B when the first battery pack 39A is mounted on the first battery mounting portion 13A, and the first battery pack 39A is not allowed to be mounted on the first battery mounting portion 13A when the second battery pack 39B is mounted on the second battery mounting portion 13B.

With the configuration described above, for example, even if the cover member 44 is not present, when the second battery pack 39B is tried to be mounted onto the second battery mounting portion 13B while the first battery pack 39A is mounted on the first battery mounting portion 13A, the second battery pack 39B cannot be mounted onto the second battery mounting portion 13B because the second battery pack 39B contacts the first battery pack 39A mounted on the first battery mounting portion 13A. In the same manner, when the first battery pack 39A is tried to be mounted onto the first battery mounting portion 13A while the second battery pack 39B is mounted on the second battery mounting portion 13B, the first battery pack 39A cannot be mounted onto the first battery mounting portion 13A because the first battery pack 39A contacts the second battery pack 39B mounted on the second battery mounting portion 13B.

In the embodiment, the battery mounting portion 13 is configured such that the battery pack 39 is mounted onto the battery mounting portion 13 by being inserted onto the battery mounting portion 13 from above the battery mounting portion 13.

The configuration described above allows the user of the lifter device 1 to smoothly mount the battery pack 39 onto the battery mounting portion 13.

In the embodiment, the lifter device 1 includes the operation device 15 that is provided in the case 12 and transmits, to the controller 10, the operation signal to drive the motor 9.

Since the configuration described above concentrates also the operation device 15 at the case 12, the lifter device 1 is restrained from increasing in size. In addition, since the operation device 15 is disposed near the controller 10, the cable that connects the operation device 15 to the controller 10 is restrained from being lengthened.

In the embodiment, the operation device 15 includes the buttons, and the buttons are arranged on the upper surface of the case 12.

The configuration described above allows the user of the lifter device 1 to smoothly operate the buttons.

In the embodiment, the buttons include the up button 15B to cause the lifting member 8 to ascend and the down button 15C to cause the the lifting member 8 to descend.

The configuration described above allows the user of the lifter device 1 to cause the lifting member 8 to ascend and descend by operating the up button 15B and the down button 15C.

In the embodiment, the transmission mechanism 11 includes the rotating body 49 rotated by the motor 9, the lifting pulley 50 rotatably supported by the lifting member 8, and the wire 52 connecting the rotating body 49 to the lifting pulley 50. The rotating body 49 is configured to wind and unwind the wire 52, so that the lifting member 8 ascends and descends.

The configuration described above allows the transmission mechanism 11 to appropriately transmit the power of the motor 9 to the lifting member 8.

In the embodiment, the transmission mechanism 11 includes the pole pulley 51 rotatably supported at the upper end of the pole 6. The wire 52 connects the rotating body 49 to the lifting pulley 50 while being hung on the pole pulley 51.

The configuration described above allows the transmission mechanism 11 to appropriately transmit the power of the motor 9 to the lifting member 8.

In the embodiment, the lifter device 1 includes the light unit 14 that is disposed at the upper end of the pole 6 and illuminates the front of the lifting member 8.

The configuration described above allows the user of the lifter device 1 to appropriately handle the lifter device 1 even at, for example, a dark place.

In the embodiment, the lifter device 1 includes the traveling frame 2 that is connected to the lower end portion of the pole 6 and supports the wheels 3.

The configuration described above allows the user of the lifter device 1 to smoothly move the lifter device 1.

Second Embodiment

The following describes a second embodiment of the present disclosure. In the following description, components that are the same as or equivalent to those in the embodiment described above will be denoted by the same reference numerals, and the description of such components will be simplified or omitted.

In the present embodiment, a modification of the transmission mechanism 11 described in the first embodiment above will be described. In the first embodiment described above, the one-way bearing 87 is disposed on the rotation axis of the rotating body 49. In a transmission mechanism 211 according to the present embodiment, a one-way bearing 287 and a clutch unit 300 are disposed on a rotation axis different from the rotation axis of the rotating body 49. In the present embodiment, the one-way bearing 287 and the clutch unit 300 are disposed on a rotation axis of a motor 209. Disposing the one-way bearing 287 and the clutch unit 300 on the rotation axis of the motor 209 prevents an excessive load from being applied to the one-way bearing 287 and the clutch unit 300 when the power is not transmitted from the motor 209 to the rotating body 49. Preventing the excessive load from being applied to the one-way bearing 287 prevents breakage of the one-way bearing 287 and wear of the clutch unit 300.

Figure 35:
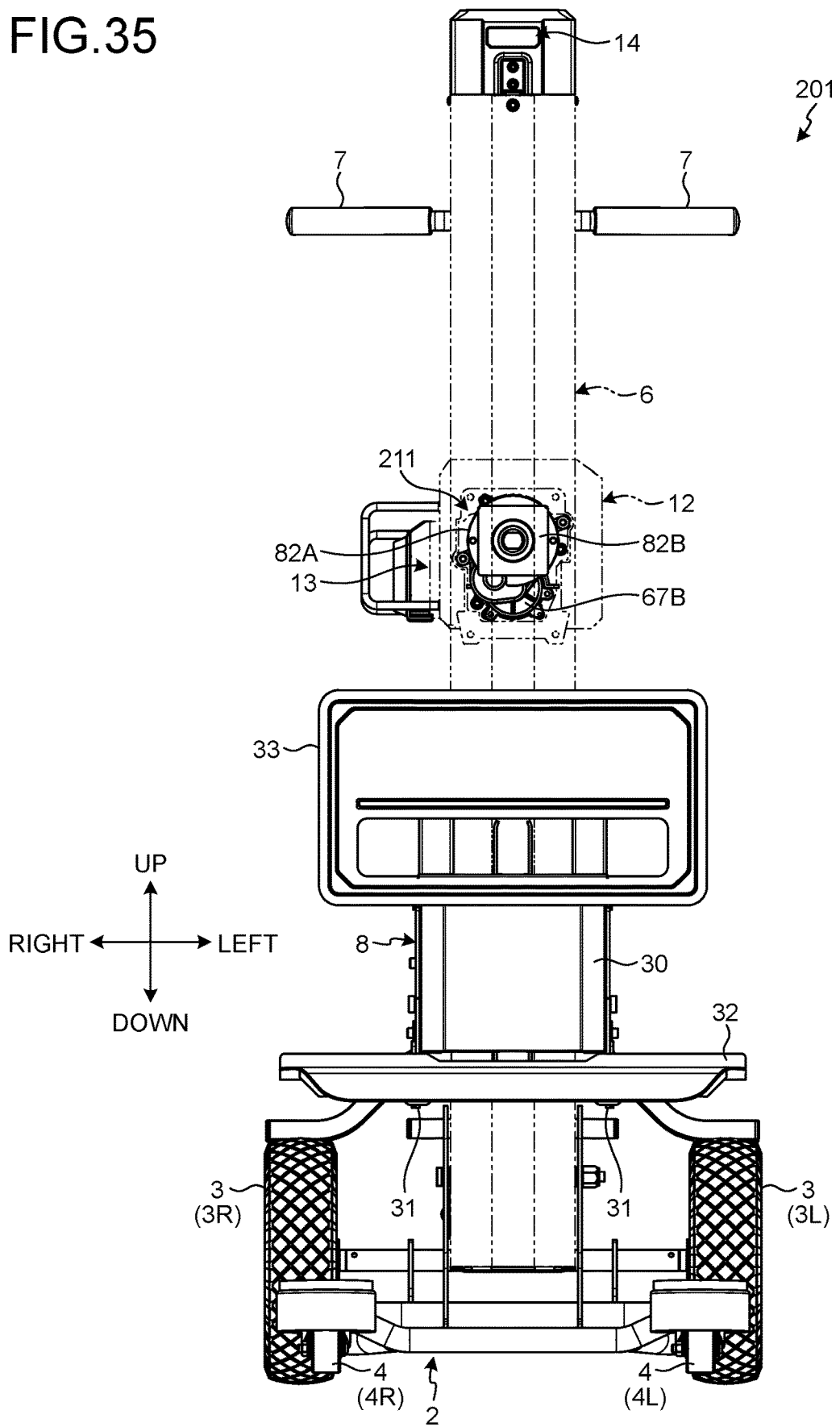
FIG. 35 is a front view illustrating a lifter device according to a second embodiment of the present disclosure.

FIG. 35 is a front view illustrating a lifter device 201 according to the second embodiment. In the same manner as in the first embodiment described above, the lifter device 201 includes the traveling frame 2, the wheels 3, the casters 4, the pole 6, the handle 7, the lifting member 8, the case 12, the battery mounting portion 13, and the light unit 14.

The case 12 accommodates therein at least a portion of the motor 209 and the transmission mechanism 211. The motor 209 generates the power used for ascending and descending of the lifting member 8. The transmission mechanism 211 transmits rotational force of the motor 209 to the lifting member 8.

Figure 36:
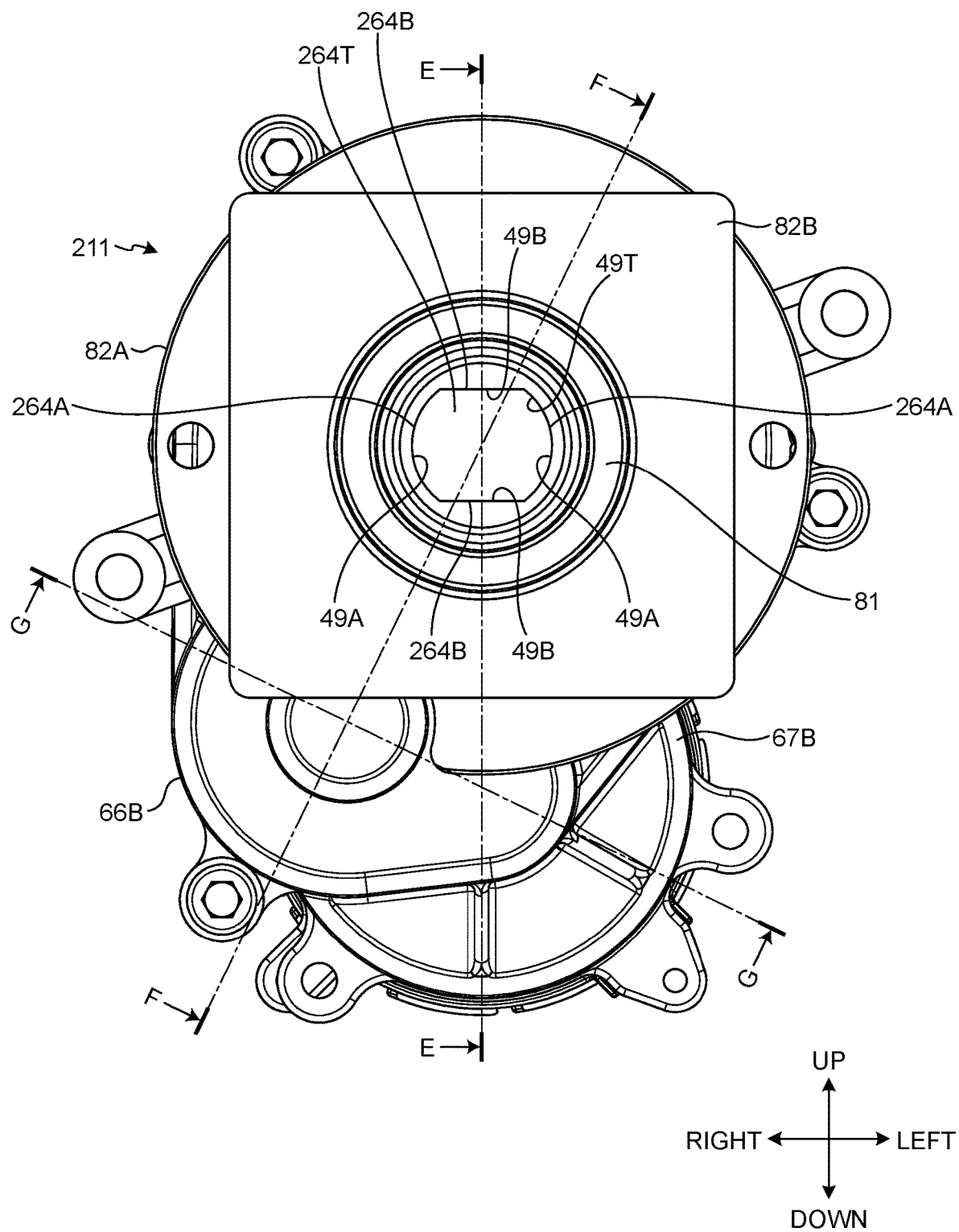
FIG. 36 is a front view illustrating a transmission mechanism according to the second embodiment.
Figure 37:
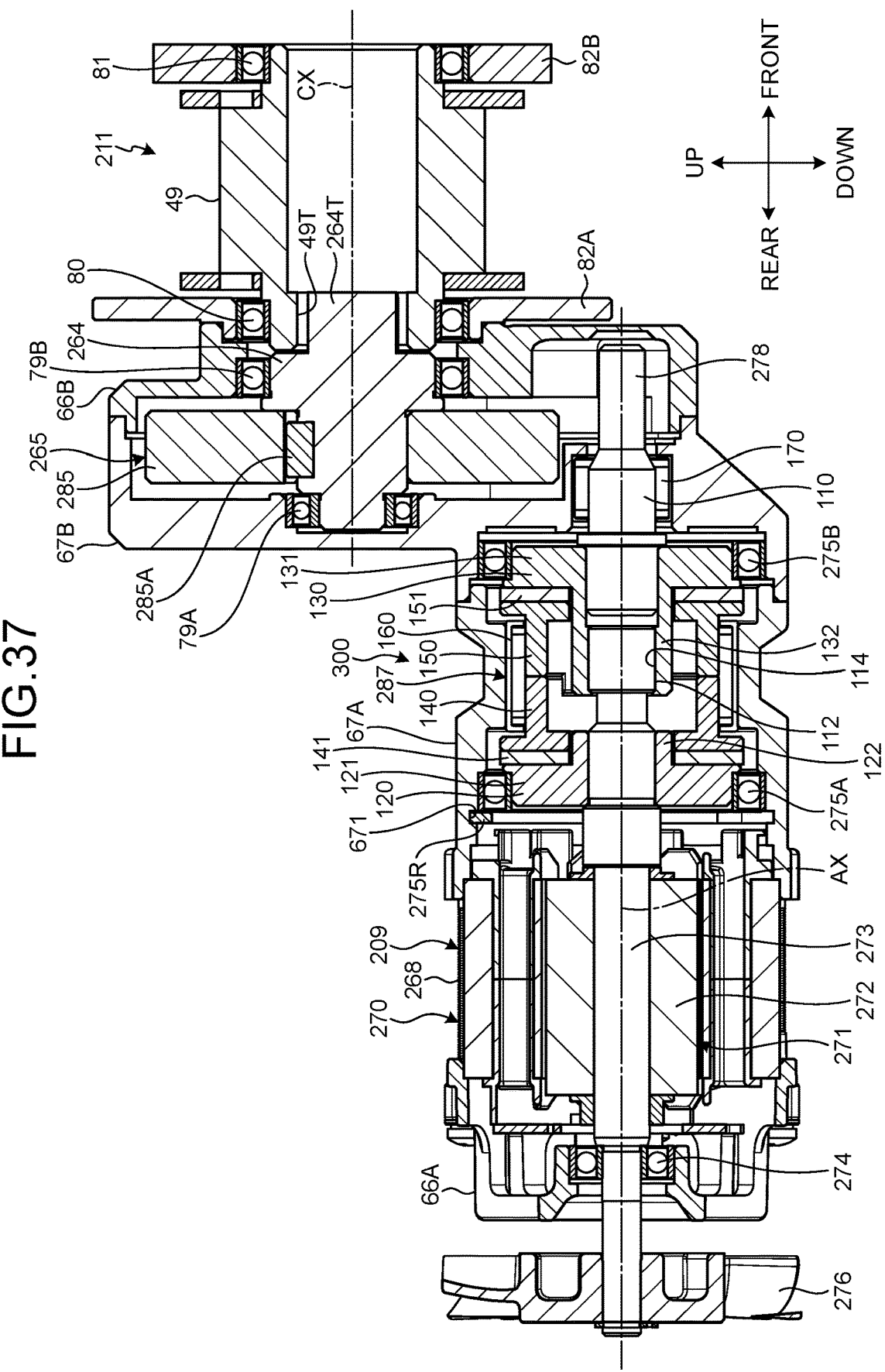
FIG. 37 is a sectional view illustrating the transmission mechanism according to the second embodiment.
Figure 38:
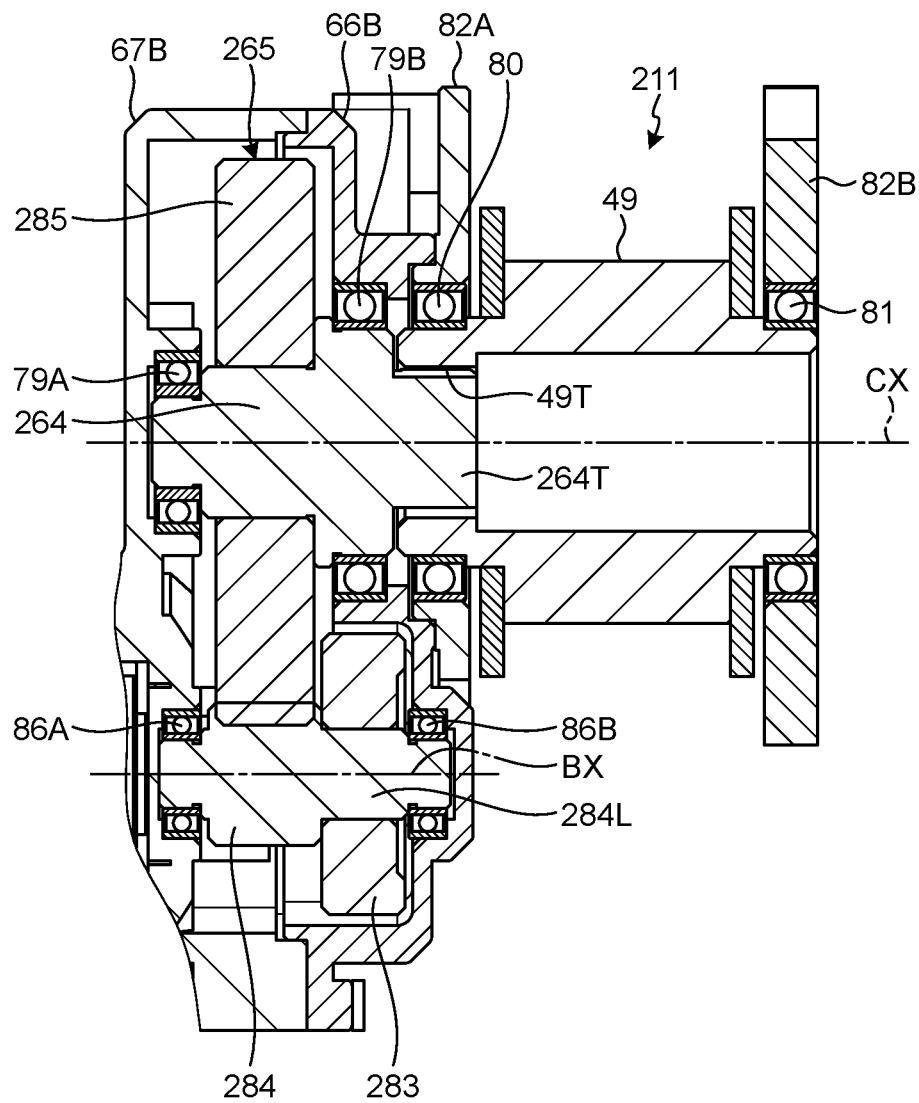
FIG. 38 is a sectional view illustrating the transmission mechanism according to the second embodiment.
Figure 39:
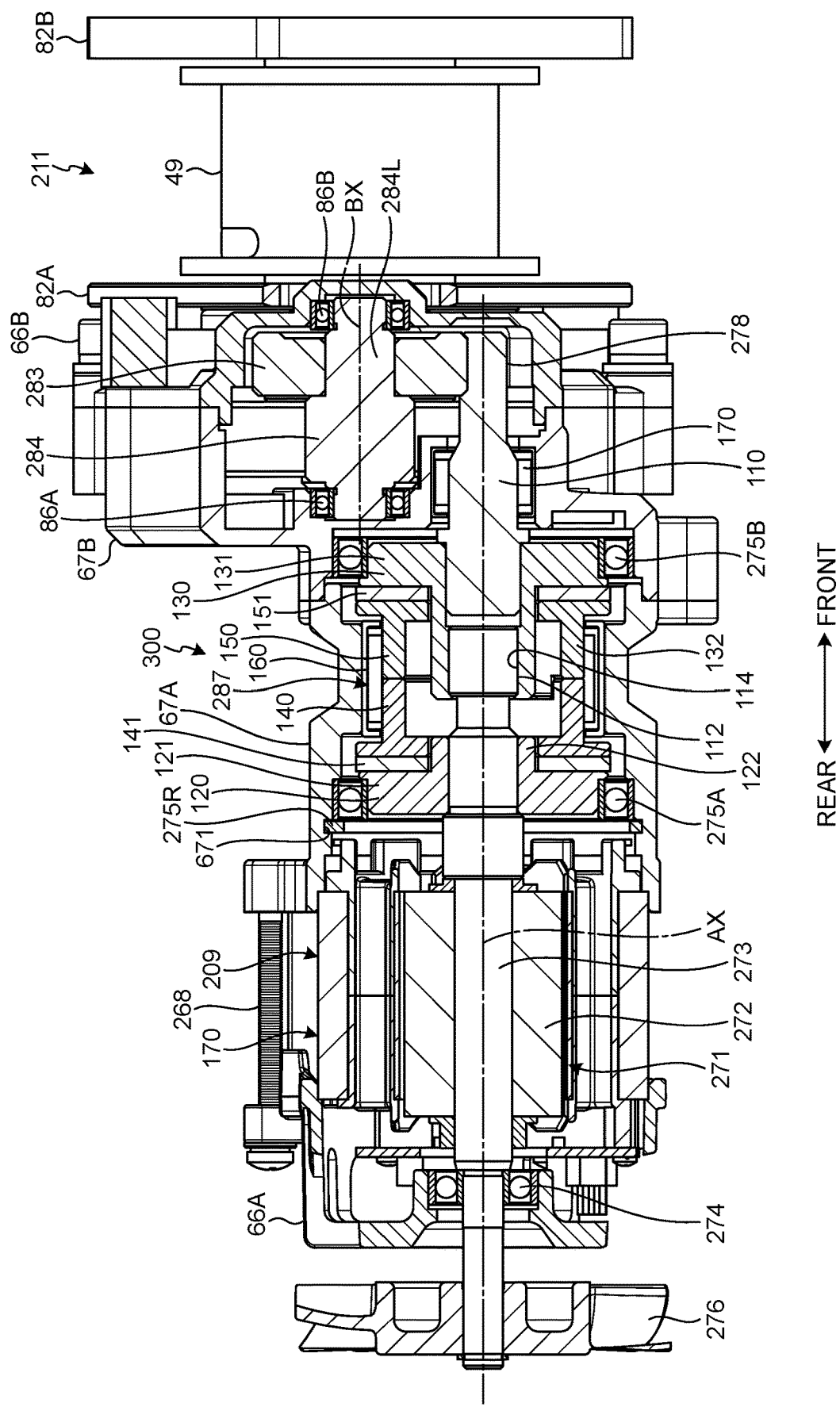
FIG. 39 is a sectional view illustrating the transmission mechanism according to the second embodiment.
Figure 40:
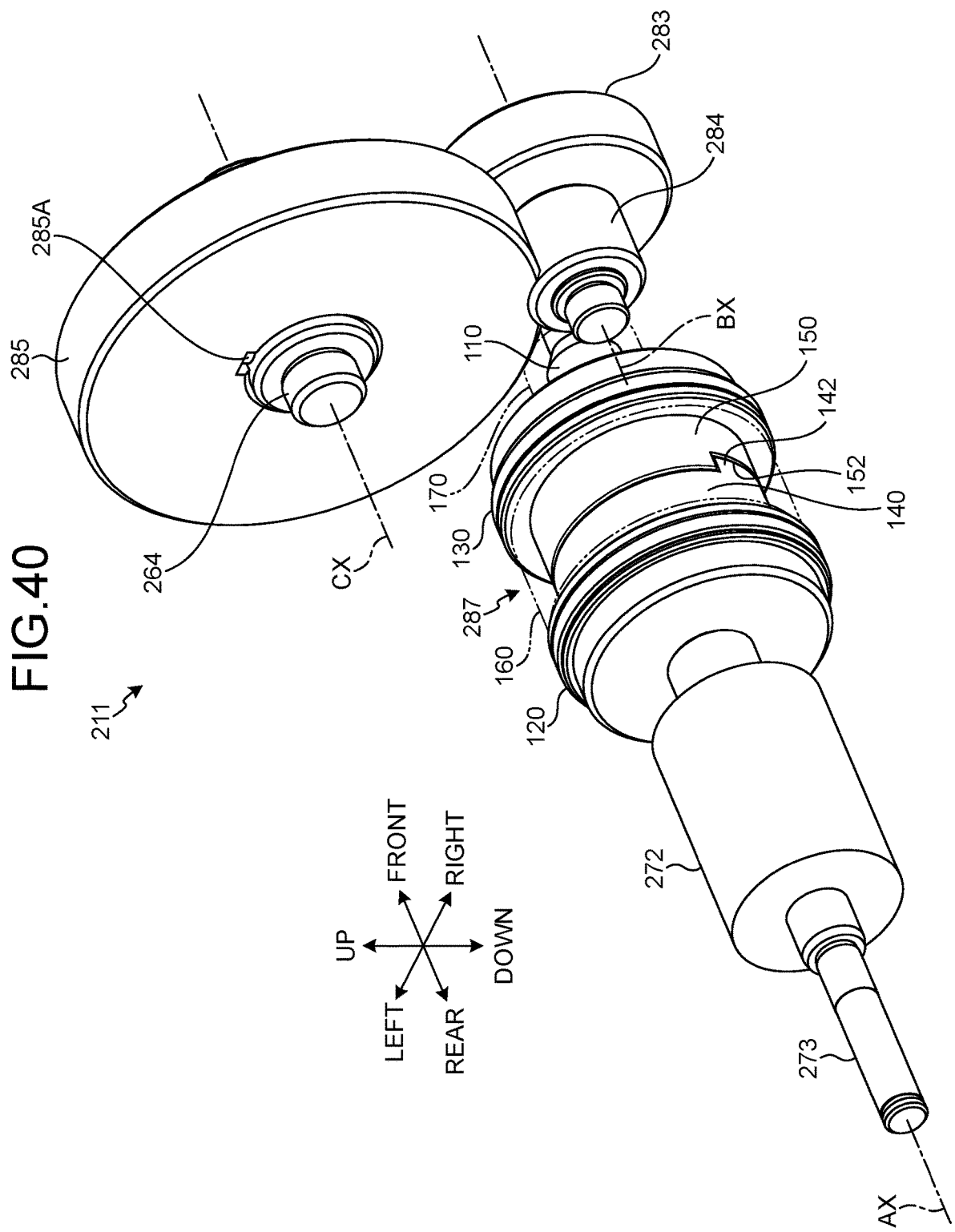
FIG. 40 is a perspective view from the rear side illustrating a main portion of the transmission mechanism according to the second embodiment.
Figure 41:
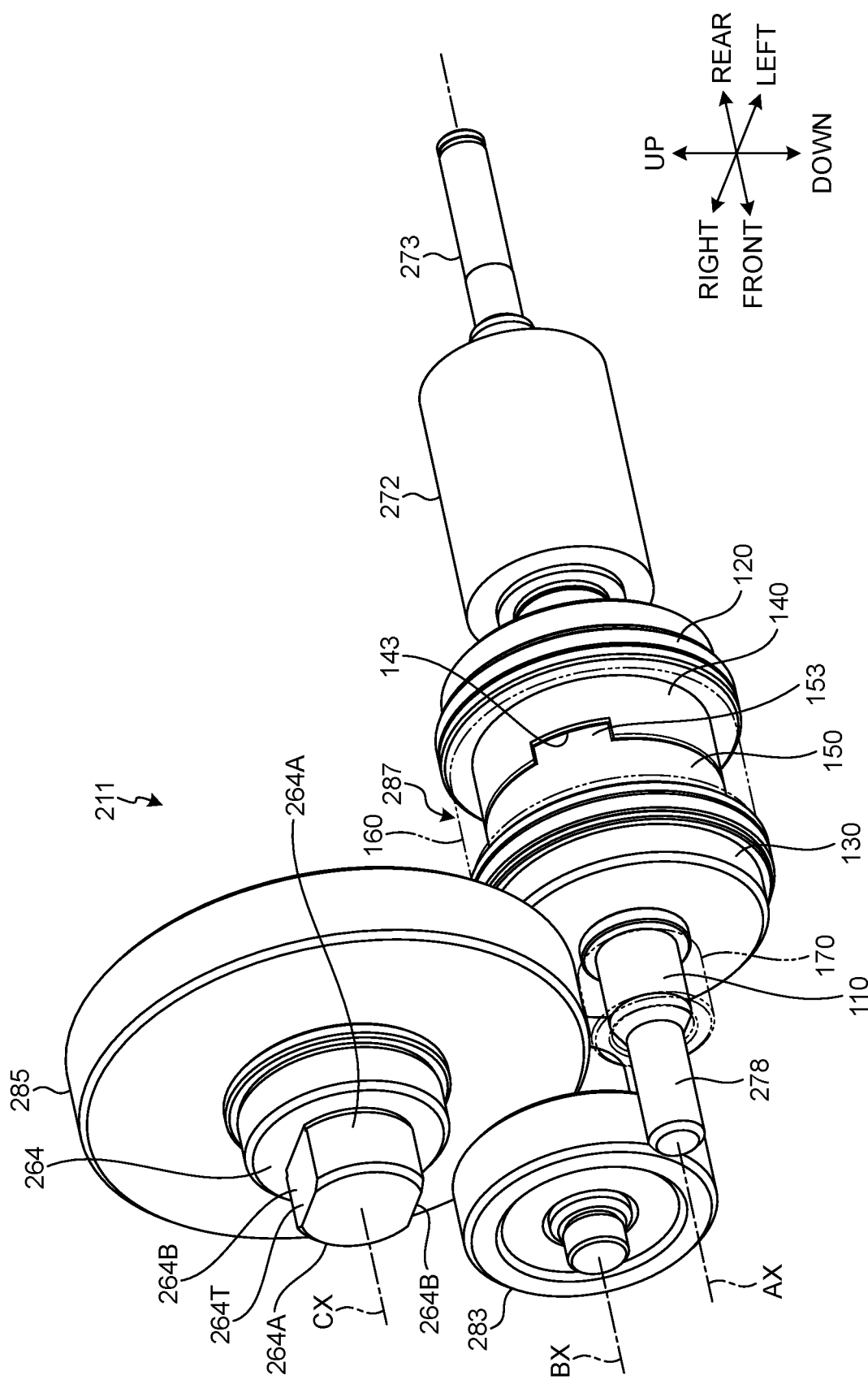
FIG. 41 is a perspective view from the front side illustrating the main portion of the transmission mechanism according to the second embodiment.

FIG. 36 is a front view illustrating the transmission mechanism 211 according to the present embodiment. Each of FIGS. 37, 38, and 39 is a sectional view illustrating the transmission mechanism 211 according to the present embodiment. FIG. 37 corresponds to an E-E line sectional view of FIG. 36. FIG. 38 corresponds to an F-F line sectional view of FIG. 36. FIG. 39 corresponds to a G-G line sectional view of FIG. 36. FIG. 40 is a perspective view from the rear side illustrating a main portion of the transmission mechanism 211 according to the present embodiment. FIG. 41 is a perspective view from the front side illustrating the main portion of the transmission mechanism 211 according to the present embodiment.

The transmission mechanism 211 includes a spindle 264 connected to the rotating body 49, a reduction mechanism 265 that transmits the rotation of the motor 209 to the spindle 264, the one-way bearing 287 that is locked when the power is not transmitted from the motor 209 to the rotating body 49, a first bearing box 66A, a first gear case 67A disposed more frontward than the first bearing box 66A, a second gear case 67B disposed more frontward than the first gear case 67A, and a second bearing box 66B disposed more frontward than the second gear case 67B. In the same manner as in the embodiment described above, the rotating body 49 is disposed in the internal space of the pole 6. The other end of the wire 52 is fixed to the rotating body 49.

The motor 209 is an inner rotor brushless motor. The motor 209 includes a stator 270 and a rotor 271. The rotor 271 is disposed in the stator 270.

The rotor 271 includes a rotor core 272 and a rotor shaft 273. The rotor core 272 is disposed around the rotor shaft 273. The rotor shaft 273 is fixed to the rotor core 272. The rotor 271 rotates about a rotation axis AX. The rotation axis AX of the rotor 271 extends in the front-rear direction.

The rotor shaft 273 is disposed so as to extend in the front-rear direction. The rotor shaft 273 rotates about the rotation axis AX (first rotation axis). A rear portion of the rotor shaft 273 is rotatably supported by a bearing 274. A front portion of the rotor shaft 273 is rotatably supported by a bearing 275A. The bearing 274 is held in the first bearing box 66A. The bearing 275A is held in the first gear case 67A. The rear end of the bearing 275A is supported by a retaining ring 275R. The outer circumference of the retaining ring 275R is disposed in a groove 671 provided in an inner circumferential surface of the first gear case 67A. The retaining ring 275R prevents the bearing 275A from coming out backward from the first gear case 67A.

A fan 276 is fixed to the rear end of the rotor shaft 273. The fan 276 rotates together with the rotor shaft 273. The rotation of the fan 276 generates airflow for cooling the motor 209.

The first bearing box 66A is fixed to the first gear case 67A by screws 268. The stator 270 is sandwiched between the first gear case 67A and the first bearing box 66A from the front and rear directions. The stator 270 is fixed to each of the first gear case 67A and the first bearing box 66A. The second gear case 67B is connected to the front end of the first gear case 67A. The first gear case 67A is fixed to the second gear case 67B by screws (not illustrated). The second bearing box 66B is fixed to the front end of the second gear case 67B. The second gear case 67B is fixed to the second bearing box 66B by screws (not illustrated). The first bearing box 66A, the first gear case 67A, the second gear case 67B, and the second bearing box 66B are accommodated in the case 12. The reduction mechanism 265 is accommodated in the second bearing box 66B and the second gear case 67B.

The spindle 264 is connected to the rotating body 49. Each of the spindle 264 and the rotating body 49 rotates about a rotation axis CX (second rotation axis) different from the rotation axis AX. A rear portion of the spindle 264 is rotatably supported by a bearing 79A. A front portion of the spindle 264 is rotatably supported by a bearing 79B. The bearing 79A is held in the second gear case 67B. The bearing 79B is supported in the second bearing box 66B.

At least a portion of the rotating body 49 is disposed more frontward than the spindle 264. The rotating body 49 is fixed to a front end portion 264T of the spindle 264. A rear portion of the rotating body 49 is provided with a hole 49T into which the front end portion 264T of the spindle 264 is inserted. An outer circumferential surface of the front end portion 264T includes a pair of curved surfaces 264A and a pair of flat surfaces 264B. An inner circumferential surface of the hole 49T includes a pair of curved surfaces 49A and a pair of flat surfaces 49B. The front end portion 264T is inserted into the hole 49T such that the curved surfaces 264A face the curved surfaces 49A and the flat surfaces 264B face the flat surfaces 49B. This configuration prevents relative rotation between the spindle 264 and the rotating body 49. The rotating body 49 rotates together with the spindle 264 about the rotation axis CX.

The rear end of the rotating body 49 is rotatably supported by the bearing 80. The front end of the rotating body 49 is rotatably supported by the bearing 81. The bearing 80 is supported by the pole 6 with a bush 82A interposed therebetween. As illustrated in FIG. 24, the pole 6 is provided with the opening 69. In the same manner as the bush 82 according to the first embodiment described above, the bush 82A is disposed in the opening 69 of the pole 6. The bearing 81 is supported by the pole 6 with a bush 82B interposed therebetween.

The transmission mechanism 211 includes an intermediate shaft 110 that is connected to the rotor shaft 273 via a second washer 151, a driven-side clutch 150, a driving-side clutch 140, and a first washer 141. The intermediate shaft 110 is disposed more frontward than the rotor shaft 273. The intermediate shaft 110 is disposed so as to extend in the front-rear direction. The intermediate shaft 110 is rotated about the rotation axis AX by the rotational force of the rotor shaft 273. A rear portion of the intermediate shaft 110 is rotatably supported by a bearing 275B. A front portion of the intermediate shaft 110 is rotatably supported by a needle bearing 170. The bearing 275B is held in the second gear case 67B. The needle bearing 170 is held in the second gear case 67B.

The reduction mechanism 265 transmits the rotational force of the rotor shaft 273 to the spindle 264. The reduction mechanism 265 decelerates the rotation of the rotor shaft 273, and rotates the spindle 264 at a lower rotational speed than that of the rotor shaft 273. The rotation of the spindle 264 rotates the rotating body 49. The reduction mechanism 265 is connected to the rotor shaft 273 via the intermediate shaft 110, the second washer 151, the driven-side clutch 150, the driving-side clutch 140, and the first washer 141.

The reduction mechanism 265 includes an input gear 278 (first gear) fixed to the front end of the intermediate shaft 110, an output gear 285 (second gear) fixed to the spindle 264, and a first intermediate gear 283 (third gear) and a second intermediate gear 284 (third gear) that transmit the rotational force of the input gear 278 to the output gear 285. The input gear 278 rotates about the rotation axis AX. The output gear 285 rotates about the rotation axis CX. Each of the first and the second intermediate gears 283 and 284 rotates about a rotation axis BX (third rotation axis) different from the rotation axes AX and CX. The rotation axis BX extends in the front-rear direction. The first intermediate gear 283 meshes with the input gear 278. The second intermediate gear 284 meshes with the output gear 285.

The first intermediate gear 283 and the second intermediate gear 284 are one body. The first and the second intermediate gears 283 and 284 rotate together about the rotation axis BX. A rod portion 284L projects forward from the front end of the second intermediate gear 284. The first intermediate gear 283 is disposed around the rod portion 284L. The first intermediate gear 283 is fixed to the rod portion 284L. The rear end of the second intermediate gear 284 is rotatably supported by a bearing 86A. The front end of the second intermediate gear 284 is rotatably supported by a bearing 86B. The bearing 86A is held in the second gear case 67B. The bearing 86B is held in the second bearing box 66B.

The output gear 285 is disposed around the spindle 264. The output gear 285 is fixed to the spindle 264. A key 285A is provided between the spindle 264 and the output gear 285. The key 285A prevents relative rotation between the output gear 285 and the spindle 264. The output gear 285 and the spindle 264 rotate together about the rotation axis CX. The output gear 285 is rotated by the motor 209 via the input gear 278, the first intermediate gear 283, and the second intermediate gear 284. When the output gear 285 is rotated by the motor 209, the spindle 264 rotates together with the output gear 285 about the rotation axis CX.

The output gear 285 has a larger number of teeth than the input gear 278. The number of teeth of the output gear 285 is larger than that of each of the first intermediate gear 283 and the second intermediate gear 284. The number of teeth of the first intermediate gear 283 is larger than that of the input gear 278. The number of teeth of the first intermediate gear 283 is larger than that of the second intermediate gear 284. The reduction mechanism 265 reduces the rotational speed of the intermediate shaft 110 by two steps to rotate the spindle 264.

The one-way bearing 287 prevents the descending of the lifting member 8 when the power is not transmitted from the motor 209 to the lifting member 8. In the present embodiment, the one-way bearing 287 is fixed by a flange portion 131 and a flange portion 121 so as to prevent the second washer 151, the driven-side clutch 150, the driving-side clutch 140, and the first washer 141 from rotating relative to one another when the power is not transmitted from the motor 209 to the spindle 264. That is, the second washer 151, the driven-side clutch 150, the driving-side clutch 140, and the first washer 141 are united into one body by being sandwiched between the flange portions 131 and 121. The one-way bearing 287 is disposed on a rotation axis different from the rotation axis CX of the spindle 264. In the present embodiment, the one-way bearing 287 is disposed on the rotation axis AX of the rotor shaft 273 and the intermediate shaft 110. The one-way bearing 287 includes a one-way clutch that can connect the rotor shaft 273 to the intermediate shaft 110. While the rotor shaft 273 is connected to the intermediate shaft 110 via the second washer 151, the driven-side clutch 150, the driving-side clutch 140, and the first washer 141; the intermediate shaft 110 rotates together with the rotor shaft 273 about the rotation axis AX.

The one-way bearing 287 includes a first support member 120 fixed to the rotor shaft 273, a second support member 130 fixed to the intermediate shaft 110, the driving-side clutch 140 supported by the first support member 120, the driven-side clutch 150 supported by the second support member 130, and an outer cylinder 160 disposed around the driving-side clutch 140 and the driven-side clutch 150.

The first support member 120 is disposed around the rotor shaft 273. The front portion of the rotor shaft 273 is press-fitted into the first support member 120. The first support member 120 rotates together with the rotor shaft 273. The first support member 120 has the flange portion 121 and a tubular portion 122 projecting forward from the flange portion 121. The flange portion 121 is rotatably supported by the bearing 275A. The rotor shaft 273 is rotatably supported by the bearing 275A with the first support member 120 interposed therebetween.

The second support member 130 is disposed around the front end of the rotor shaft 273 and around the intermediate shaft 110. The rear end of the intermediate shaft 110 is press-fitted into the second support member 130. The second support member 130 rotates together with the intermediate shaft 110. The second support member 130 has the flange portion 131 and a tubular portion 132 projecting backward from the flange portion 131. The flange portion 131 is rotatably supported by the bearing 275B. The intermediate shaft 110 is rotatably supported by the bearing 275B with the second support member 130 interposed therebetween.

The tubular portion 132 is disposed around the front end of rotor shaft 273. The outer circumference of the front end of rotor shaft 273 is provided with a thread 112. The inner circumference of the tubular portion 132 is provided with a thread groove 114. The thread 112 of the rotor shaft 273 is coupled to the thread groove 114 of the tubular portion 132.

The driving-side clutch 140 is substantially tubular. At least a portion of the driving-side clutch 140 is disposed around the tubular portion 122 of the first support member 120. The driving-side clutch 140 is rotatably supported by the tubular portion 122 of the first support member 120. The first washer 141 is disposed between at least a portion of the driving-side clutch 140 and the first support member 120. The driving-side clutch 140 rotates about the rotation axis AX together with the rotor shaft 273 and the first support member 120 when the lifting member 8 anscends. The driving-side clutch 140 does not rotate when the lifting member 8 descends.

The driven-side clutch 150 is substantially tubular. At least a portion of the driven-side clutch 150 is disposed around the tubular portion 132 of the second support member 130. The driven-side clutch 150 is rotatably supported by the tubular portion 132 of the second support member 130. The second washer 151 is disposed between at least a portion of the driven-side clutch 150 and the second support member 130. The driven-side clutch 150 rotates about the rotation axis AX together with the intermediate shaft 110 and the second support member 130 when the lifting member 8 ascends. The driven-side clutch 150 does not rotate when the lifting member 8 descends.

The one-way bearing 287 is disposed around the driving-side clutch 140 and the driven-side clutch 150. The the driving-side clutch 140 and the driven-side clutch 150 are rotatably supported by the one-way bearing 287. The one-way bearing 287 is held in the first gear case 67A.

As illustrated in FIGS. 40 and 41, the driving-side clutch 140 includes a projection 142 projecting forward from the front end of the driving-side clutch 140 and a recess 143 recessed backward from the front end of the driving-side clutch 140. The driven-side clutch 150 includes a recess 152 recessed forward from the rear end of the driven-side clutch 150 and a projection 153 projecting backward from the rear end of the driven-side clutch 150. The projection 142 is disposed in the recess 152 and the projection 153 is disposed in the recess 143, and thereby, the driving-side clutch 140 and the driven-side clutch 150 are prevented from rotating relative to each other. The projection 142, the recess 152, the projection 153, and the recess 143 each serve as an antirotation device that prevents the relative rotation between the driving-side clutch 140 and the driven-side clutch 150.

The intermediate shaft 110 and the second support member 130 are movable in the front-rear direction with respect to the rotor shaft 273 and the first support member 120. The intermediate shaft 110 is supported by the needle bearing 170 so as to be movable in the front-rear direction. The driven-side clutch 150 is supported by the outer cylinder 160 so as to be movable in the front-rear direction. As the intermediate shaft 110 and the second support member 130 move in the front-rear direction, the driven-side clutch 150 moves in the front-rear direction together with the intermediate shaft 110 and the second support member 130. As the intermediate shaft 110 and the second support member 130 move in the front-rear direction, the bearing 275B moves in the front-rear direction together with the intermediate shaft 110 and the second support member 130.

The rotor shaft 273 is connected to the second support member 130 via the thread 112 and the thread groove 114. As the rotor shaft 273 and the second support member 130 rotate relative to each other, the thread 112 and the thread groove 114 rotate relative to each other. As the thread 112 and the thread groove 114 rotate relative to each other, the intermediate shaft 110 and the second support member 130 move in the front-rear direction with respect to the rotor shaft 273 and the first support member 120.

In a case where the motor 209 is driven so as to cause the lifting member 8 to ascend, the rotor shaft 273 rotates when the lifting member 8 ascends. However, the load of the lifting member 8 is applied to the flange portion 131, so that the flange portion 131 rotates under a larger load. When the flange portion 131 rotates under a larger load, the relative rotation between the thread 112 of the rotor shaft 273 and the thread groove 114 of the tubular portion 132 causes the flange portion 131 to move rearward so as to move closer to the motor 209. As the flange portion 131 moves closer to the motor 209, the second washer 151, the driven-side clutch 150, the driving-side clutch 140, and the first washer 141 are sandwiched between the flange portions 131 and 121 to be united into one body. However, the one-way bearing 287 can rotate in a direction of rotation that causes the lifting member 8 to ascend. Therefore, when the motor 209 is driven so as to cause the lifting member 8 to ascend, the second washer 151, the driven-side clutch 150, the driving-side clutch 140, and the first washer 141 rotate while being sandwiched between the flange portions 131 and 121.

When the motor 209 stops driving and the output gear 285 is not rotated by the motor 209, the load of the lifting member 8 is applied to the flange portion 131. When the load is applied to the flange portion 131, the relative rotation between the thread 112 of the rotor shaft 273 and the thread groove 114 of the tubular portion 132 causes the flange portion 131 to move closer to the motor 209. As the flange portion 131 moves closer to the motor 209, the second washer 151, the driven-side clutch 150, the driving-side clutch 140, and the first washer 141 are sandwiched between the flange portions 131 and 121 to be united into one body. However, since the one-way bearing 287 does not rotate in a direction of rotation that causes the lifting member 8 to descend, the one-way bearing 287 is locked so as to restrict the rotation of the spindle 264.

When the motor 209 is driven so as to cause the lifting member 8 to descend, the rotor shaft 273 rotates in a direction opposite to the direction that causes the lifting member 8 to ascend. The relative rotation between the thread 112 of the rotor shaft 273 and the thread groove 114 of the tubular portion 132 causes the flange portion 131 to move frontward away from the motor 209. As the flange portion 131 moves away from the motor 209, the flange portion 131 moves away from the second washer 151, and a gap is created between the flange portion 131 and the second washer 151. This operation releases the unification of the second washer 151, the driven-side clutch 150, the driving-side clutch 140, and the first washer 141, and frees the second washer 151, the driven-side clutch 150, the driving-side clutch 140, and the first washer 141 from one another. In this case, the rotation of the spindle 264 is not affected by the one-way bearing 287, and the rotational force of the motor 209 is transmitted to the spindle 264.

As described above, in the present embodiment, the one-way bearing 287 is disposed on the rotation axis AX different from the rotation axis CX of the rotating body 49. Disposing the one-way bearing 287 on the rotation axis AX of the motor 209 prevents the excessive load from being applied to the one-way bearing 287 and the motor 209 when the power is not transmitted from the motor 209 to the rotating body 49. The load (torque) applied from the rotating body 49 to the one-way clutch of the one-way bearing 287 is attenuated by the reduction mechanism 265. This attenuation prevents the excessive load from being applied to the one-way bearing 287.

In the present embodiment, the one-way bearing 287 may be disposed on the rotation axis BX.

According to the configuration described above, the lifter device is restrained from increasing in size.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. A lifter device comprising:
a pole;
a lifting member configured to be guided by the pole;
a motor configured to generate power used for ascending and descending of the lifting member and coupled to the pole;
a controller configured to control the motor and coupled to the pole;
a gear mechanism configured to transmit the power of the motor to the lifting member; and
a battery mounting portion that is coupled to the pole and on which a battery pack is mounted to supply power to the motor, wherein
the lifter device further comprises either (i) an upper limit sensor configured to sense reaching of the lifting member to an upper height limit in order to prevent the lifting member from ascending past the upper height limit, or (ii) a lower limit sensor configured to sense reaching of the lifting member to a lower height limit in order to prevent the lifting member from descending past the lower height limit.

2. The lifter device according to claim 1, wherein
at least a portion of the lifting member is configured to ascend and descend on a front side of the pole, and
the motor, the gear mechanism, the controller and the battery mounting portion are on a rear side of the pole.

3. The lifter device according to claim 1, further comprising a case that is fixed to a central portion in an up-down direction of the pole, wherein
the case contains the controller, and
the battery mounting portion is on the case.

4. The lifter device according to claim 1, wherein at least a portion of the gear mechanism is in a gear case fixed to the pole; and
the motor is fixed to the gear case.

5. The lifter device according to claim 1, wherein the battery mounting portion comprises a first battery mounting portion and a second battery mounting portion.

6. The lifter device according to claim 5, wherein
a battery pack having a first rated voltage is mounted on the first battery mounting portion, and
a battery pack having a second rated voltage is mounted on the second battery mounting portion.

7. The lifter device according to claim 5, wherein the second battery mounting portion is disposed adjacent to the first battery mounting portion.

8. The lifter device according to claim 7, further comprising a cover member configured to
cover the second battery mounting portion when the battery pack is mounted on the first battery mounting portion, and
cover the first battery mounting portion when the battery pack is mounted on the second battery mounting portion.

9. The lifter device according to claim 7, wherein
relative positions of the first battery mounting portion and the second battery mounting portion are defined such that
the battery pack is not allowed to be mounted on the second battery mounting portion when the battery pack is mounted on the first battery mounting portion, and
the battery pack is not allowed to be mounted on the first battery mounting portion when the battery pack is mounted on the second battery mounting portion.

10. The lifter device according to claim 1, wherein the battery mounting portion is configured such that the battery pack is mounted by being inserted onto the battery mounting portion from above the battery mounting portion.

11. The lifter device according to claim 1, further comprising an operation device that is configured to transmit, to the controller, an operation signal to drive the motor.

12. The lifter device according to claim 11, wherein
the operation device comprises buttons, and
the buttons are on an upper surface of a case.

13. The lifter device according to claim 12, wherein the buttons comprise an up button to cause the lifting member to ascend and a down button to cause the lifting member to descend.

14. The lifter device according to claim 1, further comprising:
a rotating body configured to be rotated by the motor;
a lifting pulley that is rotatably supported by the lifting member; and
a wire that connects the rotating body to the lifting pulley, wherein
the rotating body is configured to wind and unwind the wire, so that the lifting member ascends and descends.

15. The lifter device according to claim 1, further comprising a light that is at an upper end of the pole, and is configured to illuminate a front of the lifting member.

16. A lifter device comprising:
a pole extending in an up-down direction;
a brushless motor including a stator and a rotor rotatable relative to the stator;
a speed reduction mechanism having two or more reduction stages;
a rotating body configured to be rotated by the speed reduction mechanism;
a wire fixed to the rotating body;
a plurality of pulleys on which the wire is wound;
a lifting member configured to ascend and descend by the wire with respect to the pole;
a battery mounting portion connected to the pole; and
a battery pack for an electric power tool, which is detachably mountable on the battery mounting portion, wherein
the lifting member is ascendible and descendible while a load of 50 kg to 150 kg is loaded on the lifting member.

* * * * *